(12) United States Patent
Yamada et al.

(10) Patent No.: US 7,678,866 B2
(45) Date of Patent: Mar. 16, 2010

(54) POLYETHYLENE COMPOSITION AND PROCESS FOR PRODUCING SAME

(75) Inventors: Satoru Yamada, Mie (JP); Masayuki Yamaguchi, Yokkaichi (JP); Akihiro Yano, Yokkaichi (JP); Yasutake Wakabayashi, Yokkaichi (JP); Kei Inatomi, Yokkaichi (JP)

(73) Assignee: Tosoh Corporation, Yamaguchi (JP)

( * ) Notice: Subject to any disclaimer, the term of this patent is extended or adjusted under 35 U.S.C. 154(b) by 0 days.

(21) Appl. No.: 10/832,342

(22) Filed: Apr. 27, 2004

(65) Prior Publication Data
US 2004/0214953 A1  Oct. 28, 2004

(30) Foreign Application Priority Data
Apr. 28, 2003  (JP) ............................. 2003-124458

(51) Int. Cl.
*C08L 23/06* (2006.01)
*C08L 23/00* (2006.01)
*C08F 255/00* (2006.01)

(52) U.S. Cl. ..................... 525/540; 525/241; 526/903
(58) Field of Classification Search ................. 525/240, 525/241; 526/348
See application file for complete search history.

(56) References Cited

U.S. PATENT DOCUMENTS

| 5,382,631 | A | * | 1/1995 | Stehling et al. | ............. 525/240 |
| 5,955,557 | A | | 9/1999 | Machida et al. | |
| 6,114,457 | A | * | 9/2000 | Markel et al. | ............... 525/240 |
| 6,444,773 | B1 | | 9/2002 | Markel | |
| 2003/0120003 | A1 | | 6/2003 | Kashiwa et al. | |

FOREIGN PATENT DOCUMENTS

| EP | 1 209 173 A1 | | 5/2002 |
| WO | WO 94/07930 | * | 4/1994 |

* cited by examiner

*Primary Examiner*—James Seidleck
*Assistant Examiner*—Saira Haider
(74) *Attorney, Agent, or Firm*—Sughrue Mion, PLLC

(57) ABSTRACT

A polyethylene composition prepared by polymerizing ethylene and an optional olefin with $\geq 3$ carbon atoms in the presence of a macromonomer, is provided. The macromonomer is a vinyl-terminated ethylene polymer prepared by polymerizing ethylene and an optional olefin with $\geq 3$ carbon atoms, and the macromonomer has (A) $Mn \geq 5,000$, and Mw/Mn=2-5. The polyethylene composition comprises (C) branched polyethylene prepared by copolymerizing ethylene, the macromonomer and an optional olefin with $\geq 3$ carbon atoms, and the macromonomer. The polyethylene composition has (D) a density of 0.890-0.980 g/cm$^3$, (E) Mw=30,000-10,000,000, (F) Mw/Mn=2-30, (G) a long chain branch frequency of 0.01-3 per 1,000 C atoms, and (H) a shrinking factor (g' value) of 0.1-0.9 as measured by GPC/intrinsic-viscosity. The polyethylene composition can be finely divided particles having (P) a powder bulk density of 0.15-0.50 g/cm$^3$.

19 Claims, No Drawings

US 7,678,866 B2

POLYETHYLENE COMPOSITION AND PROCESS FOR PRODUCING SAME

TECHNICAL FIELD

This invention relates to a polyethylene composition and a process for producing the same.

BACKGROUND ART

Low-density polyethylene (LDPE) produced by a high-pressure radical polymerization process is branched polyolefin having a tree-like structure with non-linear side branches. The branched polyethylene exhibits enhanced melt-flow characteristics and melt strength, and thus, is advantageous in melt-shaping characteristics. But, its solid polymer has a low mechanical strength and its molten polymer has a reduced drawability.

In contrast, high-density polyethylene (HDPE) and linear low-density polyethylene (LLDPE), prepared by polymerization using a Ziegler catalyst or a metallocene catalyst, have high mechanical strength and melt drawability. Therefore, HDPE and LLDPE are widely used in a field where high mechanical strength and melt drawability are required. However, HDPE and LLDPE have poor processability.

To improve processability of HDPE and LLDPE, various processes for producing polyethylene have been proposed. The proposed processes include, for example, (i) a process wherein polymerization is conducted in a multi-stage using a conventional Ziegler catalyst whereby a polymer having a broad molecular weight distribution is obtained (see Japanese Unexamined Patent Publication [hereinafter abbreviated to "JP-A"] No. H2-53811, JP-A H2-132109 and JP-A H10-182742; (ii) a process wherein ethylene is polymerized using a conventional chromium catalyst to give polyethylene having long side branches; (iii) a process wherein ethylene is polymerized using a specific metallocene catalyst to give polyethylene having long side branches (see U.S. Pat. No. 5,272,236); (iv) a process wherein ethylene is copolymerized with a macromonomer using a specific metallocene catalyst with an enhanced degree of copolymerization to give polyethylene having long side branches (see WO 94/07930); and (v) a process wherein an ethylene-macromonomer copolymer is blended with linear polyethylene (U.S. Pat. No. 6,114,457).

Processability of polymers prepared by the above-proposed processes are not improved to a sufficient extent. The polymers prepared by the above-mentioned processes (i) and (ii) have a broad molecular weight distribution and hence have reduced mechanical strengths. The polymers prepared by the above-mentioned processes (iv) and (v) have an irregular particulate form and therefore a slurry polymerization process cannot be adopted for the production of these polymers.

SUMMARY OF THE INVENTION

A primary object of the present invention is to provide a polyethylene composition having good processability inherently possessed by LDPE, and high mechanical strengths and melt-drawability possessed by HDPE and LLDPE.

Another object of the present invention is to provide a process for producing a polyethylene composition having the above-mentioned beneficial properties.

In one aspect of the present invention, there is provided a polyethylene composition (which composition is hereinafter referred top as "first type polyethylene composition") which is prepared by polymerizing ethylene and an optional olefin having at least three carbon atoms in the presence of a macromonomer, wherein the macromonomer is an ethylene polymer having a terminal vinyl group, prepared by polymerizing ethylene, or an ethylene copolymer having a terminal vinyl group, prepared by copolymerizing ethylene and an olefin having at least three carbon atoms, and the macromonomer is characterized by having:

(A) a number average molecular weight (Mn) of at least 5,000, and (B) a ratio (Mw/Mn) of weight average molecular weight (Mw) to number average molecular weight (Mn), in the range of 2 to 5; and the polyethylene composition is characterized by comprising:

(C) based on the weight of the polyethylene composition, 1% to 99% by weight of branched polyethylene which is a copolymer derived from ethylene, the macromonomer and an optional olefin having at least three carbon atoms, and 1% to 99% by weight of the macromonomer, and the polyethylene composition is further characterized by having:

(D) a density in the range of 0.890 g/cm$^3$ to 0.980 g/cm$^3$, (E) a weight average molecular weight (Mw) in the range of 30,000 to 10,000,000, (F) a ratio (Mw/Mn) of weight average molecular weight (Mw) to number average molecular weight (Mn), in the range of 2 to 30, (G) a frequency of long chain branches in the range of 0.01 to 3 per 1,000 carbon atoms, and (H) a shrinking factor (g' value) as determined by a combination of gel permeation chromatography (GPC) and on-line intrinsic viscosity measurements, in the range of at least 0.1 but smaller than 0.9.

In another aspect of the present invention, there is provided a particulate polyethylene composition (which composition is hereinafter referred to as "second type polyethylene composition") which is prepared by polymerizing ethylene and an optional olefin having at least three carbon atoms in the presence of a macromonomer, wherein the macromonomer is an ethylene polymer having a terminal vinyl group, prepared by polymerizing ethylene, or an ethylene copolymer having a terminal vinyl group, prepared by copolymerizing ethylene and an olefin having at least three carbon atoms, and the macromonomer is characterized by having:

(A) a number average molecular weight (Mn) in the range of 1,000 to 50,000, and (B) a ratio (Mw/Mn) of weight average molecular weight (Mw) to number average molecular weight (Mn), in the range of 2 to 5; and the polyethylene composition is characterized by comprising:

(C) based on the weight of the polyethylene composition, 1% to 99% by weight of branched polyethylene which is a copolymer derived from ethylene, the macromonomer and an optional olefin having at least three carbon atoms, and 1% to 99% by weight of the macromonomer, and the polyethylene composition is further characterized by having:

(D) a density in the range of 0.890 g/cm$^3$ to 0.980 g/cm$^3$, (E) a weight average molecular weight (Mw) in the range of 30,000 to 10,000,000, (F) a ratio (Mw/Mn) of weight average molecular weight (Mw) to number average molecular weight (Mn), in the range of 2 to 30, (G) a frequency of long chain branches in the range of 0.01 to 3 per 1,000 carbon atoms, and (H) a shrinking factor (g' value) as determined by a combination of gel permeation chromatography (GPC) and on-line intrinsic viscosity measurements, in the range of at least 0.1 but smaller than 0.9, and (P) a powder bulk density in the range of 0.15 g/cm³ to 0.50 g/cm³.

In further aspects of the present invention, there are provided a process for producing the first type polyethylene composition, and a process for producing the second type polyethylene composition (these processes will be described hereinafter in detail).

DETAILED EXPLANATION OF THE INVENTION

Macro Monomer

The macromonomer used in the first-type polyethylene composition and the second-type polyethylene composition (the two types of polyethylene compositions are hereinafter referred to collectively merely as "polyethylene composition") is an ethylene polymer having a terminal vinyl group, prepared by polymerizing ethylene, or an ethylene copolymer having a terminal vinyl group, prepared by copolymerizing ethylene and an olefin having at least three carbon atoms.

Preferably, the macromonomer is a linear ethylene homopolymer or copolymer having a terminal vinyl group, which has a frequency of long chain branches of smaller than 0.01 per 1,000 carbon atoms in the main methylene chain (by the term "frequency of long chain branches" as herein used, we mean the frequency of a hexyl branch and longer alkyl branches as measured by $^{13}$C-NMR, except for branches derived from the olefin having at least three carbon atoms). More preferably, the macromonomer has a frequency of long chain branches of smaller than 0.01 per 1,000 carbon atoms in the main methylene chain, and a frequency of short chain branches of smaller than 0.01 per 1,000 carbon atoms in the main methylene chain (by the term "frequency of short chain branches" as herein used, we mean the frequency of chain branches shorter than a hexyl branch, such as a methyl branch, an ethyl branch, a propyl branch, a butyl branch and a pentyl branch, except for branches derived from the olefin having at least three carbon atoms).

The olefin having at least three carbon atoms includes, for example, α-olefins such as propylene, 1-butene, 1-hexene, 1-octene, 4-methyl-1-pentene, 3-methyl-1-butene and vinyl cycloalkanes; cycloolefins such as norbornene and norbornadiene; dienes such as butadiene and 1,4-hexadiene; and styrene. These olefins may be used either alone or as a combination of two or more thereof.

The vinyl-terminated ethylene homopolymer or copolymer, used as the macromonomer for the production of the first type polyethylene composition has a number average molecular weight (Mn) of at least 5,000, preferably at least 10,000. The vinyl-terminated ethylene homopolymer or copolymer, used as the macromonomer for the production of the second type polyethylene composition has a Mn in the range of 1,000 to 50,000, preferably 5,000 to 50,000, and more preferably 10,000 to 50,000. The macomonomers used for the production of the first type polyethylene composition have a weight average molecular weight (Mw) of at least 10,000, preferably at least 20,000. The macromonomers used for the production of the second type polyethylene composition preferably have a weight average molecular weight (Mw) of at least 2,000, more preferably at least 10,000 and especially preferably larger than 20,000. The ratio of Mw/Mn is in the range of 2 to 5, preferably 2 to 4 and more preferably 2 to 3.5.

The macromonomer used in the present invention has a terminal structure such that Z as defined by the following equation (1) is preferably in the range of 0.25 to 1, more preferably 0.50 to 1.

$$Z = [X/(X+Y)] \times 2 \tag{1}$$

wherein X is frequency of vinyl terminal per 1,000 methylene carbon atoms in the main chain, and Y is frequency of saturated terminal per 1,000 methylene carbon atoms in the main chain. X and Y can be determined by $^1$H-NMR, $^{13}$C-NMR or FT-IR. For example, according to $^{13}$C-NMR, the exsistence and amount of vinyl terminal can be determined by peaks at 114 ppm and 139 ppm, and the exsistence and amount of saturated terminal can be determined by peaks at 32.3 ppm, 22.9 ppm and 14.1 ppm.

The procedure by which the macromonomer is prepared is not particularly limited, but, in the case when the ethylene polymer having a terminal vinyl group as the macromonomer is prepared, a process for polymerizing ethylene using a catalyst comprising as the main catalytically active ingredient a metallocene compound containing a transition metal selected from those which are recited in groups 3, 4, 5 and 6 of the periodic table is preferably adopted.

Polyethylene Composition

The polyethylene composition, produced by polymerizing ethylene and an optional olefin having at least three carbon atoms in the presence of the above-mentioned macromonomer, comprises newly produced branched polyethylene, and the above-mentioned macromonoer, i.e., unreacted macromonomer which has not been copolymerized into the branched polyethylene. The newly produced branched polyethylene comprises, based on the weight of the newly produced branched copolymer, 1% to 100% by weight of a copolymer comprised of ethylene units, units of the macromonomer and units of an optional olefin having at least three carbon atoms, and the remainder of a polymer or copolymer comprised of ethylene units and units of an optional olefin having at least three carbon atoms.

The polyethylene composition, produced by polymerizing ethylene and an optional olefin having at least three carbon atoms in the presence of the above-mentioned macromonomer, comprises, based on the weight of the polyethylene composition, of 1% to 99% by weight, preferably 30% to 80% by weight of the newly produced branched polyethylene, and 1% to 99% by weight, preferably 20% to 70% by weight of the above-mentioned macromonomer. The contents of the newly produced branched polyethylene and the macromonomer are determined from a GPC chart of a powdery polyethylene composition and a GPC chart of the macromonomer. That is, the peak of the polyethylene composition in the GPC chart thereof is divided into the peak attributed to the newly produced branched polymer and the peak of the macromonomer on the basis of the GPC chart of the macromonomer, and the content of the newly produced branched polyethylene is calculated as a ratio of the peak attributed to the newly produced branched polymer to the total of the peak attributed to the newly produced polymer and the macromonomer, and the content of the macromonomer is calculated as a ratio of the peak attributed to the macromonomer to the total of the peak attributed to the newly produced branched polymer and the macromonomer.

The polyethylene composition has a density in the range of 0.890 g/cm³ to 0.980 g/cm³ as measured by a density gradient tube method accrding to JIS K6760 (1995). When an olefin having at least three carbon atoms is not used for the preparation of branched polyethylene, the density (d) and melt flow rate (MFR; g/10 min) of branched polyethylene as measured under a load of 2.16 kg at 190° C. satisfies a relationship represented by the following formula (25).

$$d \geq 0.008 \times \log(MFR) + 0.958 \quad (25)$$

preferably a relationship represented by the following formula (25').

$$d \geq 0.007 \times \log(MFR) + 0.960 \quad (25')$$

More preferably a relationship represented by the following formula (25").

$$d \geq 0.005 \times \log(MFR) + 0.964 \quad (25'')$$

The polyethylene composition of the present invention has a weight average molecular weight (Mw) in the range of 30,000 to 10,000,000, preferably 40,000 to 8,000,000 and more preferably 50,000 to 5,000,000, as a linear polyethylene standard measured by gel permeation chromatography (GPC).

The polyethylene composition of the present invention has a Mw/Mn ratio in the range of 2 to 30, preferably 2 to 8 and more preferably 3 to 6.

The polyethylene composition of the present invention has a long chain branch frequency in the range of 0.01 to 3, preferably 0.01 to 1 and more preferably at least 0.01 but smaller than 0.1, per 1,000 carbon atoms in the main chain. By the term "long chain branch frequency" as herein used, we mean the frequency of a hexyl branch or longer alkyl branches as measured by $^{13}$C-NMR.

The polyethylene composition of the present invention has a shrinking factor (g' value) as determined by a combination of gel permeation chromatography (GPC) and on-line intrinsic viscosity measurements, in the range of at least 0.1 but smaller than 0.9, preferably 0.1 to 0.8 and more preferably 0.1 to 0.7. The g' value is a parameter indicating the degree of long chain branching, and is a ratio of the intrinsic viscosity of the polyethylene composition to the intrinsic viscosity of high-density polyethylene (HDPE) having no branch at a molecular weight of 700,000 that is determined by a combination of gel permeation chromatography (GPC) and intrinsic viscosity measurement using a universal calibration principle, or a molecular weight of three times of the weight average molecular weight (Mw) as a linear polyethylene standard.

The g' value and g value (shrinking factor as determined by a combination of gel permeation chromatography (GPC) and light scattering measurement) preferably satisfy the following relationship (2):

$$0.2 < \log(g')/\log(g) < 1.3 \quad (2)$$

and more preferably satisfy the following relationship (2'):

$$0.5 < \log(g')/\log(g) < 1.0 \quad (2')$$

The g value means a ratio of average square of radius of gyration of the polyethylene composition to average square of radius of gyration of HDPE at a molecular weight of 700,000 that is determined by a combination of gel permeation chromatography (GPC) and intrinsic viscosity measurement using a universal calibration principle, or a molecular weight of three times of Mw as a linear polyethylene standard. "log (g')/log(g)" is a parameter indicating the structure of long chain branching. It has been elucidated that the log(g')/log(g) value of a comb-shaped branched chain with short branches is in the vicinity of 1.5 and that value of a star-shaped branching is small (see Takeshi Fukuda, *Shin Kobunshi Jikkengaku* (New Polymer Experimental Work) 1, Fundamentals of Polymer Experiments, Analysis of Molecular Characteristics, 3-4 Molecular Configuration, 295(1994)). The polyethylene composition of the present invention has a branching structure similar to a star-shaped branching and thus the log(g')/log(g) value is smaller than 1.3.

A g value ($g_{3M}$) at a molecular weight, which is determined by a combination of gel permeation chromatography (GPC) and intrinsic viscosity measurement using a universal calibration principle, of three times of mw as a linear polyethylene standard, and a g value ($g_M$) at a molecular weight of the same as the Mw preferably satisfy the following relationship (26):

$$0 < g_{3M}/g_M \leq 1 \quad (26)$$

more preferably satisfy the following relationship (26'):

$$0 < g_{3M}/g_M \leq 0.9 \quad (26')$$

and especially preferably satisfy the following relationship (26"):

$$0 < g_{3M}/g_M \leq 0.8 \quad (26'')$$

The polyethylene composition of the present invention preferably has a flow activation energy (Ea) in the range of 30 kJ/mol to 100 kJ/mol, preferably 35 kJ/mol to 80 kJ/mol and more preferably 40 kJ/mol to 70 kJ/mol. The flow activation energy is determined according to an Arrhenius equation to which the the shift factor, as obtained by the measurement of dynamic viscoelasticity, is shifted horizontally. When the flow activation energy is below 30 kJ/mol, the dependence of melt-viscosity on temperature is reduced and the processability becomes poor.

The polyethylene composition of the present invention preferably satisfies the following relationships:

$$MS_{190} > 22 \times MFR^{-0.88} \quad (3)$$

$$MS_{190} > 30 \times MFR^{-0.88} \quad (3')$$

$$MS_{160} > 110 - 110 \times \log(MFR) \quad (27)$$

$$MS_{160} > 130 - 110 \times \log(MFR) \quad (27')$$

$$MS_{160} > 150 - 110 \times \log(MFR) \quad (27'')$$

wherein $MS_{190}$ and $MS_{160}$ are melt strengths (MS) (mN) as measured at temperatures of 190° C. and 160° C., respectively, and MFR is a melt flow rate (g/10 min.) as measured under a load of 2.16 kg and at a temperature of 190° C. MS is measured at a shear rate of 10.8 s$^{-1}$ and a draw ratio of 47 using a die with a length (L) of 8 mm, a diameter (D) of 2.095 mm, and an entrance angle of 90°. When the maximum draw ratio is smaller than 47, MS is measured at the maximum draw ratio at which a sample is not broken. The relationships between MS and MFR recited in ascending order of preference are as follows.

(i) either (3) or (27) is satified
(ii) both of (3) and (27) are satisfied
(iii) both of (3') and (27) are satisfied
(iv) both of (3') and (27') are satisfied
(v) both of (3') and (27") are satisfied If the relationships (3) and (27) are not satisfied, the processability is poor.

The polyethylene composition of the present invention preferably has a non-linear parameter (λ) for elongation viscosity in the range of 1.2 to 100, more preferably 2.0 to 100 and especially preferably 2.0 to 30. The non-linear parameter (λ) for uniaxial elongation viscosity is determined by measuring the uniaxial elongation viscosity at a temperature of 160° C. and a strain rate of 0.07 to 0.1 s$^{-1}$ by using a Meissner-type uniaxial elongational viscometer, and dividing the maximum value of elongation viscosity by the elongation viscosity in the linear region at the time when the measured elongation viscosity shows a maximum value. The elongation viscosity in the linear region can be calculated from the dynamic viscoelasticity as described in M. Yamaguchi et al, Polymer Journal, vol. 32, 164 (2000). When the parameter λ is smaller than 1.2, the strain hardening characteristics are reduced, and processability for blow molding or foaming tends to become poor.

Further, the polyethylene composition of the present invention is preferably characterized by satisfying the following formula (4):

$$\log(DR) > 5 - 1.33 \times \log(MS_{160}) \qquad (4)$$

wherein DR is a maximum draw ratio and $MS_{160}$ is a melt strength (MS) as measured at a temperature of 160° C. The maximum draw ratio (DR) is a draw ratio at break as measured at a temperature of 160° C. and at a shear rate of 10.8 s$^{-1}$ while the take-off speed is elevated at a rate of 20 m/min per minute, using a die with a length (L) of 8 mm and a diameter (D) of 2.095 mm, and having an entrance angle of 90°. When the log(DR) is not larger than (5−1.33×log($MS_{160}$)), the melt drawability is poor.

The second type polyethylene composition is particulate and has a powder bulk density, as measured according to JIS K6721, in the range of 0.15 g/cm³ to 0.50 g/cm³. In view of the processability, the powder bulk density is preferably in the range of 0.17 g/cm³ to 0.50 g/cm³, more preferably 0.20 g/cm³ to 0.50 g/cm³.

Process for Producing First-Type Polyethylene Composition

The first type polyethylene composition of the present invention is produced by a process, which comprises polymerizing ethylene and an optional olefin having at least three carbon atoms in the presence of the macromonomer and using a catalyst comprising as the main ingredient a metallocene compound [ingredient (d)] represented by the following general formula (5):

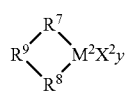

(5)

wherein $M^2$ is a transition metal of group 3, 4, 5 or 6 of the periodic table; $X^2$ independently represents a hydrogen atom, a halogen atom, or a hydrocarbon group having 1 to 20 carbon atoms, which may contain a silicon, nitrogen or oxygen atom; y is an integer of 0 to 3 which varies depending upon the valence of $M^2$; $R^7$ is a ligand represented by the following general formula (6), (7) or (8):

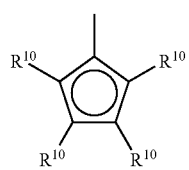

(6)

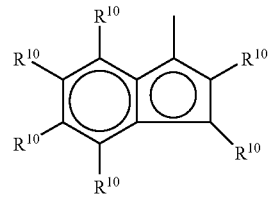

(7)

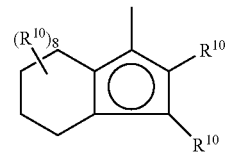

(8)

wherein $R^{10}$ independently represents a hydrogen atom, a halogen atom, or a hydrocarbon group having 1 to 20 carbon atoms, which may contain a silicon, nitrogen or oxygen atom; $R^8$ is a ligand represented by the following general formula (9):

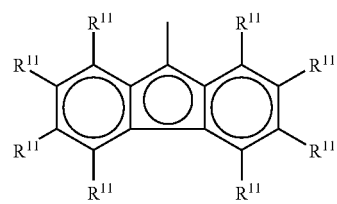

(9)

wherein $R^{11}$ independently represents a hydrogen atom, a halogen atom, or a hydrocarbon group having 1 to 20 carbon atoms, which may contain a silicon, nitrogen or oxygen atom; said ligands $R^7$ and $R^8$ form a sandwich structure together with $M^2$; $R^9$ is a group represented by the following general formula (10):

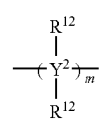

(10)

wherein $R^{12}$ independently represents a hydrogen atom, a halogen atom, or a hydrocarbon group having 1 to 20 carbon atoms, which may contain a silicon, nitrogen or oxygen atom, and two $R^{12}$s may be bonded with each other to form a ring together with $Y^2$ to which the two $R^{12}$s are bonded; $Y^2$ is an atom of group 14 of the periodic table; m is an integer of 1 to 5; and $R^9$ has a function of crosslinking $R^7$ with $R^8$.

In the metallocene compound [ingredient (d)] of the general formula (5), $R^7$ includes a cyclopentadienyl group of formula (6), an indenyl group of formula (7) and an tetrahydroindenyl group of formula (8). In these formulae (6), (7) and (8), $R^{10}$ independently represents a hydrogen atom, a halogen atom, or a hydrocarbon group having 1 to 20 carbon atoms, which may contain a silicon, nitrogen or oxygen atom. As non-limiting specific examples of $R^7$, there can be mentioned a cyclopentadienyl group, a methylcyclopentadienyl group, a dimethylcyclopentadienyl group, a trimethylcyclopentadienyl group, a tetramethylcyclopentadienyl group, a ethylcyclopentadienyl group, a diethylcyclopentadienyl group, a triethylcyclopentadienyl group, a tetraethylcyclopentadienyl group, a propylcyclopentadienyl group, a dipropylcyclopentadienyl group, a tripropylcyclopentadienyl group, a tetrapropylcyclopentadienyl group, a butylcyclopentadienyl group, a dibutylcyclopentadienyl group, a tributylcyclopentadienyl group, a tetrabutylcyclopentadienyl group, a phenylcyclopentadienyl group, a diphenylcyclopentadienyl group, a naphthylcyclopentadienyl group, a methoxycyclopentadienyl group, a trimethylsilylcyclopentadienyl group, an indenyl group, a methylindenyl group, a dimethylindenyl group, a trimethylindenyl group, a tetramethylindenyl group, a pentamethylindenyl group, a hexamethylindenyl group, an ethylindenyl group, a diethylindenyl group, a triethylindenyl group, a tetraethylindenyl group, a pentaethylindenyl group, a hexaethylindenyl group, a propylindenyl group, a dipropylindenyl group, a tripropylindenyl group, a tetrapropylindenyl group, a pentapropylindenyl group, a hexapropylindenyl group, a butylindenyl group, a dibutylindenyl group, a tributylindenyl group, a tetrabutylindenyl group, a pentabutylindenyl group, a hexabutylindenyl group, a phenylindenyl group, a diphenylindenyl group, a benzoindenyl group, a naphthylindenyl group, a methoxyindenyl group and a trimethylsilylindenyl group.

In the metallocene compound [ingredient (d)] of the general formula (5), $R^8$ includes a fluorenyl group of formula (9) wherein $R^{11}$ independently represents a hydrogen atom, a halogen atom, or a hydrocarbon group having 1 to 20 carbon atoms, which may contain a silicon, nitrogen or oxygen atom. As non-limiting specific examples of $R^8$, there can be mentioned a fluorenyl group, a methylfluorenyl group, a dimethylfluorenyl group, a trimethylfluorenyl group, a tetramethylfluorenyl group, a pentamethylfluorenyl group, a hexamethylfluorenyl group, a heptamethylfluorenyl group, an octamethylfluorenyl group, an ethylfluorenyl group, a diethylfluorenyl group, a triethylfluorenyl group, a tetraethylfluorenyl group, a pentaethylfluorenyl group, a hexaethylfluorenyl group, a heptaethylfluorenyl group, an octaethylfluorenyl group, a propylfluorenyl group, a dipropylfluorenyl group, a tripropylfluorenyl group, a tetrapropylfluorenyl group, a pentapropylfluorenyl group, a hexapropylfluorenyl group, a heptapropylfluorenyl group, an octapropylfluorenyl group, a butylfluorenyl group, a dibutylfluorenyl group, a tributylfluorenyl group, a tetrabutylfluorenyl group, a pentabutylfluorenyl group, a hexabutylfluorenyl group, a heptabutylfluorenyl group, an octabutylfluorenyl group, a phenylfluorenyl group, a diphenylfluorenyl group, a benzofluorenyl group, a dimethylaminofluorenyl group, a bis(dimethylamino)fluorenyl group, a methoxyfluorenyl group and a dimethoxyfluorenyl group.

$R^9$ which crosslinks ligand $R^7$ with ligand $R^8$ is represented by the above-recited general formula (10) wherein $R^{12}$ independently represents a hydrogen atom, a halogen atom, or a hydrocarbon group having 1 to 20 carbon atoms, which may contain a silicon, nitrogen or oxygen atom. Two $R^{12}$s may be bonded with each other to form a ring together with $Y^2$ to which the two $R^{12}$s are bonded.

As specific examples of the hydrocarbon group having 1 to 20 carbon atoms, there can be mentioned a methyl group, an ethyl group, a propyl group, a butyl group, a pentyl group, a hexyl group, a heptyl group, an octyl group, a nonyl group, a decyl group, a norbornyl group, a phenyl group, a styryl group, a biphenyl group, a naphthyl group, a tolyl group, an ethylphenyl group, a propylphenyl group, a butylphenyl group, a dimethylphenyl group, a diethylphenyl group, a dipropylphenyl group, a dibutylphenyl group, a diphenylphenyl group, a trimethylphenyl group, a triethylphenyl group, a tripropylphenyl group, a tributylphenyl group, a benzyl group, a phenylethyl group, a phenylpropyl group, a phenylbutyl group, a diphenylmethyl group, a diphenylethyl group, a diphenylpropyl group, a diphenylbutyl group, a vinyl group, a propenyl group, a butenyl group, a butadienyl group, a pentenyl group, a pentadienyl group, a hexenyl group and a hexadienyl group. As specific examples of the silicon-containing hydrocarbon group having 1 to 20 carbon atoms, there can be mentioned a methylsilyl group, an ethylsilyl group, a propylsilyl group, a butylsilyl group, a pentylsilyl group, a hexylsilyl group, a phenylsilyl group, a benzylsilyl group, a dimethylsilyl group, a diethylsilyl group, a dipropylsilyl group, a dibutylsilyl group, a diphenylsilyl group, a dibenzylsilyl group, a trimethylsilyl group, a triethylsilyl group, a tripropylsilyl group, a tributylsilyl group, a triphenylsilyl group, a dimethylphenylsilyl group, a methyldiphenylsilyl group, a trimethylsilylmethyl group, a trimethylsilylethyl group, a trimethylsilylpropyl group, a trimethylsilylbutyl group, a trimethylsilylphenyl group, a bis(trimethylsilyl)methyl group, a bis(trimethylsilyl)ethyl group, a bis(trimethylsilyl)propyl group, a bis(trimethylsilyl)butyl group, a bis(trimethylsilyl)phenyl group and a triphenylsilylmethyl group. As specific examples of the nitrogen-containing hydrocarbon group having 1 to 20 carbon atoms, there can be mentioned a methylamino group, an ethylamino group, a propylamino group, a butylamino group, a pentylamino group, a hexylamino group, a phenylamino group, a benzylamino group, a phenylethylamino group, a phenylpropylamino group, a phenylbutylamino group, a naphthylamino group, a dimethylamino group, a diethylamino group, a dipropylamino group, a dibutylamino group, a diphenylamino group, a dibenzylamino group, a dimethylaminomethyl group, a dimethylaminoethyl group, a dimethylaminopropyl group, a dimethylaminobutyl group, a dimethylaminophenyl group, a bis(dimethylamino)methyl group, a bis(dimethylamino)ethyl group, a bis(dimethylamino)propyl group, a bis(dimethylamino)butyl group, a bis(dimethylamino)phenyl group, a phenylaminomethyl group, a diphenylaminomethyl group and a diphenylaminophenyl group. As specific examples of the oxygen-containing hydrocarbon group having 1 to 20 carbon atoms, there can be mentioned a methoxy group, an ethoxy group, a propoxy group, a butoxy group, a phenoxy group, a naphthoxy group, a methylphenoxy group, an ethylphenoxy group, a propylphenoxy group, a butylphenoxy group, a biphenoxy group, a methoxymethyl group, an ethoxymethyl group, a propoxymethyl group, a butoxymethyl group, a phenoxymethyl group, a methoxyethyl group, an ethoxyethyl group, a propoxyethyl group, a butoxyethyl group, a phenoxyethyl group, a methoxypropyl group, an ethoxypropyl group, a propoxypropyl group, a butoxypropyl group, a phenoxypropyl group, a methoxybutyl group, an ethoxybutyl group, a propoxybutyl group, a butoxybutyl group, a phenoxybutyl group, a methoxyphenyl group, an ethoxyphenyl group, a propoxyphenyl group, a butoxyphenyl group and a phenoxyphenyl group. $R^{12}$ further include those wherein two $R^{12}$s are bonded with each other to form a ring together with $Y^2$ to which the two $R^{12}$s are bonded.

$Y^2$ in the general formula (10) is an atom of group 14 of the periodic table and includes a carbon atom, a silicon atom, a germanium atom and a tin atom. Of these, a carbon atom and a silicon atom are preferable. m is an integer of 1 to 5.

As non-limiting specific examples of group $R^9$ of the general formula (10), there can be mentioned a methylene group, an ethylidene group, an ethylene group, an propylidene group, a propylene group, a butylidene group, a butylenes group, a pentylidene group, a pentylene group, a hexylidene group, an isopropylidene group, a methylethylmethylene group, a methylpropylmethylene group, a methylbutylmethylene group, a bis (cyclohexyl) methylene group, a methylphenylmethylene group, a diphenylmethylene group, a phenyl(methylphenyl)methylene group, a di(methylphenyl) methylene group, a bis(dimethylphenyl)methylene group, a bis(trimethylphenyl)methylene group, a phenyl(ethylphenyl) methylene group, a di(ethylphenyl) methylene group, a bis (diethylphenyl)methylene group, a phenyl(propylphenyl)methylene group, a di(propylphenyl)methylene group, a bis (dipropylphenyl)methylene group, a phenyl(butylphenyl)methylene group, a di(butylphenyl)methylene group, a phenyl (naphthyl)methylene group, a di(naphthyl)methylene group, a phenyl(biphenyl)methylene group, a di(biphenyl)methylene group, a phenyl(trimethylsilylphenyl)methylene group, a bis(trimethylsilylphenyl)methylene group, a bis(pentafluorophenyl)methylene group, a silanediyl group, a disilanediyl group, a trisilanediyl group, a tetrasilanediyl group, a dimethylsilanediyl group, a bis(dimethylsilane)diyl group, a diethylsilanediyl group, a dipropylsilanediyl group, a dibutylsilanediyl group, a diphenylsilanediyl group, a silacyclobutanediyl group and a silacyclohexanediyl group.

$M^2$ in the general formula (5) is a transition metal of group 3, 4, 5 or 6 of the periodic table and includes a scandium atom, a titanium atom, a zirconium atom, a hafnium atom, vanadium atom, niobium atom, a tantalum atom, a chromium atom, a molybdenum atom and a tungsten atom. Of these, a titanium atom, a zirconium atom and a hafnium atom are preferable. $X^2$ independently represents a hydrogen atom, a halogen atom, or a hydrocarbon group having 1 to 20 carbon atoms, which may contain a silicon, nitrogen or oxygen atom. y is an integer of 0 to 3 which varies depending upon the valence of $M^2$. As specific examples of the hydrocarbon group having 1 to 20 carbon atoms, there can be mentioned a methyl group, an ethyl group, a propyl group, a butyl group, a pentyl group, a hexyl group, a heptyl group, an octyl group, a nonyl group, a decyl group, a norbornyl group, a phenyl group, a styryl group, a biphenyl group, a naphthyl group, a tolyl group, an ethylphenyl group, a propylphenyl group, a butylphenyl group, a dimethylphenyl group, a diethylphenyl group, a dipropylphenyl group, a dibutylphenyl group, a diphenylphenyl group, a trimethylphenyl group, a triethylphenyl group, a tripropylphenyl group, a tributylphenyl group, a benzyl group, a phenylethyl group, a phenylpropyl group, a phenylbutyl group, a diphenylmethyl group, a diphenylethyl group, a diphenylpropyl group, a diphenylbutyl group, a vinyl group, a propenyl group, a butenyl group, a butadienyl group, a pentenyl group, a pentadienyl group, a hexenyl group and a hexadienyl group. As specific examples of the silicon-containing hydrocarbon group having 1 to 20 carbon atoms, there can be mentioned a methylsilyl group, an ethylsilyl group, a propylsilyl group, a butylsilyl group, a pentylsilyl group, a hexylsilyl group, a phenylsilyl group, a benzylsilyl group, a dimethylsilyl group, a diethylsilyl group, a dipropylsilyl group, a dibutylsilyl group, a diphenylsilyl group, a dibenzylsilyl group, a trimethylsilyl group, a triethylsilyl group, a tripropylsilyl group, a tributylsilyl group, a triphenylsilyl group, a dimethylphenylsilyl group, a methyldiphenylsilyl group, a trimethylsilylmethyl group, a trimethylsilylethyl group, a trimethylsilylpropyl group, a trimethylsilylbutyl group, a trimethylsilylphenyl group, a bis (trimethylsilyl)methyl group, a bis(trimethylsilyl)ethyl group, a bis(trimethylsilyl)propyl group, a bis (trimethylsilyl) butyl group, a bis (trimethylsilyl)phenyl group and a triphenylsilylmethyl group. As specific examples of the nitrogen-containing hydrocarbon group having 1 to 20 carbon atoms, there can be mentioned a methylamino group, an ethylamino group, a propylamino group, a butylamino group, a pentylamino group, a hexylamino group, a phenylamino group, a benzylamino group, a phenylethylamino group, a phenylpropylamino group, a phenylbutylamino group, a naphthylamino group, a dimethylamino group, a diethylamino group, a dipropylamino group, a dibutylamino group, a diphenylamino group, a dibenzylamino group, a dimethylaminomethyl group, a dimethylaminoethyl group, a dimethylaminopropyl group, a dimethylaminobutyl group, a dimethylaminophenyl group, a bis(dimethylamino)methyl group, a bis(dimethylamino)ethyl group, a bis(dimethylamino)propyl group, a bis(dimethylamino)butyl group, a bis (dimethylamino)phenyl group, a phenylaminomethyl group, a diphenylaminomethyl group and a diphenylaminophenyl group. As specific examples of the oxygen-containing hydrocarbon group having 1 to 20 carbon atoms, there can be mentioned a methoxy group, an ethoxy group, a propoxy group, a butoxy group, a phenoxy group, a naphthoxy group, a methylphenoxy group, an ethylphenoxy group, a propylphenoxy group, a butylphenoxy group, a biphenoxy group, a methoxymethyl group, an ethoxymethyl group, a propoxymethyl group, a butoxymethyl group, a phenoxymethyl group, a methoxyethyl group, an ethoxyethyl group, a propoxyethyl group, a butoxyethyl group, a phenoxyethyl group, a methoxypropyl group, an ethoxypropyl group, a propoxypropyl group, a butoxypropyl group, a phenoxypropyl group, a methoxybutyl group, an ethoxybutyl group, a propoxybutyl group, a butoxybutyl group, a phenoxybutyl group, a methoxyphenyl group, an ethoxyphenyl group, a propoxyphenyl group, a butoxyphenyl group and a phenoxyphenyl group.

As specific examples of the compounds of the general formula (5), in the case when $M^2$ is a zirconium atom, $X^2$ is a chlorine atom, and a crosslinking group $R^9$ is a diphenylmethylene group, there can be mentioned diphenylmethylene (1-cyclopentadienyl)(9-fluorenyl)zirconium dichloride, diphenylmethylene(2-methyl-1-cyclopentadienyl)(9-fluorenyl)zirconium dichloride, diphenylmethylene(3-methyl-1-cyclopentadienyl)(9-fluorenyl)zirconium dichloride, diphenylmethylene(2,4-dimethyl-1-cyclopentadienyl)(9-fluorenyl)zirconium dichloride, diphenylmethylene(2,5-dimethyl-1-cyclopentadienyl)(9-fluorenyl)zirconium dichloride, diphenylmethylene(3,4-dimethyl-1-cyclopentadienyl)(9-fluorenyl)zirconium dichloride, diphenylmethylene(2,3,4-trimethyl-1-cyclopentadienyl)(9-fluorenyl)zirconium dichloride, diphenylmethylene(2,3,5-trimethyl-1-cyclopentadienyl)(9-fluorenyl)zirconium dichloride, diphenylmethylene-(3,4,5-trimethyl-1-cyclopentadienyl)(9-fluorenyl)zirconium dichloride, diphenylmethylene(2,3,4,5-tetramethyl-1-cyclopentadienyl)(9-fluorenyl) zirconium dichloride, diphenylmethylene (2-ethyl-1-cyclopentadienyl) (9-fluorenyl)zirconium dichloride, diphenylmethylene(3-ethyl-1-cyclopentadienyl)(9-fluorenyl)zirconium dichloride, diphenylmethylene(2,4-diethyl-1-cyclopentadienyl)(9-fluorenyl)zirconium dichloride, diphenylmethylene(2,5-diethyl-1-cyclopentadienyl)(9-fluorenyl)zirconium dichloride, diphenylmethylene(3,4-diethyl-1-cyclopentadienyl)(9-fluorenyl)zirconium dichloride, diphenylmethylene(2,3,4-triethyl-1-cyclopentadienyl)(9-fluorenyl)zirconium dichloride, diphenylmethylene(2,3,5-triethyl-1-cyclopentadienyl)(9-fluorenyl)zirconium dichloride, diphenylmethylene(3,4,5-triethyl-1-cyclopentadienyl)(9-fluorenyl)zirconium dichloride, diphenylmethylene(2,3,4,5-tetraethyl-1-cyclopentadienyl)(9-fluorenyl)zirconium dichloride, diphenylmethylene(2-propyl-1-cyclopentadienyl)-(9-fluorenyl)zirconium dichloride, diphenylmethylene(3-propyl-1-cyclopentadienyl)(9-fluorenyl)zirconium dichloride, diphenylmethylene(2,4-dipropyl-1-cyclopentadienyl)(9-fluorenyl)zirconium dichloride, diphenylmethylene(2,5-dipropyl-1-cyclopentadienyl)(9-fluorenyl)zirconium dichloride, diphenylmethylene(3,4-dipropyl-1-cyclopentadienyl)(9-fluorenyl)zirconium dichloride, diphenylmethylene (2,3,4-tripropyl-1-cyclopentadienyl) (9-fluorenyl)zirconium dichloride, diphenylmethylene(2,3,5-tripropyl-1-cyclopentadienyl)(9-fluorenyl)zirconium dichloride, diphenylmethylene(3,4,5-tripropyl-1-cyclopentadienyl)(9-fluorenyl)zirconium dichloride, diphenylmethylene(2,3,4,5-tetrapropyl-1-cyclopentadienyl)(9-fluorenyl)zirconium dichloride, diphenylmethylene(2-isopropyl-1-cyclopentadienyl)(9-fluorenyl)zirconium dichloride, diphenylmethylene(3-isopropyl-1-cyclopentadienyl)(9-fluorenyl)zirconium dichloride, diphenylmethylene(2,4-diisopropyl-1-cyclopentadienyl)(9-fluorenyl)zirconium dichloride, diphenylmethylene(2,5-diisopropyl-1-cyclopentadienyl)(9-fluorenyl)zirconium dichloride, diphenylmethylene(3,4-diisopropyl-1-cyclopentadienyl)(9-fluorenyl)zirconium dichloride, diphenylmethylene(2,3,4-triisopropyl-1-cyclopentadienyl) (9-fluorenyl)zirconium dichloride, diphenylmethylene(2,3,5-triisopropyl-1-cyclopentadienyl)(9-fluorenyl)zirconium dichloride, diphenylmethylene(3,4,5-triisopropyl-1-cyclopentadienyl) (9-fluorenyl)zirconium dichloride, diphenylmethylene(2,3,4,5-tetraisopropyl-1-cyclopentadienyl) (9-fluorenyl)zirconium dichloride, diphenylmethylene(1-cyclopentadienyl)(9-fluorenyl)zirconium dichloride, diphenylmethylene(2-phenyl-1-cyclopentadienyl)(9-fluorenyl)zirconium dichloride, diphenylmethylene(3-phenyl-1-cyclopentadienyl)(9-fluorenyl) zirconium dichloride, diphenylmethylene(2,4-diphenyl-1-cyclopentadienyl)(9-fluorenyl)zirconium dichloride, diphenylmethylene(2,5-diphenyl-1-cyclopentadienyl)(9-fluorenyl)zirconium dichloride, diphenylmethylene(3,4-diphenyl-1-cyclopentadienyl)(9-fluorenyl)zirconium dichloride, diphenylmethylene(2,3,4-triphenyl-1-cyclopentadienyl)(9-fluorenyl)zirconium dichloride, diphenylmethylene(2,3,5-triphenyl-1-cyclopentadienyl)(9-fluorenyl)zirconium dichloride, diphenylmethylene(3,4,5-triphenyl-1-cyclopentadienyl)(9-fluorenyl)zirconium dichloride, diphenylmethylene(2,3,4,5-tetraphenyl-1-cyclopentadienyl)(9-fluorenyl)zirconium dichloride, diphenylmethylene(2-trimethylsilyl-1-cyclopentadienyl)(9-fluorenyl) zirconium dichloride, diphenylmethylene(3-trimethylsilyl-1-cyclopentadienyl)(9-fluorenyl)zirconium dichloride, diphenylmethylene(2,4-bis(trimethylsilyl)-1-cyclopentadienyl)(9-fluorenyl)zirconium dichloride, diphenylmethylene (2,5-bis(trimethylsilyl)-1-cyclopentadienyl)(9-fluorenyl)zirconium dichloride, diphenylmethylene(3,4-bis(trimethylsilyl)-1-cyclopentadienyl)(9-fluorenyl)zirconium dichloride, diphenylmethylene-(2,3,4-tris(trimethylsilyl)-1-cyclopentadienyl)(9-fluorenyl)zirconium dichloride, diphenylmethylene-(2,3,5-tris(trimethylsilyl)-1-cyclopentadienyl)-(9-fluorenyl)zirconium dichloride, diphenylmethylene (3,4,5-tris(trimethylsilyl)-1-cyclopentadienyl)(9-fluorenyl) zirconium dichloride, diphenylmethylene(2,3,4,5-tetrakis (trimethylsilyl)-1-cyclopentadienyl)(9-fluorenyl)zirconium dichloride, diphenylmethylene(1-cyclopentadienyl)(2,7-dimethyl-9-fluorenyl) zirconium dichloride, diphenylmethylene(2-methyl-1-cyclopentadienyl)(2,7-dimethyl-9-fluorenyl)zirconium dichloride, diphenylmethylene(3-methyl-1-cyclopentadienyl)(2,7-dimethyl-9-fluorenyl)zirconium dichloride, diphenylmethylene(2,4-dimethyl-1-cyclopentadienyl)(2,7-dimethyl-9-fluorenyl)zirconium dichloride, diphenylmethylene(2,5-dimethyl-1-cyclopentadienyl)(2,7-dimethyl-9-fluorenyl)zirconium dichloride, diphenylmethylene(3,4-dimethyl-1-cyclopentadienyl)(2,7-dimethyl-9-fluorenyl)zirconium dichloride, diphenylmethylene(2,3,4-trimethyl-1-cyclopentadienyl)(2,7-dimethyl-9-fluorenyl)zirconium dichloride, diphenylmethylene(2,3,5-trimethyl-1-cyclopentadienyl)(2,7-dimethyl-9-fluorenyl)zirconium dichloride, diphenylmethylene(3,4,5-trimethyl-1-cyclopentadienyl)(2,7-dimethyl-9-fluorenyl)zirconium dichloride, diphenylmethylene(2,3,4,5-tetramethyl-1-cyclopentadienyl)(2,7-dimethyl-9-fluorenyl)zirconium dichloride, diphenylmethylene(2-ethyl-1-cyclopentadienyl)(2,7-dimethyl-9-fluorenyl)zirconium dichloride, diphenylmethylene(3-ethyl-1-cyclopentadienyl)(2,7-dimethyl-9-fluorenyl)zirconium dichloride, diphenylmethylene(2,4-diethyl-1-cyclopentadienyl)(2,7-dimethyl-9-fluorenyl)zirconium dichloride, diphenylmethylene(2,5-diethyl-1-cyclopentadienyl)(2,7-dimethyl-9-fluorenyl)zirconium dichloride, diphenylmethylene (3,4-diethyl-1-cyclopentadienyl)(2,7-dimethyl-9-fluorenyl) zirconium dichloride, diphenylmethylene(2,3,4-triethyl-1-cyclopentadienyl)(2,7-dimethyl-9-fluorenyl)zirconium dichloride, diphenylmethylene(2,3,5-triethyl-1-cyclopentadienyl)(2,7-dimethyl-9-fluorenyl)zirconium dichloride, diphenylmethylene(3,4,5-triethyl-1-cyclopentadienyl)(2,7-dimethyl-9-fluorenyl)zirconium dichloride, diphenylmethylene(2,3,4,5-tetraethyl-1-cyclopentadienyl)(2,7-dimethyl-9-fluorenyl)zirconium dichloride, diphenylmethylene(2-propyl-1-cyclopentadienyl)(2,7-dimethyl-9-fluorenyl) zirconium dichloride, diphenylmethylene(3-propyl-1-cyclopentadienyl)(2,7-dimethyl-9-fluorenyl)zirconium dichloride, diphenylmethylene(2,4-dipropyl-1-cyclopentadienyl)(2,7-dimethyl-9-fluorenyl)zirconium dichloride, diphenylmethylene(2,5-dipropyl-1-cyclopentadienyl)(2,7-dimethyl-9-fluorenyl)zirconium dichloride, diphenylmethylene (3,4-dipropyl-1-cyclopentadienyl)(2,7-dimethyl-9-fluorenyl)zirconium dichloride, diphenylmethylene(2,3,4-tripropyl-1-cyclopentadienyl)(2,7-dimethyl-9-fluorenyl)zirconium dichloride, diphenylmethylene(2,3,5-tripropyl-1-cyclopentadienyl)(2,7-dimethyl-9-fluorenyl)zirconium dichloride, diphenylmethylene(3,4,5-tripropyl-1-cyclopentadienyl)(2,7-dimethyl-9-fluorenyl)zirconium dichloride, diphenylmethylene(2,3,4,5-tetrapropyl-1-cyclopentadienyl) (2,7-dimethyl-9-fluorenyl)zirconium dichloride, diphenylmethylene(2-isopropyl-1-cyclopentadienyl)(2,7-dimethyl-9-fluorenyl)zirconium dichloride, diphenylmethylene(3-isopropyl-1-cyclopentadienyl)(2,7-dimethyl-9-fluorenyl)zirconium dichloride, diphenylmethylene(2,4-diisopropyl-1-cyclopentadienyl)(2,7-dimethyl-9-fluorenyl)zirconium dichloride, diphenylmethylene(2,5-diisopropyl-1-cyclopentadienyl)(2,7-dimethyl-9-fluorenyl)zirconium dichloride, diphenylmethylene(3,4-diisopropyl-1-cyclopentadienyl)(2,7-dimethyl-9-fluorenyl)zirconium dichloride, diphenylmethylene(2,3,4-triisopropyl-1-cyclopentadienyl)(2,7-dimethyl-9-fluorenyl)zirconium dichloride, diphenylmethylene(2,3,5-triisopropyl-1-cyclopentadienyl)(2,7-dimethyl-9-fluorenyl) zirconium dichloride, diphenylmethylene(3,4,5-triisopropyl-1-cyclopentadienyl)(2,7-dimethyl-9-fluorenyl)zirconium dichloride, diphenylmethylene(2,3,4,5-tetraisopropyl-1-cyclopentadienyl)(2,7-dimethyl-9-fluorenyl)zirconium dichloride, diphenylmethylene(2-phenyl-1-cyclopentadienyl)(2,7-dimethyl-9-fluorenyl)zirconium dichloride, diphenylmethylene(3-phenyl-1-cyclopentadienyl)(2,7-dimethyl-9-fluorenyl)zirconium dichloride, diphenylmethylene (2,4-diphenyl-1-cyclopentadienyl)(2,7-dimethyl-9-fluorenyl)zirconium dichloride, diphenylmethylene(2,5-diphenyl-1-cyclopentadienyl)(2,7-dimethyl-9-fluorenyl)zirconium dichloride, diphenylmethylene(3,4-diphenyl-1-cyclopentadienyl)(2,7-dimethyl-9-fluorenyl)zirconium dichloride, diphenylmethylene(2,3,4-triphenyl-1-cyclopentadienyl)(2,7-dimethyl-9-fluorenyl)zirconium dichloride, diphenylmethylene(2,3,5-triphenyl-1-cyclopentadienyl)(2,7-dimethyl-9- fluorenyl)zirconium dichloride, diphenylmethylene(3,4,5-triphenyl-1-cyclopentadienyl)(2,7-dimethyl-9-fluorenyl)zirconium dichloride, diphenylmethylene(2,3,4,5-tetraphenyl-1-cyclopentadienyl)(2,7-dimethyl-9-fluorenyl)zirconium dichloride, diphenylmethylene(2-trimethylsilyl-1-cyclopentadienyl)(2,7-dimethyl-9-fluorenyl)zirconium dichloride, diphenylmethylene(3-trimethylsilyl-1-cyclopentadienyl)(2,7-dimethyl-9-fluorenyl)zirconium dichloride, diphenylmethylene(2,4-bis(trimethylsilyl)-1-cyclopentadienyl)(2,7-dimethyl-9-fluorenyl)zirconium dichloride, diphenylmethylene(2,5-bis(trimethylsilyl)-1-cyclopentadienyl)(2,7-dimethyl-9-fluorenyl)zirconium dichloride, diphenylmethylene(3,4-bis(trimethylsilyl)-1-cyclopentadienyl)(2,7-dimethyl-9-fluorenyl)zirconium dichloride, diphenylmethylene(2,3,4-tris(trimethylsilyl)-1-cyclopentadienyl)(2,7-dimethyl-9-fluorenyl)zirconium dichloride, diphenylmethylene(2,3,5-tris(trimethylsilyl)-1-cyclopentadienyl)(2,7-dimethyl-9-fluorenyl)zirconium dichloride, diphenylmethylene(3,4,5-tris(trimethylsilyl)-1-cyclopentadienyl)(2,7-dimethyl-9-fluorenyl)zirconium dichloride, diphenylmethylene(2,3,4,5-tetrakis(trimethylsilyl)1-cyclopentadienyl)(2,7-dimethyl-9-fluorenyl)zirconium dichloride, Diphenylmethylene(1-cyclopentadienyl)(2,7-diethyl-9-fluorenyl)zirconium dichloride, diphenylmethylene(2-methyl-1-cyclopentadienyl)(2,7-diethyl-9-fluorenyl)zirconium dichloride, diphenylmethylene(3-methyl-1-cyclopentadienyl)(2,7-diethyl-9-fluorenyl)zirconium dichloride, diphenylmethylene(2,4-dimethyl-1-cyclopentadienyl)(2,7-diethyl-9-fluorenyl)zirconium dichloride, diphenylmethylene(2,5-dimethyl-1-cyclopentadienyl)(2,7-diethyl-9-fluorenyl)zirconium dichloride, diphenylmethylene(3,4-dimethyl-1-cyclopentadienyl)(2,7-diethyl-9-fluorenyl)zirconium dichloride, diphenylmethylene(2,3,4-trimethyl-1-cyclopentadienyl)(2,7-diethyl-9-fluorenyl)zirconium dichloride, diphenylmethylene(2,3,5-trimethyl-1-cyclopentadienyl)(2,7-diethyl-9-fluorenyl)zirconium dichloride, diphenylmethylene(3,4,5-trimethyl-1-cyclopentadienyl)(2,7-diethyl-9-fluorenyl)zirconium dichloride, diphenylmethylene(2,3,4,5-tetramethyl-1-cyclopentadienyl)(2,7-diethyl-9-fluorenyl)zirconium dichloride, diphenylmethylene(2-ethyl-1-cyclopentadienyl)(2,7-diethyl-9-fluorenyl)zirconium dichloride, diphenylmethylene(3-ethyl-1-cyclopentadienyl)(2,7-diethyl-9-fluorenyl)zirconium dichloride, diphenylmethylene-(2,4-diethyl-1-cyclopentadienyl)(2,7-diethyl-9-fluorenyl)zirconium dichloride, diphenylmethylene(2,5-diethyl-1-cyclopentadienyl)(2,7-diethyl-9-fluorenyl)zirconium dichloride, diphenylmethylene(3,4-diethyl-1-cyclopentadienyl)(2,7-diethyl-9-fluorenyl)zirconium dichloride, diphenylmethylene(2,3,4-triethyl-1-cyclopentadienyl)(2,7-diethyl-9-fluorenyl)zirconium dichloride, diphenylmethylene(2,3,5-triethyl-1-cyclopentadienyl)(2,7-diethyl-9-fluorenyl)zirconium dichloride, diphenylmethylene(3,4,5-triethyl-1-cyclopentadienyl)(2,7-diethyl-9-fluorenyl)zirconium dichloride, diphenylmethylene(2,3,4,5-tetraethyl-1-cyclopentadienyl)(2,7-diethyl-9-fluorenyl)zirconium dichloride, diphenylmethylene(2-propyl-1-cyclopentadienyl)(2,7-diethyl-9-fluorenyl)zirconium dichloride, diphenylmethylene(3-propyl-1-cyclopentadienyl)(2,7-diethyl-9-fluorenyl)zirconium dichloride, diphenylmethylene(2,4-dipropyl-1-cyclopentadienyl)(2,7-diethyl-9-fluorenyl)zirconium dichloride, diphenylmethylene(2,5-dipropyl-1-cyclopentadienyl)(2,7-diethyl-9-fluorenyl)zirconium dichloride, diphenylmethylene(3,4-dipropyl-1-cyclopentadienyl)(2,7-diethyl-9-fluorenyl)zirconium dichloride, diphenylmethylene(2,3,4-tripropyl-1-cyclopentadienyl)(2,7-diethyl-9-fluorenyl)zirconium dichloride, diphenylmethylene(2,3,5-tripropyl-1-cyclopentadienyl)(2,7-diethyl-9-fluorenyl)zirconium dichloride, diphenylmethylene(3,4,5-tripropyl-1-cyclopentadienyl)(2,7-diethyl-9-fluorenyl)zirconium dichloride, diphenylmethylene(2,3,4,5-tetrapropyl-1-cyclopentadienyl)(2,7-diethyl-9-fluorenyl)zirconium dichloride, diphenylmethylene(2-isopropyl-1-cyclopentadienyl)(2,7-diethyl-9-fluorenyl)zirconium dichloride, diphenylmethylene(3-isopropyl-1-cyclopentadienyl)(2,7-diethyl-9-fluorenyl)zirconium dichloride, diphenylmethylene(2,4-diisopropyl-1-cyclopentadienyl)(2,7-diethyl-9-fluorenyl)zirconium dichloride, diphenylmethylene(2,5-diisopropyl-1-cyclopentadienyl)(2,7-diethyl-9-fluorenyl)zirconium dichloride, diphenylmethylene(3,4-diisopropyl-1-cyclopentadienyl)(2,7-diethyl-9-fluorenyl)zirconium dichloride, diphenylmethylene(2,3,4-triisopropyl-1-cyclopentadienyl)(2,7-diethyl-9-fluorenyl)zirconium dichloride, diphenylmethylene(2,3,5-triisopropyl-1-cyclopentadienyl)(2,7-diethyl-9-fluorenyl)zirconium dichloride, diphenylmethylene(3,4,5-triisopropyl-1-cyclopentadienyl)(2,7-diethyl-9-fluorenyl)zirconium dichloride, diphenylmethylene(2,3,4,5-tetraisopropyl-1-cyclopentadienyl)(2,7-diethyl-9-fluorenyl)zirconium dichloride, diphenylmethylene(2-phenyl-1-cyclopentadienyl)(2,7-diethyl-9-fluorenyl)zirconium dichloride, diphenylmethylene(3-phenyl-1-cyclopentadienyl)(2,7-diethyl-9-fluorenyl)zirconium dichloride, diphenylmethylene(2,4-diphenyl-1-cyclopentadienyl)(2,7-diethyl-9-fluorenyl)zirconium dichloride, diphenylmethylene(2,5-diphenyl-1-cyclopentadienyl)(2,7-diethyl-9-fluorenyl)zirconium dichloride, diphenylmethylene(3,4-diphenyl-1-cyclopentadienyl) (2,7-diethyl-9-fluorenyl) zirconium dichloride, diphenylmethylene (2,3,4-triphenyl-1-cyclopentadienyl) (2,7-diethyl-9-fluorenyl) zirconium dichloride, diphenylmethylene (2,3,5-triphenyl-1-cyclopentadienyl) (2,7-diethyl-9-fluorenyl) zirconium dichloride, diphenylmethylene(3,4,5-triphenyl-1-cyclopentadienyl)(2,7-diethyl-9-fluorenyl)zirconium dichloride, diphenylmethylene(2,3,4,5-tetraphenyl-1-cyclopentadienyl)(2,7-diethyl-9-fluorenyl)zirconium dichloride, diphenylmethylene(2-trimethylsilyl-1-cyclopentadienyl)(2,7-diethyl-9-fluorenyl)zirconium dichloride, diphenylmethylene(3-trimethylsilyl-1-cyclopentadienyl)(2,7-diethyl-9-fluorenyl)zirconium dichloride, diphenylmethylene(2,4-bis (trimethylsilyl)-1-cyclopentadienyl)(2,7-diethyl-9-fluorenyl)zirconium dichloride, diphenylmethylene(2,5-bis(trimethylsilyl)-1-cyclopentadienyl)(2,7-diethyl-9-fluorenyl)zirconium dichloride, diphenylmethylene(3,4-bis(trimethylsilyl)-1-cyclopentadienyl)(2,7-diethyl-9-fluorenyl)zirconium dichloride, diphenylmethylene(2,3,4-tris(trimethylsilyl)-1-cyclopentadienyl)(2,7-diethyl-9-fluorenyl)zirconium dichloride, diphenylmethylene(2,3,5-tris(trimethylsilyl)-1-cyclopentadienyl)(2,7-diethyl-9-fluorenyl)zirconium dichloride, diphenylmethylene(3,4,5-tris(trimethylsilyl)-1-cyclopentadienyl)(2,7-diethyl-9-fluorenyl)zirconium dichloride, diphenylmethylene(2,3,4,5-tetrakis(trimethylsilyl)-1-cyclopentadienyl)(2,7-diethyl-9-fluorenyl)zirconium dichloride, diphenylmethylene(1-cyclopentadienyl) (2,7-di-t-butyl-9-fluorenyl) zirconium dichloride, diphenylmethylene(2-methyl-1-cyclopentadienyl)(2,7-di-t-butyl-9-fluorenyl)zirconium dichloride, diphenylmethylene(3-methyl-1-cyclopentadienyl)(2,7-dit-butyl-9-fluorenyl)zirconium dichloride, diphenylmethylene(2,4-dimethyl-1-cyclopentadienyl)(2,7-di-t-butyl-9-fluorenyl)zirconium dichloride, diphenylmethylene(2,5-dimethyl-1-cyclopentadienyl)(2,7-di-t-butyl-9-fluorenyl)zirconium dichloride, diphenylmethylene(3,4-dimethyl-1-cyclopentadienyl)(2,7-di-t-butyl-9-fluorenyl)zirconium dichloride, diphenylmethylene(2,3,4-trimethyl-1-cyclopentadienyl)(2,7-di-t-butyl-9-fluorenyl)zirconium dichloride, diphenylmethylene(2,3,5-trimethyl-1- cyclopentadienyl)(2,7-di-t-butyl-9-fluorenyl)zirconium dichloride, diphenylmethylene(3,4,5-trimethyl-1-cyclopentadienyl)(2,7-di-t-butyl-9-fluorenyl)zirconium dichloride, diphenylmethylene(2,3,4,5-tetramethyl-1-cyclopentadienyl)(2,7-di-t-butyl-9-fluorenyl)zirconium dichloride, diphenylmethylene(2-ethyl-1-cyclopentadienyl)(2,7-di-t-butyl-9-fluorenyl)zirconium dichloride, diphenylmethylene(3-ethyl-1-cyclopentadienyl)(2,7-di-t-butyl-9-fluorenyl)zirconium dichloride, diphenylmethylene(2,4-diethyl-1-cyclopentadienyl)(2,7-di-t-butyl-9-fluorenyl) zirconium dichloride, diphenylmethylene(2,5-diethyl-1-cyclopentadienyl)(2,7-di-t-butyl-9-fluorenyl)zirconium dichloride, diphenylmethylene(3,4-diethyl-1-cyclopentadienyl)(2,7-di-t-butyl-9-fluorenyl)zirconium dichloride, diphenylmethylene(2,3,4-triethyl-1-cyclopentadienyl)(2,7-di-t-butyl-9-fluorenyl)zirconium dichloride, diphenylmethylene(2,3,5-triethyl-1-cyclopentadienyl)(2,7-di-t-butyl-9-fluorenyl)zirconium dichloride, diphenylmethylene(3,4,5-triethyl-1-cyclopentadienyl)(2,7-di-t-butyl-9-fluorenyl)zirconium dichloride, diphenylmethylene(2,3,4,5-tetraethyl-1-cyclopentadienyl)(2,7-di-t-butyl-9-fluorenyl)zirconium dichloride, diphenylmethylene(2-propyl-1-cyclopentadienyl)(2,7-di-t-butyl-9-fluorenyl)zirconium dichloride, diphenylmethylene(3-propyl-1-cyclopentadienyl)(2,7-di-t-butyl-9-fluorenyl)zirconium dichloride, diphenylmethylene(2,4-dipropyl-1-cyclopentadienyl)(2,7-di-t-butyl-9-fluorenyl)zirconium dichloride, diphenylmethylene(2,5-dipropyl-1-cyclopentadienyl)(2,7-di-t-butyl-9-fluorenyl)zirconium dichloride, diphenylmethylene(3,4-dipropyl-1-cyclopentadienyl)(2,7-di-t-butyl-9-fluorenyl)zirconium dichloride, diphenylmethylene(2,3,4-tripropyl-1-cyclopentadienyl)(2,7-di-t-butyl-9-fluorenyl) zirconium dichloride, diphenylmethylene(2,3,5-tripropyl-1-cyclopentadienyl)(2,7-di-t-butyl-9-fluorenyl)zirconium dichloride, diphenylmethylene(3,4,5-tripropyl-1-cyclopentadienyl)(2,7-di-t-butyl-9-fluorenyl)zirconium dichloride, diphenylmethylene(2,3,4,5-tetrapropyl-1-cyclopentadienyl)(2,7-di-t-butyl-9-fluorenyl)zirconium dichloride, diphenylmethylene(2-isopropyl-1-cyclopentadienyl)(2,7-di-t-butyl-9-fluorenyl)zirconium dichloride, diphenylmethylene(3-isopropyl-1-cyclopentadienyl)(2,7-di-t-butyl-9-fluorenyl)zirconium dichloride, diphenylmethylene(2,4-diisopropyl-1-cyclopentadienyl)(2,7-di-t-butyl-9-fluorenyl)zirconium dichloride, diphenylmethylene(2,5-diisopropyl-1-cyclopentadienyl)(2,7-di-t-butyl-9-fluorenyl)zirconium dichloride, diphenylmethylene(3,4-diisopropyl-1-cyclopentadienyl)(2,7-di-t-butyl-9-fluorenyl)zirconium dichloride, diphenylmethylene(2,3,4-triisopropyl-1-cyclopentadienyl)(2,7-di-t-butyl-9-fluorenyl)zirconium dichloride, diphenylmethylene(2,3,5-triisopropyl-1-cyclopentadienyl)(2,7-di-t-butyl-9-fluorenyl)zirconium dichloride, diphenylmethylene(3,4,5-triisopropyl-1-cyclopentadienyl)(2,7-di-t-butyl-9-fluorenyl) zirconium dichloride, diphenylmethylene(2,3,4,5-tetraisopropyl-1-cyclopentadienyl)(2,7-di-t-butyl-9-fluorenyl)zirconium dichloride, diphenylmethylene(2-phenyl-1-cyclopentadienyl)(2,7-di-t-butyl-9-fluorenyl)zirconium dichloride, diphenylmethylene(3-phenyl-1-cyclopentadienyl)(2,7-di-t-butyl-9-fluorenyl)zirconium dichloride, diphenylmethylene(2,4-diphenyl-1-cyclopentadienyl)(2,7-di-t-butyl-9-fluorenyl)zirconium dichloride, diphenylmethylene(2,5-diphenyl-1-cyclopentadienyl)(2,7-di-t-butyl-9-fluorenyl)zirconium dichloride, diphenylmethylene(3,4-diphenyl-1-cyclopentadienyl)(2,7-di-t-butyl-9-fluorenyl)zirconium dichloride, diphenylmethylene(2,3,4-triphenyl-1-cyclopentadienyl)(2,7-di-t-butyl-9-fluorenyl) zirconium dichloride, diphenylmethylene(2,3,5-triphenyl-1-cyclopentadienyl)(2,7-di-t-butyl-9-fluorenyl)zirconium dichloride, diphenylmethylene(3,4,5-triphenyl-1-cyclopentadienyl)(2,7-di-t-butyl-9-fluorenyl)zirconium dichloride, diphenylmethylene(2,3,4,5-tetraphenyl-1-cyclopentadienyl)(2,7-di-t-butyl-9-fluorenyl)zirconium dichloride, diphenylmethylene(2-trimethylsilyl-1-cyclopentadienyl)(2,7-di-t-butyl-9-fluorenyl)zirconium dichloride, diphenylmethylene(3-trimethylsilyl-1-cyclopentadienyl)(2,7-di-t-butyl-9-fluorenyl)zirconium dichloride, diphenylmethylene(2,4-bis(trimethylsilyl)-1-cyclopentadienyl)(2,7-di-t-butyl-9-fluorenyl)zirconium dichloride, diphenylmethylene(2,5-bis(trimethylsilyl)-1-cyclopentadienyl)(2,7-di-t-butyl-9-fluorenyl)zirconium dichloride, diphenylmethylene(3,4-bis(trimethylsilyl)-1-cyclopentadienyl)(2,7-di-t-butyl-9-fluorenyl)zirconium dichloride, diphenylmethylene(2,3,4-tris(trimethylsilyl)-1-cyclopentadienyl)(2,7-di-t-butyl-9-fluorenyl)zirconium dichloride, diphenylmethylene(2,3,5-tris(trimethylsilyl)-1-cyclopentadienyl)(2,7-di-t-butyl-9-fluorenyl)zirconium dichloride, diphenylmethylene(3,4,5-tris(trimethylsilyl)-1-cyclopentadienyl)(2,7-di-t-butyl-9-fluorenyl)zirconium dichloride, diphenylmethylene(2,3,4,5-tetrakis(trimethylsilyl) 1-cyclopentadienyl)(2,7-di-t-butyl-9-fluorenyl)zirconium dichloride, diphenylmethylene(1-indenyl)(9-fluorenyl)zirconium dichloride, diphenylmethylene(2-methyl-1-indenyl)(9-fluorenyl)zirconium dichloride, diphenylmethylene(3-methyl-1-indenyl)(9-fluorenyl)zirconium dichloride, diphenylmethylene(4-methyl-1-indenyl)(9-fluorenyl)zirconium dichloride; diphenylmethylene(5-methyl-1-indenyl)(9-fluorenyl)zirconium dichloride, diphenylmethylene(6-methyl-1-indenyl)(9-fluorenyl)zirconium dichloride, diphenylmethylene(7-methyl-1-indenyl)(9-fluorenyl)zirconium dichloride, diphenylmethylene(2-phenyl-1-indenyl)(9-fluorenyl)zirconium dichloride, diphenylmethylene-(3-phenyl-1-indenyl)(9-fluorenyl)zirconium dichloride, diphenylmethylene(4-phenyl-1-indenyl)(9-fluorenyl)zirconium dichloride, diphenylmethylene(5-phenyl-1-indenyl)(9-fluorenyl)zirconium dichloride, diphenylmethylene(6-phenyl-1-indenyl)(9-fluorenyl)zirconium dichloride, diphenylmethylene(7-phenyl-1-indenyl)(9-fluorenyl)zirconium dichloride, diphenylmethylene(2,3-dimethyl-1-indenyl)(9-fluorenyl) zirconium dichloride, diphenylmethylene(2,3-dimethyl-1-indenyl)(9-fluorenyl)zirconium dichloride, diphenylmethylene(2,4-dimethyl-1-indenyl)(9-fluorenyl)zirconium dichloride, diphenylmethylene(2,5-dimethyl-1-indenyl)(9-fluorenyl)zirconium dichloride, diphenylmethylene(2,6-dimethyl-1-indenyl)(9-fluorenyl)zirconium dichloride, diphenylmethylene(2,7-dimethyl-1-indenyl)(9-fluorenyl) zirconium dichloride, diphenylmethylene(3,4-dimethyl-1-indenyl)(9-fluorenyl)zirconium dichloride, diphenylmethylene(3,5-dimethyl-1-indenyl)(9-fluorenyl)zirconium dichloride, diphenylmethylene(3,6-dimethyl-1-indenyl)(9-fluorenyl)zirconium dichloride, diphenylmethylene(3,7-dimethyl-1-indenyl)(9-fluorenyl)zirconium dichloride, diphenylmethylene(4,5-dimethyl-1-indenyl)(9-fluorenyl) zirconium dichloride, diphenylmethylene (4,6-dimethyl-1-indenyl)(9-fluorenyl)zirconium dichloride, diphenylmethylene(4,7-dimethyl-1-indenyl)(9-fluorenyl)zirconium dichloride, diphenylmethylene(5,6-dimethyl-1-indenyl)(9-fluorenyl)zirconium dichloride, diphenylmethylene(5,7-dimethyl-1-indenyl)(9-fluorenyl) zirconium dichloride, diphenylmethylene(6,7-dimethyl-1-indenyl)(9-fluorenyl) zirconium dichloride, diphenylmethylene(2-methyl-4-phenyl-1-indenyl)(9-fluorenyl)zirconium dichloride, diphenylmethylene(2-methyl-4,5-benzo-1-indenyl)(9-fluorenyl) zirconium dichloride, diphenylmethylene(2-methyl-5,6-benzo-1-indenyl)(9-fluorenyl)zirconium dichloride, diphenylmethylene(2-methyl-4-(α-naphthyl)-1-indenyl)(9-fluorenyl)zirconium dichloride, diphenylmethylene(2-methyl-4-(β-naphthyl)-1-indenyl)(9-fluorenyl)zirconium dichloride, diphenylmethylene(1-indenyl)(2,7-dimethyl-9-fluorenyl)zirconium dichloride, diphenylmethylene(2-methyl-1-indenyl)(2,7-dimethyl-9-fluorenyl)zirconium dichloride, diphenylmethylene(3-methyl-1-indenyl)(2,7-dimethyl-9-fluorenyl) zirconium dichloride, diphenylmethylene (4-methyl-1-indenyl)(2,7-dimethyl-9-fluorenyl)zirconium dichloride, diphenylmethylene(5-methyl-1-indenyl)(2,7-dimethyl-9-fluorenyl)zirconium dichloride, diphenylmethylene(6-methyl-1-indenyl)(2,7-dimethyl-9-fluorenyl)zirconium dichloride, diphenylmethylene(7-methyl-1-indenyl)(2,7-dimethyl-9-fluorenyl)zirconium dichloride, diphenylmethylene(2-phenyl-1-indenyl)(2,7-dimethyl-9-fluorenyl)zirconium dichloride, diphenylmethylene(3-phenyl-1-indenyl)(2,7-dimethyl-9-fluorenyl) zirconium dichloride, diphenylmethylene (4-phenyl-1-indenyl)(2,7-dimethyl-9-fluorenyl)zirconium dichloride, diphenylmethylene(5-phenyl-1-indenyl)(2,7-dimethyl-9-fluorenyl) zirconium dichloride, diphenylmethylene(6-phenyl-1-indenyl)(2,7-dimethyl-9-fluorenyl)zirconium dichloride, diphenylmethylene(7-phenyl-1-indenyl)(2,7-dimethyl-9-fluorenyl)zirconium dichloride, diphenylmethylene(2,3-dimethyl-1-indenyl)(2,7-dimethyl-9-fluorenyl)zirconium dichloride, diphenylmethylene(2,4-dimethyl-1-indenyl)(2,7-dimethyl-9-fluorenyl)zirconium dichloride, diphenylmethylene(2,5-dimethyl-1-indenyl)(2,7-dimethyl-9-fluorenyl)zirconium dichloride, diphenylmethylene(2,6-dimethyl-1-indenyl)(2,7-dimethyl-9-fluorenyl)zirconium dichloride, diphenylmethylene(2,7-dimethyl-1-indenyl)(2,7-dimethyl-9-fluorenyl)zirconium dichloride, diphenylmethylene(3,4-dimethyl-1-indenyl)(2,7-dimethyl-9-fluorenyl)zirconium dichloride, diphenylmethylene(3,5-dimethyl-1-indenyl)(2,7-dimethyl-9-fluorenyl)zirconium dichloride, diphenylmethylene(3,6-dimethyl-1-indenyl)(2,7-dimethyl-9-fluorenyl)zirconium dichloride, diphenylmethylene(3,7-dimethyl-1-indenyl)(2,7-dimethyl-9-fluorenyl)zirconium dichloride, diphenylmethylene(4,5-dimethyl-1-indenyl)(2,7-dimethyl-9-fluorenyl)zirconium dichloride, diphenylmethylene(4,6-dimethyl-1-indenyl)(2,7-dimethyl-9-fluorenyl)zirconium dichloride, diphenylmethylene(4,7-dimethyl-1-indenyl)(2,7-dimethyl-9-fluorenyl)zirconium dichloride, diphenylmethylene(5,6-dimethyl-1-indenyl)(2,7-dimethyl-9-fluorenyl)zirconium dichloride, diphenylmethylene(5,7-dimethyl-1-indenyl)(2,7-dimethyl-9-fluorenyl)zirconium dichloride, diphenylmethylene(6,7-dimethyl-1-indenyl)(2,7-dimethyl-9-fluorenyl)zirconium dichloride, diphenylmethylene(2-methyl-4-phenyl-1-indenyl)(2,7-dimethyl-9-fluorenyl)zirconium dichloride, diphenylmethylene(2-methyl-4,5-benzo-1-indenyl)(2,7-dimethyl-9-fluorenyl)zirconium dichloride, diphenylmethylene(2-methyl-5,6-benzo-1-indenyl)(2,7-dimethyl-9-fluorenyl)zirconium dichloride, diphenylmethylene (2-methyl-4-(α-naphthyl)-1-indenyl)(2,7-dimethyl-9-fluorenyl) zirconium dichloride, diphenylmethylene (2-methyl-4-(β-naphthyl)-1-indenyl)(2,7-dimethyl-9-fluorenyl)zirconium dichloride, diphenylmethylene(1-indenyl)(2,7-diethyl-9-fluorenyl)zirconium dichloride, diphenylmethylene(2-methyl-1-indenyl)(2,7-diethyl-9-fluorenyl)zirconium dichloride, diphenylmethylene(3-methyl-1-indenyl)(2,7-diethyl-9-fluorenyl) zirconium dichloride, diphenylmethylene(4-methyl-1-indenyl) (2,7-diethyl-9-fluorenyl)zirconium dichloride, diphenylmethylene(5-methyl-1-indenyl)(2,7-diethyl-9-fluorenyl)zirconium dichloride, diphenylmethylene (6-methyl-1-indenyl)(2,7-diethyl-9-fluorenyl)zirconium dichloride, diphenylmethylene(7-methyl-1-indenyl)(2,7-diethyl-9-fluorenyl)zirconium dichloride, diphenylmethylene (2-phenyl-1-indenyl)(2,7-diethyl-9-fluorenyl) zirconium dichloride, diphenylmethylene(3-phenyl-1-indenyl)(2,7-diethyl-9-fluorenyl)zirconium dichloride, diphenylmethylene (4-phenyl-1-indenyl)(2,7-diethyl-9-fluorenyl)zirconium dichloride, diphenylmethylene(5-phenyl-1-indenyl)(2,7-diethyl-9-fluorenyl)zirconium dichloride, diphenylmethylene (6-phenyl-1-indenyl)(2,7-diethyl-9-fluorenyl)zirconium dichloride, diphenylmethylene(7-phenyl-1-indenyl)(2,7-diethyl-9-fluorenyl)zirconium dichloride, diphenylmethylene (2,3-dimethyl-1-indenyl)(2,7-diethyl-9-fluorenyl)zirconium dichloride, diphenylmethylene(2,4-dimethyl-1-indenyl)(2,7-diethyl-9-fluorenyl)zirconium dichloride, diphenylmethylene(2,5-dimethyl-1-indenyl)(2,7-diethyl-9-fluorenyl)zirconium dichloride, diphenylmethylene(2,6-dimethyl-1-indenyl)(2,7-diethyl-9-fluorenyl)zirconium dichloride, diphenylmethylene(2,7-dimethyl-1-indenyl)(2,7-diethyl-9-fluorenyl)zirconium dichloride, diphenylmethylene(3,4-dimethyl-1-indenyl)(2,7-diethyl-9-fluorenyl)zirconium dichloride, diphenylmethylene(3,5-dimethyl-1-indenyl)(2,7-diethyl-9-fluorenyl)zirconium dichloride, diphenylmethylene(3,6-dimethyl-1-indenyl)(2,7-diethyl-9-fluorenyl)zirconium dichloride, diphenylmethylene(3,7-dimethyl-1-indenyl)(2,7-diethyl-9-fluorenyl)zirconium dichloride, diphenylmethylene(4,5-dimethyl-1-indenyl)(2,7-diethyl-9-fluorenyl)zirconium dichloride, diphenylmethylene(4,6-dimethyl-1-indenyl)(2,7-diethyl-9-fluorenyl)zirconium dichloride, diphenylmethylene(4,7-dimethyl-1-indenyl)(2,7-diethyl-9-fluorenyl)zirconium dichloride, diphenylmethylene(5,6-dimethyl-1-indenyl)(2,7-diethyl-9-fluorenyl)zirconium dichloride, diphenylmethylene(5,7-dimethyl-1-indenyl)(2,7-diethyl-9-fluorenyl)zirconium dichloride, diphenylmethylene(6,7-dimethyl-1-indenyl)(2,7-diethyl-9-fluorenyl)zirconium dichloride, diphenylmethylene(2-methyl-4-phenyl-1-indenyl)(2,7-diethyl-9-fluorenyl) zirconium dichloride, diphenylmethylene(2-methyl-4,5-benzo-1-indenyl)(2,7-diethyl-9-fluorenyl)zirconium dichloride, diphenylmethylene(2-methyl-5,6-benzo-1-indenyl)(2,7-diethyl-9-fluorenyl)zirconium dichloride, diphenylmethylene(2-methyl-4-(α-naphthyl)-1-indenyl)(2,7-diethyl-9-fluorenyl) zirconium dichloride, diphenylmethylene(2-methyl-4-(β-naphthyl)-1-indenyl)(2,7-diethyl-9-fluorenyl)zirconium dichloride, diphenylmethylene(1-indenyl)(2,7-di-t-butyl-9-fluorenyl)zirconium dichloride, diphenylmethylene(2-methyl-1-indenyl)(2,7-di-t-butyl-9-fluorenyl)zirconium dichloride, diphenylmethylene(3-methyl-1-indenyl)(2,7-di-t-butyl-9-fluorenyl) zirconium dichloride, diphenylmethylene (4-methyl-1-indenyl)(2,7-di-t-butyl-9-fluorenyl)zirconium dichloride, diphenylmethylene(5-methyl-1-indenyl)(2,7-di-t-butyl-9-fluorenyl) zirconium dichloride, diphenylmethylene(6-methyl-1-indenyl)(2,7-di-t-butyl-9-fluorenyl)zirconium dichloride, diphenylmethylene(7-methyl-1-indenyl)(2,7-di-t-butyl-9-fluorenyl) zirconium dichloride, diphenylmethylene(2-phenyl-1-indenyl)(2,7-di-t-butyl-9-fluorenyl)zirconium dichloride, diphenylmethylene(3-phenyl-1-indenyl)(2,7-di-t-butyl-9-fluorenyl) zirconium dichloride, diphenylmethylene (4-phenyl-1-indenyl)(2,7-di-t-butyl-9-fluorenyl)zirconium dichloride, diphenylmethylene (5-phenyl-1-indenyl)(2,7-di-t-butyl-9-fluorenyl) zirconium dichloride, diphenylmethylene (6-phenyl-1-indenyl)(2,7-di-t-butyl-9-fluorenyl)zirconium dichloride, diphenylmethylene(7-phenyl-1-indenyl)(2,7-di-t-butyl-9-fluorenyl)zirconium dichloride, diphenylmethylene(2,3-dimethyl-1-indenyl)(2,7-di-t-butyl-9-fluorenyl)zirconium dichloride, diphenylmethylene(2,4-dimethyl-1-indenyl)(2,7-di-t-butyl-9-fluorenyl)zirconium dichloride, diphenylmethylene(2,5-dimethyl-1-indenyl)(2,7-di-t-butyl-9-fluorenyl)zirconium dichloride, diphenylmethylene(2,6-dimethyl-1-indenyl)(2,7-di-t-butyl-9-fluorenyl) zirconium dichloride, diphenylmethylene(2,7-dimethyl-1-indenyl)(2,7-di-t-butyl-9-fluorenyl)

zirconium dichloride, diphenylmethylene(3,4-dimethyl-1-indenyl)(2,7-di-t-butyl-9-fluorenyl)zirconium dichloride, diphenylmethylene(3,5-dimethyl-1-indenyl)(2,7-di-t-butyl-9-fluorenyl)zirconium dichloride, diphenylmethylene-(3,6-dimethyl-1-indenyl)(2,7-di-t-butyl-9-fluorenyl)zirconium dichloride, diphenylmethylene(3,7-dimethyl-1-indenyl)(2,7-di-t-butyl-9-fluorenyl)zirconium dichloride, diphenylmethylene(4,5-dimethyl-1-indenyl)(2,7-di-t-butyl-9-fluorenyl) zirconium dichloride, diphenylmethylene-(4,6-dimethyl-1-indenyl)(2,7-di-t-butyl-9-fluorenyl)zirconium dichloride, diphenylmethylene(4,7-dimethyl-1-indenyl)(2,7-di-t-butyl-9-fluorenyl)zirconium dichloride, diphenylmethylene(5,6-dimethyl-1-indenyl)(2,7-di-t-butyl-9-fluorenyl)zirconium dichloride, diphenylmethylene(5,7-dimethyl-1-indenyl)(2,7-di-t-butyl-9-fluorenyl)zirconium dichloride, diphenylmethylene(6,7-dimethyl-1-indenyl)(2,7-di-t-butyl-9-fluorenyl) zirconium dichloride, diphenylmethylene(2-methyl-4-phenyl-1-indenyl)(2,7-di-t-butyl-9-fluorenyl)zirconium dichloride, diphenylmethylene(2-methyl-4,5-benzo-1-indenyl)(2, 7-di-t-butyl-9-fluorenyl)zirconium dichloride, diphenylmethylene(2-methyl-5,6-benzo-1-indenyl)(2,7-di-t-butyl-9-fluorenyl)zirconium dichloride, diphenylmethylene-(2-methyl-4-(α-naphthyl)-1-indenyl)(2,7-di-t-butyl-9-fluorenyl)zirconium dichloride, and diphenylmethylene(2-methyl-4-(β-naphthyl)-1-indenyl)(2,7-di-t-butyl-9-fluorenyl)zirconium dichloride.

The metallocene compounds of the general formula (5) further include dimethyl compound, diethyl compounds, dihydro compounds, diphenyl compounds and dibenzyl compounds, which correspond to the above-recited dichlorides. The metallocene compounds of the general formula (5) further include those which have a titanium atom or a hafnium atom as metal $M^2$. The metallocene compounds of the general formula (5) further include those which have, as the crosslinking group $R^9$, a methylene group, an ethylene group, an isopropylidene group, a methylphenylmethylene group, a dimethylsilanediyl group, a diphenylsilanediyl group, a silacyclobutanediyl group, or silacyclohexanediyl group. Further, the above-recited complexes of the general formula (5) may be used in a cluster form which is formed together from two or more of the complexes.

Process for Producing Second-Type Polyethylene Composition

The second type polyethylene composition of the present invention is produced by a process, which comprises:

step I wherein ethylene and an optional olefin having at least three carbon atoms are polymerized in a slurry state in the presence of a catalyst to prepare the above-mentioned macromonomer; said catalyst comprising:

(a) a metallocene compound [ingredient (a)] represented by the following general formula (11):

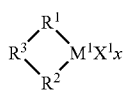

(11)

wherein $M^1$ is a transition metal of group 3, 4, 5 or 6 of the periodic table; $X^1$ independently represents a hydrogen atom, a halogen atom, or a hydrocarbon group having 1 to 20 carbon atoms, which may contain a silicon, nitrogen or oxygen atom; x is an integer of 0 to 3 which varies depending upon the valence of $M^1$; $R^1$ and $R^2$ are ligands represented by the following general formula (12), (13) or (14):

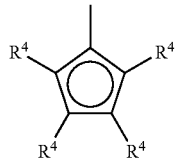

(12)

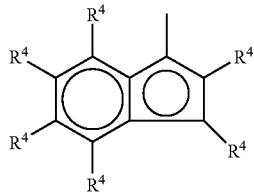

(13)

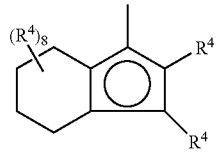

(14)

wherein $R^4$ independently represents a hydrogen atom, a halogen atom, or a hydrocarbon group having 1 to 20 carbon atoms, which may contain a silicon, nitrogen or oxygen atom; said ligands $R^1$ and $R^2$ form a sandwich structure together with $M^1$; $R^3$ is a group represented by the following general formula (15):

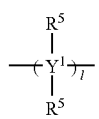

(15)

wherein $R^5$ independently represents a hydrogen atom, a halogen atom, or a hydrocarbon group having 1 to 20 carbon atoms, which may contain a silicon, nitrogen or oxygen atom, and two $R^5$s may be bonded with each other to form a ring together with $Y^1$ to which the two $R^5$s are bonded; $Y^1$ is an atom of group 14 of the periodic table; 1 is an integer of 1 to 5; and $R^3$ has a function of crosslinking $R^1$ with $R^2$;

(b) a modified clay compound [ingredient (b)]; and (c) an optional organoaluminum compound [ingredient (c)] represented by the following general formula (16):

$$AlR^6_3 \quad (16)$$

wherein $R^6$ independently represents a hydrogen atom, a halogen atom, an alkyl or alkoxy group having 1 to 20 carbon atoms, or an aryl, aryloxy, arylalkyl, arylalkoxy, alkylaryl or alkylaryloxy group having 6 to 20 carbon atoms, provided that at least one of $R^6$s is an alkyl group having 1 to 20 carbon atoms; and step II wherein a catalyst is added to a reaction mixture containing the macromonomer as produced in step I; and subsequently, ethylene, the macromonomer as produced in step I, and an optional olefin having at least three carbon atoms are copolymerized in a slurry state in the presence of the added catalyst; said catalyst added comprising as the main catalytically active ingredient a metallocene compound [ingredient (d)] represented by the following general formula (5):

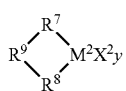
(5)

(10)

wherein $M^2$ is a transition metal of group 3, 4, 5 or 6 of the periodic table; $X^2$ independently represents a hydrogen atom, a halogen atom, or a hydrocarbon group having 1 to 20 carbon atoms, which may contain a silicon, nitrogen or oxygen atom; y is an integer of 0 to 3 which varies depending upon the valence of $M^2$; $R^7$ is a ligand represented by the following general formula (6), (7) or (8):

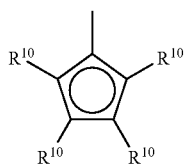
(6)

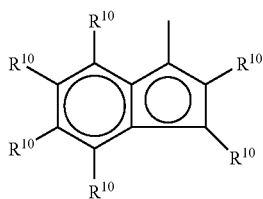
(7)

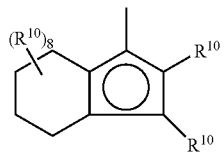
(8)

wherein $R^{10}$ independently represents a hydrogen atom, a halogen atom, or a hydrocarbon group having 1 to 20 carbon atoms, which may contain a silicon, nitrogen or oxygen atom; $R^8$ is a ligand represented by the following general formula (9):

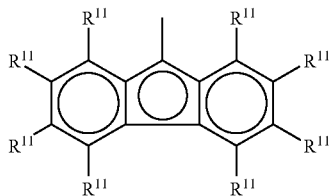
(9)

wherein $R^{11}$ independently represents a hydrogen atom, a halogen atom, or a hydrocarbon group having 1 to 20 carbon atoms, which may contain a silicon, nitrogen or oxygen atom; said ligands $R^7$ and $R^8$ form a sandwich structure together with $M^2$; $R^9$ is a group represented by the following general formula (10):

wherein $R^{12}$ independently represents a hydrogen atom, a halogen atom, or a hydrocarbon group having 1 to 20 carbon atoms, which may contain a silicon, nitrogen or oxygen atom; $Y^2$ is an atom of group 14 of the periodic table; and m is an integer of 1 to 5; and $R^9$ has a function of crosslinking $R^7$ with $R^8$.

In the metallocene compound [ingredient (a)] of the general formula (11), $R^1$ and $R^2$ includes a cyclopentadienyl group of formula (12), an indenyl group of formula (13) and an tetrahydroindenyl group of formula (14). In these formulae (12), (13) and (14), $R^4$ independently represents a hydrogen atom, a halogen atom, or a hydrocarbon group having 1 to 20 carbon atoms, which may contain a silicon, nitrogen or oxygen atom. Two $R^4$s bonded to the adjacent carbon atoms in each ring may be bonded together to form a ring together with the adjacent carbon atoms.

As specific examples of the hydrocarbon group having 1 to 20 carbon atoms, there can be mentioned a methyl group, an ethyl group, a propyl group, a butyl group, a pentyl group, a hexyl group, a heptyl group, an octyl group, a nonyl group, a decyl group, a norbornyl group, a phenyl group, a styryl group, a biphenyl group, a naphthyl group, a tolyl group, an ethylphenyl group, a propylphenyl group, a butylphenyl group, a dimethylphenyl group, a diethylphenyl group, a dipropylphenyl group, a dibutylphenyl group, a diphenylphenyl group, a trimethylphenyl group, a triethylphenyl group, a tripropylphenyl group, a tributylphenyl group, a benzyl group, a phenylethyl group, a phenylpropyl group, a phenylbutyl group, a diphenylmethyl group, a diphenylethyl group, a diphenylpropyl group, a diphenylbutyl group, a vinyl group, a propenyl group, a butenyl group, a butadienyl group, a pentenyl group, a pentadienyl group, a hexenyl group and a hexadienyl group. As specific examples of the silicon-containing hydrocarbon group having 1 to 20 carbon atoms, there can be mentioned a methylsilyl group, an ethylsilyl group, a propylsilyl group, a butylsilyl group, a pentylsilyl group, a hexylsilyl group, a phenylsilyl group, a benzylsilyl group, a dimethylsilyl group, a diethylsilyl group, a dipropylsilyl group, a dibutylsilyl group, a diphenylsilyl group, a dibenzylsilyl group, a trimethylsilyl group, a triethylsilyl group, a tripropylsilyl group, a tributylsilyl group, a triphenylsilyl group, a dimethylphenylsilyl group, a methyldiphenylsilyl group, a trimethylsilylmethyl group, a trimethylsilylethyl group, a trimethylsilylpropyl group, a trimethylsilylbutyl group, a trimethylsilylphenyl group, a bis (trimethylsilyl) methyl group, a bis(trimethylsilyl)ethyl group, a bis(trimethylsilyl)propyl group, a bis (trimethylsilyl)butyl group, a bis (trimethylsilyl)phenyl group and a triphenylsilylmethyl group. As specific examples of the nitrogen-containing hydrocarbon group having 1 to 20 carbon atoms, there can be mentioned a methylamino group, an ethylamino group, a propylamino group, a butylamino group, a pentylamino group, a hexylamino group, a phenylamino group, a benzylamino group, a phenylethylamino group, a phenylpropylamino group, a phenylbutylamino group, a naphthylamino group, a dimethylamino group, a diethylamino group, a dipropylamino group, a dibutylamino group, a diphenylamino group, a dibenzylamino group, a dimethylaminomethyl group, a dimethylaminoethyl group, a dimethylaminopropyl group, a dimethylaminobutyl group, a dimethylaminophenyl group, a bis(dimethylamino)methyl group, a bis(dimethylamino)ethyl group, a bis(dimethylamino)propyl group, a bis(dimethylamino)butyl group, a bis(dimethylamino)-phenyl group, a phenylaminomethyl group, a diphenylaminomethyl group and a diphenylaminophenyl group. As specific examples of the oxygen-containing hydrocarbon group having 1 to 20 carbon atoms, there can be mentioned a methoxy group, an ethoxy group, a propoxy group, a butoxy group, a phenoxy group, a naphthoxy group, a methylphenoxy group, an ethylphenoxy group, a propylphenoxy group, a butylphenoxy group, a biphenoxy group, a methoxymethyl group, an ethoxymethyl group, a propoxymethyl group, a butoxymethyl group, a phenoxymethyl group, a methoxyethyl group, an ethoxyethyl group, a propoxyethyl group, a butoxyethyl group, a phenoxyethyl group, a methoxypropyl group, an ethoxypropyl group, a propoxypropyl group, a butoxypropyl group, a phenoxypropyl group, a methoxybutyl group, an ethoxybutyl group, a propoxybutyl group, a butoxybutyl group, a phenoxybutyl group, a methoxyphenyl group, an ethoxyphenyl group, a propoxyphenyl group, a butoxyphenyl group and a phenoxyphenyl group. Two $R^4$s bonded to adjacent carbon atoms in each may be bonded to form a ring together with the adjacent carbon atoms, namely, each cycloalkadienyl group may be formed into an indenyl structure.

In the metallocene compound [ingredient (a)] of the general formula (11), $R^1$ and $R^2$ includes a cyclopentadienyl group of formula (12), an indenyl group of formula (13) and an tetrahydroindenyl group of formula (14).

As non-limiting specific examples of $R^1$ and $R^2$ in the metallocene compound [ingredient (a)] of formula (11), there can be mentioned a cyclopentadienyl group, a methylcyclopentadienyl group, a dimethylcyclopentadienyl group, a trimethylcyclopentadienyl group, a tetramethylcyclopentadienyl group, a ethylcyclopentadienyl group, a diethylcyclopentadienyl group, a triethylcyclopentadienyl group, a tetraethylcyclopentadienyl group, a propylcyclopentadienyl group, a dipropylcyclopentadienyl group, a tripropylcyclopentadienyl group, a tetrapropylcyclopentadienyl group, a butylcyclopentadienyl group, a dibutylcyclopentadienyl group, a tributylcyclopentadienyl group, a tetrabutylcyclopentadienyl group, a phenylcyclopentadienyl group, a diphenylcyclopentadienyl group, a naphthylcyclopentadienyl group, a methoxycyclopentadienyl group, a trimethylsilylcyclopentadienyl group, an indenyl group, a methylindenyl group, a dimethylindenyl group, a trimethylindenyl group, a tetramethylindenyl group, a pentamethylindenyl group, a hexamethylindenyl group, an ethylindenyl group, a diethylindenyl group, a triethylindenyl group, a tetraethylindenyl group, a pentaethylindenyl group, a hexaethylindenyl group, a propylindenyl group, a dipropylindenyl group, a tripropylindenyl group, a tetrapropylindenyl group, a pentapropylindenyl group, a hexapropylindenyl group, a butylindenyl group, a dibutylindenyl group, a tributylindenyl group, a tetrabutylindenyl group, a pentabutylindenyl group, a hexabutylindenyl group, a phenylindenyl group, a diphenylindenyl group, a benzoindenyl group, a naphthylindenyl group, a methoxyindenyl group and a trimethylsilylindenyl group.

$R^3$ which crosslinks ligand $R^1$ with ligand $R^2$ is represented by the above-recited general formula (15) wherein $R^5$ independently represents a hydrogen atom, a halogen atom, or a hydrocarbon group having 1 to 20 carbon atoms, which may contain a silicon, nitrogen or oxygen atom. Two $R^5$s may be bonded with each other to form a ring together with $Y^1$ to which the two $R^5$s are bonded.

As specific examples of the hydrocarbon group having 1 to 20 carbon atoms, there can be mentioned a methyl group, an ethyl group, a propyl group, a butyl group, a pentyl group, a hexyl group, a heptyl group, an octyl group, a nonyl group, a decyl group, a norbornyl group, a phenyl group, a styryl group, a biphenyl group, a naphthyl group, a tolyl group, an ethylphenyl group, a propylphenyl group, a butylphenyl group, a dimethylphenyl group, a diethylphenyl group, a dipropylphenyl group, a dibutylphenyl group, a diphenylphenyl group, a trimethylphenyl group, a triethylphenyl group, a tripropylphenyl group, a tributylphenyl group, a benzyl group, a phenylethyl group, a phenylpropyl group, a phenylbutyl group, a diphenylmethyl group, a diphenylethyl group, a diphenylpropyl group, a diphenylbutyl group, a vinyl group, a propenyl group, a butenyl group, a butadienyl group, a pentenyl group, a pentadienyl group, a hexenyl group and a hexadienyl group. As specific examples of the silicon-containing hydrocarbon group having 1 to 20 carbon atoms, there can be mentioned a methylsilyl group, an ethylsilyl group, a propylsilyl group, a butylsilyl group, a pentylsilyl group, a hexylsilyl group, a phenylsilyl group, a benzylsilyl group, a dimethylsilyl group, a diethylsilyl group, a dipropylsilyl group, a dibutylsilyl group, a diphenylsilyl group, a dibenzylsilyl group, a trimethylsilyl group, a triethylsilyl group, a tripropylsilyl group, a tributylsilyl group, a triphenylsilyl group, a dimethylphenylsilyl group, a methyldiphenylsilyl group, a trimethylsilylmethyl group, a trimethylsilylethyl group, a trimethylsilylpropyl group, a trimethylsilylbutyl group, a trimethylsilylphenyl group, a bis(trimethylsilyl)methyl group, a bis(trimethylsilyl) ethyl group, a bis(trimethylsilyl)propyl group, a bis(trimethylsilyl)butyl group, a bis (trimethylsilyl)phenyl group and a triphenylsilylmethyl group. As specific examples of the nitrogen-containing hydrocarbon group having 1 to 20 carbon atoms, there can be mentioned a methylamino group, an ethylamino group, a propylamino group, a butylamino group, a pentylamino group, a hexylamino group, a phenylamino group, a benzylamino group, a phenylethylamino group, a phenylpropylamino group, a phenylbutylamino group, a naphthylamino group, a dimethylamino group, a diethylamino group, a dipropylamino group, a dibutylamino group, a diphenylamino group, a dibenzylamino group, a dimethylaminomethyl group, a dimethylaminoethyl group, a dimethylaminopropyl group, a dimethylaminobutyl group, a dimethylaminophenyl group, a bis(dimethylamino)methyl group, a bis(dimethylamino)ethyl group, a bis(dimethylamino)propyl group, a bis(dimethylamino)butyl group, a bis (dimethylamino)phenyl group, a phenylaminomethyl group, a diphenylaminomethyl group and a diphenylaminophenyl group. As specific examples of the oxygen-containing hydrocarbon group having 1 to 20 carbon atoms, there can be mentioned a methoxy group, an ethoxy group, a propoxy group, a butoxy group, a phenoxy group, a naphthoxy group, a methylphenoxy group, an ethylphenoxy group, a propylphenoxy group, a butylphenoxy group, a biphenoxy group, a methoxymethyl group, an ethoxymethyl group, a propoxymethyl group, a butoxymethyl group, a phenoxymethyl group, a methoxyethyl group, an ethoxyethyl group, a propoxyethyl group, a butoxyethyl group, a phenoxyethyl group, a methoxypropyl group, an ethoxypropyl group, a propoxypropyl group, a butoxypropyl group, a phenoxypropyl group, a methoxybutyl group, an ethoxybutyl group, a propoxybutyl group, a butoxybutyl group, a phenoxybutyl group, a methoxyphenyl group, an ethoxyphenyl group, a propoxyphenyl group, a butoxyphenyl group and a phenoxyphenyl group. $R^5$ further include those wherein two $R^5$s are bonded with each other to form a ring together with $Y^1$ to which the two $R^5$s are bonded.

$Y^1$ in the general formula (15) is an atom of group 14 of the periodic table and includes a carbon atom, a silicon atom, a germanium atom and a tin atom. Of these, a carbon atom and a silicon atom are preferable. m is an integer of 1 to 5.

As non-limiting specific examples of group $R^3$ represented by the general formula (15), there can be mentioned a methylene group, an ethylidene group, an ethylene group, an propylidene group, a propylene group, a butylidene group, a butylenes group, a pentylidene group, a pentylene group, a hexylidene group, an isopropylidene group, a methylethylethylene group, a methylpropylmethylene group, a methylbutylmethylene group, a bis (cyclohexyl) methylene group, a methylphenylmethylene group, a diphenylmethylene group, a phenyl(methylphenyl)methylene group, a di(methylphenyl)methylene group, a bis(dimethylphenyl)methylene group, a bis(trimethylphenyl)methylene group, a phenyl(ethylphenyl)methylene group, a di(ethylphenyl) methylene group, a bis (diethylphenyl)methylene group, a phenyl(propylphenyl)methylene group, a di(propylphenyl)methylene group, a bis(dipropylphenyl)methylene group, a phenyl(butylphenyl)methylene group, a di(butylphenyl)methylene group, a phenyl(naphthyl)methylene group, a di(naphthyl) methylene group, a phenyl(biphenyl)methylene group, a di(biphenyl)methylene group, a phenyl(trimethylsilylphenyl)methylene group, a bis(trimethylsilylphenyl)methylene group, a bis(pentafluorophenyl)methylene group, a silanediyl group, a disilanediyl group, a trisilanediyl group, a tetrasilanediyl group, a dimethylsilanediyl group, a bis(dimethylsilane)diyl group, a diethylsilanediyl group, a dipropylsilanediyl group, a dibutylsilanediyl group, a diphenylsilanediyl group, a silacyclobutanediyl group and a silacyclohexanediyl group.

$M^1$ in the general formula (11) is a transition metal of group 3, 4, 5 or 6 of the periodic table and includes a scandium atom, a titanium atom, a zirconium atom, a hafnium atom, vanadium atom, niobium atom, a tantalum atom, a chromium atom, a molybdenum atom and a tungsten atom. Of these, a titanium atom, a zirconium atom and a hafnium atom are preferable. $X^1$ independently represents a hydrogen atom, a halogen atom, or a hydrocarbon group having 1 to 20 carbon atoms, which may contain a silicon, nitrogen or oxygen atom. x is an integer of 0 to 3 which varies depending upon the valence of $M^1$. As specific examples of the hydrocarbon group having 1 to 20 carbon atoms, there can be mentioned a methyl group, an ethyl group, a propyl group, a butyl group, a pentyl group, a hexyl group, a heptyl group, an octyl group, a nonyl group, a decyl group, a norbornyl group, a phenyl group, a styryl group, a biphenyl group, a naphthyl group, a tolyl group, an ethylphenyl group, a propylphenyl group, a butylphenyl group, a dimethylphenyl group, a diethylphenyl group, a dipropylphenyl group, a dibutylphenyl group, a diphenylphenyl group, a trimethylphenyl group, a triethylphenyl group, a tripropylphenyl group, a tributylphenyl group, a benzyl group, a phenylethyl group, a phenylpropyl group, a phenylbutyl group, a diphenylmethyl group, a diphenylethyl group, a diphenylpropyl group, a diphenylbutyl group, a vinyl group, a propenyl group, a butenyl group, a butadienyl group, a pentenyl group, a pentadienyl group, a hexenyl group and a hexadienyl group. As specific examples of the silicon-containing hydrocarbon group having 1 to 20 carbon atoms, there can be mentioned a methylsilyl group, an ethylsilyl group, a propylsilyl group, a butylsilyl group, a pentylsilyl group, a hexylsilyl group, a phenylsilyl group, a benzylsilyl group, a dimethylsilyl group, a diethylsilyl group, a dipropylsilyl group, a dibutylsilyl group, a diphenylsilyl group, a dibenzylsilyl group, a trimethylsilyl group, a triethylsilyl group, a tripropylsilyl group, a tributylsilyl group, a triphenylsilyl group, a dimethylphenylsilyl group, a methyldiphenylsilyl group, a trimethylsilylmethyl group, a trimethylsilylethyl group, a trimethylsilylpropyl group, a trimethylsilylbutyl group, a trimethylsilylphenyl group, a bis(trimethylsilyl)methyl group, a bis(trimethylsilyl)ethyl group, a bis(trimethylsilyl)propyl group, a bis(trimethylsilyl)butyl group, a bis(trimethylsilyl)phenyl group and a triphenylsilylmethyl group. As specific examples of the nitrogen-containing hydrocarbon group having 1 to 20 carbon atoms, there can be mentioned a methylamino group, an ethylamino group, a propylamino group, a butylamino group, a pentylamino group, a hexylamino group, a phenylamino group, a benzylamino group, a phenylethylamino group, a phenylpropylamino group, a phenylbutylamino group, a naphthylamino group, a dimethylamino group, a diethylamino group, a dipropylamino group, a dibutylamino group, a diphenylamino group, a dibenzylamino group, a dimethylaminomethyl group, a dimethylaminoethyl group, a dimethylaminopropyl group, a dimethylaminobutyl group, a dimethylaminophenyl group, a bis (dimethylamino)methyl group, a bis(dimethylamino)ethyl group, a bis(dimethylamino)propyl group, a bis(dimethylamino)butyl group, a bis(dimethylamino)phenyl group, a phenylaminomethyl group, a diphenylaminomethyl group and a diphenylaminophenyl group. As specific examples of the oxygen-containing hydrocarbon group having 1 to 20 carbon atoms, there can be mentioned a methoxy group, an ethoxy group, a propoxy group, a butoxy group, a phenoxy group, a naphthoxy group, a methylphenoxy group, an ethylphenoxy group, a propylphenoxy group, a butylphenoxy group, a biphenoxy group, a methoxymethyl group, an ethoxymethyl group, a propoxymethyl group, a butoxymethyl group, a phenoxymethyl group, a methoxyethyl group, an ethoxyethyl group, a propoxyethyl group, a butoxyethyl group, a phenoxyethyl group, a methoxypropyl group, an ethoxypropyl group, a propoxypropyl group, a butoxypropyl group, a phenoxypropyl group, a methoxybutyl group, an ethoxybutyl group, a propoxybutyl group, a butoxybutyl group, a phenoxybutyl group, a methoxyphenyl group, an ethoxyphenyl group, a propoxyphenyl group, a butoxyphenyl group and a phenoxyphenyl group.

As specific examples of the compounds of the general formula (11), in the case when $M^1$ is a zirconium atom, and $X^1$ is a chlorine atom, there can be mentioned methylenebis (cyclopentadienyl)zirconium dichloride, isopropylidenebis (cyclopentadienyl)zirconium dichloride, (methyl)(phenyl) methylenebis(cyclopentadienyl)zirconium dichloride, diphenylmethylenebis(cyclopentadienyl)zirconium dichloride, ethylenebis(cyclopentadienyl)zirconium dichloride, methylenebis(methylcyclopentadienyl)zirconium dichloride, isopropylidenebis (methylcyclopentadienyl) zirconium dichloride, (methyl)(phenyl)methylenebis(methylcyclopentadienyl)zirconium dichloride, diphenylmethylenebis(methylcyclopentadienyl)zirconium dichloride, ethylenebis(methylcyclopentadienyl)zirconium dichloride, methylene (cyclopentadienyl)(methylcyclopentadienyl)zirconium dichloride, isopropylidene(cyclopentadienyl)(methylcyclopentadienyl)zirconium dichloride, (methyl)(phenyl)methylene(cyclopentadienyl)(methylcyclopentadienyl)zirconium dichloride, diphenylmethylene(cyclopentadienyl)(methylcyclopentadienyl)zirconium dichloride, ethylene(cyclopentadienyl)(methylcyclopentadienyl)zirconium dichloride, methylenebis(2,4-dimethylcyclopentadienyl)zirconium dichloride, isopropylidenebis(2,4-dimethylcyclopentadienyl)zirconium dichloride, (methyl)(phenyl)methylenebis(2, 4-dimethylcyclopentadienyl)zirconium dichloride, diphenylmethylenebis(2,4-dimethylcyclopentadienyl)zirconium dichloride, ethylenebis(2,4-dimethylcyclopentadienyl) zirconium dichloride, (methyl)(phenyl)methylene(cyclopentadienyl)(indenyl)zirconium dichloride, methylene(cyclopentadienyl)(indenyl)zirconium dichloride, dipnenylmethylene(cyclopentadienyl)(indenyl)zirconium dichloride, ethylene(cyclopentadienyl)(indenyl)zirconium dichloride, dimethylsilanediylbis(cyclopentadienyl) zirconium dichloride, diethylsilanediylbis(cyclopentadienyl)zirconium dichloride, di(n-propyl)silanediylbis(cyclopentadienyl)zirconium dichloride, diisopropylsilanediylbis(cyclopentadienyl)zirconium dichloride, dicyclohexylsilanediylbis(cyclopentadienyl)zirconium dichloride, diphenylsilanediylbis(cyclopentadienyl)zirconium dichloride, (ethyl)(methyl)silanediylbis(cyclopentadienyl)zirconium dichloride, (methyl)(n-propyl)silanediylbis(cyclopentadienyl)zirconium dichloride, (methyl)(isopropyl)silanediylbis(cyclopentadienyl)zirconium dichloride, (cyclohexyl)(methyl)silanediylbis(cyclopentadienyl)zirconium dichloride, (methyl)(phenyl)silanediylbis(cyclopentadienyl)zirconium dichloride, dimethylsilanediylbis(methylcyclopentadienyl)zirconium dichloride, diethylsilanediylbis(methylcyclopentadienyl)zirconium dichloride, di(n-propyl)silanediylbis(methylcyclopentadienyl)zirconium dichloride, diisopropylsilanediylbis(methylcyclopentadienyl)zirconium dichloride, dicylohexylsilanediylbis(methylcyclopentadienyl)zirconium dichloride, diphenylsilanediylbis(methylcyclopentadienyl)zirconium dichloride, (ethyl)(methyl)silanediylbis(methylcyclopentadienyl)zirconium dichloride, (methyl)(n-propyl)silanediylbis(methylcyclopentadienyl)zirconium dichloride, (methyl)(isopropyl)silanediylbis(methylcyclopentadienyl)zirconium dichloride, (cyclohexyl)(methyl)silanediylbis(methylcyclopentadienyl)zirconium dichloride, (methyl)(phenyl)silanediylbis(methylcyclopentadienyl)zirconium dichloride, dimethylsilanediyl(cyclopentadienyl)(methylcyclopentadienyl)zirconium dichloride, diethylsilanediyl(cyclopentadienyl)(methylcyclopentadienyl)zirconium dichloride, di(n-propyl)silanediyl(cyclopentadienyl)(methylcyclopentadienyl)zirconium dichloride, diisopropylsilanediyl(cyclopentadienyl)(methylcyclopentadienyl)zirconium dichloride, dicyclohexylsilanediyl(cyclopentadienyl)(methylcyclopentadienyl)zirconium dichloride, diphenylsilanediyl(cyclopentadienyl)(methylcyclopentadienyl) zirconium dichloride, (ethyl)(methyl)silanediyl(cyclopentadienyl)(methylcyclopentadienyl)zirconium dichloride, (methyl)(n-propyl)silanediyl(cyclopentadienyl)(methylcyclopentadienyl)zirconium dichloride, (methyl)(isopropyl)silanediyl(cyclopentadienyl)(methylcyclopentadienyl)zirconium dichloride, (cyclohexyl)(methyl)silanediyl(cyclopentadienyl)(methylcyclopentadienyl) zirconium dichloride, (methyl)(phenyl)silanediyl(cyclopentadienyl)(methylcyclopentadienyl)zirconium dichloride, dimethylsilanediylbis(2,4-dimethylcyclopentadienyl)zirconium dichloride, di(n-propyl)silanediylbis(2,4-dimethylcyclopentadienyl) zirconium dichloride, diisopropylsilanediylbis(2,4-dimethylcyclopentadienyl)zirconium dichloride, dicyclohexylsilanediylbis(2,4-dimethylcyclopentadienyl)zirconium dichloride, diphenylsilanediylbis(2,4-dimethylcyclopentadienyl)zirconium dichloride, (ethyl)(methyl)silanediylbis(2,4-dimethylcyclopentadienyl)zirconium dichloride, (methyl)(n-propyl)silanediylbis(2,4-dimethylcyclopentadienyl) zirconium dichloride, (methyl-(isopropyl)silanediylbis(2,4-dimethylcyclopentadienyl) zirconium dichloride, (cyclohexyl)(methyl)silanediylbis(2,4-dimethylcyclopentadienyl)zirconium dichloride, (methyl)(phenyl)silanediylbis(2,4-dimethylcyclopentadienyl)zirconium dichloride, dimethylsilanediyl(cyclopentadienyl)(indenyl)zirconium dichloride, diethylsilanediyl(cyclopentadienyl)(indenyl)zirconium dichloride, di(n-propyl)silanediyl(cyclopentadienyl)(indenyl)zirconium dichloride, diisopropylsilanediyl(cyclopentadienyl)(indenyl)zirconium dichloride, dicyclohexylsilanediyl(cyclopentadienyl)(indenyl)zirconium dichloride, diphenylsilanediyl(cyclopentadienyl)(indenyl)zirconium dichloride, (ethyl)(methyl)silanediyl(cyclopentadienyl)(indenyl)zirconium dichloride, (methyl)(n-propyl)silanediyl(cyclopentadienyl)(indenyl) zirconium dichloride, (methyl)(isopropyl)silanediyl(cyclopentadienyl)(indenyl)zirconium dichloride, (cyclohexyl)(methyl)silanediyl(cyclopentadienyl)(indenyl)zirconium dichloride and (methyl)(phenyl)silanediyl(cyclopentadienyl)(indenyl) zirconium dichloride.

The metallocene compounds of the general formula (11) further include dimethyl compounds, diethyl compounds, dihydro compounds, diphenyl compounds and dibenzyl compounds, which correspond to the above-recited dichlorides. The metallocene compounds of the general formula (11) further include those which have a titanium atom or a hafnium atom as metal $M^1$. Further, the above-recited complexes of the general formula (11) may be used in a cluster form which is formed together from two or more of the complexes.

The modified clay compound [ingredient (b)] used in the present invention is a reaction product of a layer clay compound [ingredient (b-1)] with a compound [ingredient (b-2)] capable of introducing a cation among layers of the layer clay compound.

The ingredient (b-1) used in the present invention is finely divided particles predominantly comprised of microcrystalline silicate salts. The layer clay compound is characterized as having a layer structure and most of the layer clay compound is comprised of plurality of layers having negative charges of various valences among the layers. In this respect, the layer clay compound is greatly different from a metal oxide having a three-dimensional structure such as silica, alumina or zeolite. On the basis of valence of negative charges, layer clay compounds are classified into a group having a negative charge valence of zero as its chemical formula such as pyrophylite, kaolinite, dickite and talc; a smectite group having a negative charge valence in the range of 0.25 to 0.6; a vermiculite group having a negative charge valenece in the range of 0.6 to 0.9; a mica group having a negative charge valenece of approximately 1; and a brittle mica group having a negative charge valence of approximately 2. Each of the recited groups includes various minerals. For example, the smectite group includes montmorillonite, beidellite, saponite and hectolite. These clay compounds are naturally occurring materials, but artificially synthesized materials having a reduced impurity content can be obtained. In the present invention, both of the naturally occurring materials and the synthetic materials can be used, and clay compounds other than those which are recited above can also be used.

As preferable examples of the ingredient [(b-2)] capable of introducing a cation among layers of the layer clay compound, there can be mentioned organic compounds such as onium compounds having a structure such that a proton is coordinated to a lone pair of an element, which are represented by the following general formula (17):

  (17)

wherein G is an element selected from those of group 15 or 16 of the periodic table. More specifically G includes a nitrogen atom in an ammonium compound, a phosphorus atom in a phosphonium compound, an oxygen atom in an oxonium compound and a sulfur atom in a sulfonium compound. $R^{13}$ independently represents a hydrogen atom or a substituent including a hydrocarbon group having 1 to 30 carbon atoms. As specific examples of the hydrocarbon group having 1 to 30 carbon atoms, there can be mentioned alkyl groups having 1 to 20 carbon atoms such as a methyl group, an ethyl group, a propyl group, a butyl group, a pentyl group, a hexyl group, a heptyl group, an octyl group, a nonyl group, a decyl group, a dodecyl group, an octadecyl group, an isopropyl group, an isobutyl group, a s-butyl group, a t-butyl group and a cyclohexyl group; alkenyl groups having 2 to 30 carbon atoms such as a vinyl group, a propenyl group and a cyclohexenyl group; aryl groups having 6 to 30 carbon atoms such as a phenyl group, a biphenyl group and a naphthyl group; alkylaryl groups having 7 to 30 carbon atoms such as a methylphenyl group and an ethylphenyl group; and arylalkyl groups having 7 to 30 carbon atoms such as a benzyl group and a phenylethyl group. At least one of the $R^{13}$s is a hydrocarbon group having 1 to 30 carbon atoms. Each $R^{13}$ may be bound to another $R^{13}$. When G is an element selected from those of group 15, k is 3, and, when G is an element selected from those of group 16, k is 2. $[A]^-$ is a counter anion, and, as non-limiting specific examples thereof, there can be mentioned halide ions such as a fluoride ion, a chloride ion, a bromide ion and an iodide ion, and inorganic anions such as a sulfate ion.

Among the ingredient [(b-2)], those in which G is a nitrogen atom and $[A]^-$ is a chloride ion, include, for example, hydrochlorides of aliphatic primary amines such as methylamine hydrochloride, ethylamine hydrochloride, propylamine hydrochloride, isopropylamine hydrochloride, butylamine hydrochloride, hexylamine hydrochloride, decylamine hydrochloride, dodecylamine hydrochloride, allylamine hydrochloride, cyclopentylamine hydrochloride and cyclohexylamine hydrochloride; hydrochlorides of aliphatic secondary amines such as dimethylamine hydrochloride, diethylamine hydrochloride, diamylamine hydrochloride, didecylamine hydrochloride and diallylamine hydrochloride; hydrochlorides of aliphatic tertiary amines such as trimethylamine hydrochloride, tributylamine hydrochloride, triamylamine hydrochloride, triallylamine hydrochloride, N,N-dimethyldecylamine hydrochloride, N,N-dimethyloctadecylamine hydrochloride and N-methyldioleylamine hydrochloride; and hydrochlorides of aromatic amines such as aniline hydrochloride, N-methylaniline hydrochloride, N,N-dimethylaniline hydrochloride, N-ethylaniline hydrochloride, N,N-diethylaniline hydrochloride, N-allylaniline hydrochloride, o-toluidine hydrochloride, m-toluidine hydrochloride, p-toluidine hydrochloride, N-methyl-o-toluidine hydrochloride, N-methyl-m-toluidine hydrochloride, N-methyl-p-toluidine hydrochloride, N,N-dimethyl-o-toluidine hydrochloride, N,N-dimethyl-m-toluidine hydrochloride, N,N-dimethyl-p-toluidine hydrochloride, benzylamine hydrochloride, dibenzylamine hydrochloride, tribenzylamine hydrochloride, N-benzyl-N-ethylaniline hydrochloride, diphenylamine hydrochloride, α-naphthylaminehydrochloride, β-naphthylamine hydrochloride, N,N-dimethyl-α-naphthylamine hydrochloride, N,N-dimethyl-β-naphthylamine hydrochloride, o-anisidine hydrochloride, m-anisidine hydrochloride, p-anisidine hydrochloride, N,N,2,6-tetramethylaniline hydrochloride, N,N,2,6-tetramethylaniline hydrochloride, N,N,3,5-tetramethylaniline hydrochloride, N,N,2,4,6-pentamethylaniline hydrochloride and 2,3,4,5,6-pentafluoroaniline hydrochloride. The compounds [(b-2)] further include those in which G is a nitrogen atom and $[A]^-$ is a fluoride ion, a bromide ion, an iodide ion or a sulfate ion instead of a chloride ion. Namely, hydrofluorides, hydrobromides, hydrogeniodides and sulfates, corresponding to the above-recited hydrochlorides can be used.

As non-limiting specific examples of the ingredient [(b-2)] wherein G is a phosphorus atom and $[A]^-$ is a bromide ion, there can be mentioned phosphonium compounds such as triphenylphosphine hydrobromide, tri(o-tolyl)phosphine hydrobromide, tri(p-tolyl)phosphine hydrobromide and trimesitylphosphine hydrobromide. The ingredient [(b-2)] further includes those in which G is an oxygen atom and $[A]^-$ is a chloride ion, such as oxonium compounds including methyl ether hydrochloride, ethyl ether hydrochloride and phenyl ether hydrochloride; and those in which G is a sulfur atom, such as sulfonium compounds.

The reaction conditions under which the ingredient [(b-1)] is reacted with the ingredient [(b-2)] are not particularly limited, but, preferably these ingredients are brought into contact with each other in a reaction medium such as water or an organic solvent. The solvent used includes conventional organic solvents such as ethyl alcohol, methyl alcohol, acetone, 1,4-dioxane, acetonitrile, benzene, toluene, xylene, pentane, hexane and methylene chloride. The ingredient [(b-2)] may be prepared either in a solid form which is used as a solution in a solvent, or prepared in a liquid form by a chemical reaction carried out in a liquid phse which is used as it is in a solution form. The proportion of the ingredient [(b-1)] and the ingredient [(b-2)] is not particularly limited, but, when the ingredient [(b-1)] contain an ion-exchangeable cation, the ingredient [(b-1)] is preferably reacted with the ingredient [(b-2)] in an amount equimolar or more to the cation.

The proportion of the ingredient (a) and the ingredient (b) is not particularly limited provided that the ingredient (b) is sufficient for the reaction with the ingredient (a), but, the amount of cation in the ingredient (b) is preferably in the range of 0.01 to 10,000 mol, more preferably 0.1 to 1,000 mol, per mol of the ingredient (a).

The aluminum compound [ingredient (c)] used in combination with the metallocene compound [ingredient (d)] preferably includes those which are represented by the following general formula (16):

$$AlR^6_3 \qquad (16)$$

wherein $R^6$ independently represents a hydrogen atom, a halogen atom, an alkyl or alkoxy group having 1 to 20 carbon atoms, or an aryl, aryloxy, arylalkyl, arylalkoxy, alkylaryl or alkylaryloxy group having 6 to 20 carbon atoms, provided that at least one of $R^6$s is an alkyl group having 1 to 20 carbon atoms.

As non-limiting specific examples of the aluminum compound [ingredient (c)], there can be mentioned trialkylaluminums such as trimethylaluminum, triethylaluminum, tri(n-propyl) aluminum, triisopropylaluminum, tri(n-butyl)aluminum, triisobutylaluminum, tri(t-butyl)aluminum and triamylaluminum; dialkylaluminum hydrides such as diisobutylaluminum hydride; dialkylaluminum halides such as dimethylaluminum chloride, diethylaluminum chloride, diisobutylaluminum chloride, di(t-butyl)aluminum chloride and diamylaluminum chloride; alkylaluminum dihalides such as methylaluminum dichloride, ethylaluminum dichloride, isobutylaluminum dichloride, t-butylaluminum dichloride and amylaluminum dichloride; and dialkylaluminum alkoxides such as diethylaluminum ethoxide. Of these, trialkylaluminums are preferable.

In the preparation of the catalyst, the manner and order in which ingredient (a), ingredient (b) and ingredient (c) are added are not particularly limited. For example, there can be adopted a method wherein ingredient (a) is contacted with ingredient (b) and then ingredient (c) is added; a method wherein ingredient (b) is contacted with ingredient (c) and then ingredient (a) is added; and a method wherein ingredient (b) is contacted with ingredient (c), and ingredient (a) is contacted with ingredient (c), and then, a product obtained by the contact of ingredient (b) with ingredient (c) is added to a product obtained by the contact of ingredient (a) with ingredient (c). To avoid the influence due to impurities contained in ingredient (b), it is preferable that ingredient (b) is pre-contacted with a part or the entire amount of ingredient (c).

The product obtained by the contact of ingredient (a) with ingredient (b) can be used either before or after the product is washed. When ingredient (c) is used, the amount of ingredient (c) is usually in the range of 0.001 to 10,000 mmol, preferably 0.01 to 1,000 mmol, per gram of ingredient (b). The molar ratio of ingredient (a) to ingredient (c) is usually in the range of 1/0.1 to 1/10,000, preferably 1/1 to 1/1,000. The metallocene compound [ingredient (a)] may be used either alone or as a combination of at least two thereof.

In the process for preparing the macromonomer by polymerizing ethylene and an optional olefin having at least three carbon atoms, no limitation is particularly imposed to the polymerization conditions such as polymerization temperature, polymerization time, polymerization pressure and monomer concentration. However, the polymerization temperature is usually in the range of −100° C. to 120° C., and, in view of the productivity, preferably 20° C. to 120° C. and more preferably 60° C. to 120° C. The polymerization time is usually in the range of 10 seconds to 20 hours, and the polymerization pressure is usually in the range of normal pressure to 300 MPa. The molecular weight can be controlled by using, for example, hydrogen in polymerization. Any procedure of a batch, semi-continuous or continuous polymerization procedure can be adopted. The polymerization can be carried out either in one stage, or in two or more stages under different conditions.

In the case when ethylene is copolymerized with an olefin having at least three carbon atoms for the preparation of macromonomer, the feed ratio by mol of ethylene/olefin with at least three carbon atoms is usually in the range of 1 to 200, preferably 3 to 100 and more preferably 5 to 50.

The catalyst used in step II of the process of the present invention, which comprises the metallocene compound [ingredient (d)] of the general formula (5) as the main catalytically active ingredient, is as hereinbefore described.

The catalyst used in step II can comprise, in addition to the metallocene compound [ingredient (d)], at least one of the following ingredients (e) through ingredient (h).

Ingredient (e): aluminum compounds represented by the following general formula (18), (19) or (20):

(18)

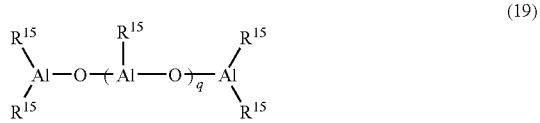

(19)

(20)

wherein $R^{14}$ independently represents a hydrogen atom, a halogen atom, an alkyl or alkoxy group having 1 to 20 carbon atoms, or an aryl, aryloxy, arylalkyl, arylalkoxy, alkylaryl or alkylaryloxy group having 6 to 20 carbon atoms, provided that at least one of $R^{14}$s is an alkyl group having 1 to 20 carbon atoms; $R^{15}$ independently represents a hydrogen atom or a hydrocarbon group having 1 to 20 carbon atoms; and q is an integer of 2 to 60.

Ingredient (f): a protonic acid represented by the following general formula (21), a metal salt represented by the following general formula (22), a Lewis acid salt represented by the following general formula (23) or a Lewis acid represented by the following general formula (24):

(21)

(22)

(23)

(24)

wherein H is proton; E is a boron atom or an aluminum atom; $R^{16}$ is a Lewis base selected from an ether, an aliphatic amine, an aromatic amine or a phosphine. $R^{17}$ is a Lewis base such as an ether, an aliphatic amine, an aromatic amine or a phosphine, or a cyclopentadienyl group which maybe substituted; J is a lithium, iron or silver atom. D is a carbonium cation or atropylium cation. Ar independently represents a substituted or unsubstituted hydrocarbon group having 1 to 20 carbon atoms, which is selected from alkyl groups, aryl groups, aralkyl groups, aryl groups having a halogen substituent, aryl groups having a hydrocarbon group substituent, aryl groups having a hetero atom-containing hydrocarbon group as a substituent, aralkyl groups having a halogen substituent, aralkyl groups having a hydrocarbon group as a substituent, aralkyl groups having a hetero atom-containing hydrocarbon group as a substituent, aryl groups having as a substituent a silyl group having a hydrocarbon group, aryl groups having as a substituent a silyl group having a hetero atom-containing hydrocarbon group, aralkyl groups having as a substituent a silyl group having a hydrocarbon group, and aralkyl groups having as a substituent a silyl group having a hetero atom-containing hydrocarbon group. o is an integer of 0, 1 or 2.

Ingredient (g): a sulfonic acid salt

Ingredient (h): a carboxylic acid derivative

More specifically the catalyst used in step II includes the following combination of ingredients.

(i) ingredient (d)+ingredient (e);
(ii) ingredient (d)+ingredient (e)+water;
(iii) ingredient (d)+ingredient (f);
(iv) ingredient (d)+ingredient (f)+ingredient (e);
(v) ingredient (d)+a sulfonic acid salt [ingredient (g)];
(vi) ingredient (d)+ingredient (g)+ingredient (e);
(vii) ingredient (d)+a carboxylic acid derivative [ingredient (h)]; and
(viii) ingredient (d)+ingredient (h)+ingredient (e).

Of these, the combination of ingredient (d)+ingredient (e) and the combination of ingredient (d)+ingredient (e)+ingredient (f) are preferable.

In the aluminum compound [ingredient (e)] of formula (18), (19) or (20), $R^{14}$ independently represents a hydrogen atom, a halogen atom, an alkyl or alkoxy group having 1 to 20 carbon atoms, or an aryl, aryloxy, arylalkyl, arylalkoxy, alkylaryl or alkylaryloxy group having 6 to 20 carbon atoms, provided that at least one of $R^{14}$s is an alkyl group having 1 to 20 carbon atoms; $R^{15}$ independently represents a hydrogen atom or a hydrocarbon group having 1 to 20 carbon atoms; and q is an integer of 2 to 60.

As non-limiting specific examples of the aluminum compound of formula (18), there can be mentioned trialkylaluminums such as trimethylaluminum, triethylaluminum, tri (n-propyl) aluminum, triisopropylaluminum, tri(n-butyl)aluminum, triisobutylaluminum, tri (t-butyl) aluminum and triamylaluminum; dialkylaluminum hydrides such as diisobutylaluminum hydride; dialkylaluminum halides such as dimethylaluminum chloride, diethylaluminum chloride, diisobutylaluminum chloride, di(t-butyl)aluminum chloride and diamylaluminum chloride; alkylaluminum dihalides such as methylaluminum dichloride, ethylaluminum dichloride, isobutylaluminum dichloride, t-butylaluminum dichloride and amylaluminum dichloride; and dialkylaluminum alkoxides such as diethylaluminum ethoxide. Of these, trialkylaluminums are preferable.

In the aluminoxane of formula (19) or (20), the hydrocarbon group in $R^{15}$ includes those which have 1 to 20 carbonatoms, such as a methyl group, an ethyl group, a propyl group, an isopropyl group, an isobutyl group and a t-butyl group. The aluminoxane of formula (19) or (20) may comprise a monomer such as trialkylaluminum, a dimer or an oligomer. The aluminoxane can be prepared by a conventional procedure, for example, a procedure wherein an organic aluminum compound is reacted with water, or an organic aluminum compound is reacted with a salt or a hydrate of oxide, in an organic solvent.

The contact of ingredient (d) with ingredient (e) can be carried out under an inert gas atmosphere in a solvent inert to the respective ingredients. The organic solvent used includes, for example, aliphatic hydrocarbons such as butane, pentane, hexane, heptane, octane, nonane, decane, tetradecane, cyclopentane and cyclohexane; and aromatic hydrocarbons such as benzene, toluene and xylene. Halogen-containing compounds such as chloroform, methylene chloride and chlorobenzene can also be used. The contact can be conducted at a temperature in the range of from −50° C. to the boiling point. Preferably the contact temperature is room temperature or higher.

The manner and order of adding ingredient (d) and ingredient (e) for the preparation of catalyst are not particularly limit. These ingredients can be added either as they are, or after they are pre-contacted.

The amount of ingredient (e) added is not particularly limited, but is preferably not larger than 100,000 times of the amount of ingredient (d). When the amount of ingredient (e) is too large, a deashing may be required. Preferably, ingredient (e) is used in an amount of 1 to 10,000 times of the amount of ingredient (d) in view of the stabilization of catalyst and the removal of catalytic poisons.

When ingredient (d) is used, two or more kinds of metallocene compounds can be used in combination.

In ingredient (f) of formula (21), (22), (23) or (24), H is proton, and E is a boron atom or an aluminum atom. $R^{16}$ is a Lewis base selected from an ether, an aliphatic amine, an aromatic amine or a phosphine, $R^{17}$ is a Lewis base such as an ether, an aliphatic amine, an aromatic amine or a phosphine, or a cyclopentadienyl group which may be substituted; J is a lithium, iron or silver atom. D is a carbonium cation or a tropylium cation. Ar independently represents a substituted or unsubstituted hydrocarbon group having 1 to 20 carbon atoms, which is selected from alkyl groups, aryl groups, aralkyl groups, aryl groups having a halogen substituent, aryl groups having a hydrocarbon group substituent, aryl groups having a hetero atom-containing hydrocarbon group as a substituent, aralkyl groups having a halogen substituent, aralkyl groups having a hydrocarbon group as a substituent, aralkyl groups having a hetero atom-containing hydrocarbon group as a substituent, aryl groups having as a substituent a silyl group having a hydrocarbon group, aryl groups having as a substituent a silyl group having a hetero atom-containing hydrocarbon group, aralkyl groups having as a substituent a silyl group having a hydrocarbon group, and aralkyl groups having as a substituent a silyl group having a hetero atom-containing hydrocarbon group. o is an integer of 0, 1 or 2.

As non-limiting specific examples of the protonic acid of formula (21), there can be mentioned diethyloxoniumtetrakis (pentafluorophenyl)borate, dimethyloxoniumtetrakis(pentafluorophenyl)borate, tetramethyleneoxoniumtetrakis(pentafluorophenyl)borate, hydroniumtetrakis (pentafluorophenyl)borate, trimethylammoniumtetrakis (pentafluorophenyl)borate, tri(n-butyl)ammoniumtetrakis (pentafluorophenyl)borate, N,N-dimethylaniliniumtetrakis (pentafluorophenyl)borate, diethyloxoniumtetrakis (pentafluorophenyl)aluminate, dimethyloxoniumtetrakis (pentafluorophenyl)aluminate, tetramethyleneoxoniumtetrakis(pentafluorophenyl)aluminate, hydroniumtetrakis(pentafluorophenyl)aluminate, N,N-dimethylaniliniumtetrakis(pentafluorophenyl)aluminate and tri (n-butyl) ammoniumtetrakis(pentafluorophenyl)aluminate.

As non-limiting specific examples of the metal salt of formula (22), there can be mentioned lithium salts such as lithiumtetrakis (pentafluorophenyl)borate and lithiumtetrakis (pentafluorophenyl)aluminate, and ether complxes of these lithium salts; ferrocenium salts such as ferroceniumtetrakis (pentafluorophenyl)borate and ferroceniumtetrakis(pentafluorophenyl)aluminate; and silver salts such as silvertetrakis(pentafluorophenyl)borate and silvertetrakis (pentafluorophenyl)aluminate.

As non-limiting specific examples of the Lewis acid salt of formula (23), there can be mentioned trityltetrakis(pentafluorophenyl)borate, trityltetrakis(pentafluorophenyl)aluminate, tropyriumtetrakis(pentafluorophenyl)borate and tropyriumtetrakis(pentafluorophenyl)aluminate.

As non-limiting specific examples of the Lewis acid of formula (24), there can be mentioned tris(pentafluorophenyl) borane, tris(2,3,5,6-tetrafluorophenyl)borane, tris(2,3,4,5-tetrafluorophenyl)borane, tris(3,4,5-trifluorophenyl)borane, phenylbis(pentafluorophenyl)borane and tris(3,4,5-trifluorophenyl)aluminum.

The contact of ingredient (d) with ingredient (f) can be carried out under an inert gas atmosphere in a solvent inert to the respective ingredients. The organic solvent used includes, for example, aliphatic hydrocarbons such as butane, pentane, hexane, heptane, octane, nonane, decane, tetradecane, cyclopentane and cyclohexane; and aromatic hydrocarbons such as benzene, toluene and xylene. Halogen-containing compounds such as chloroform, methylene chloride and chlorobenzene can also be used. The contact can be conducted at a temperature in the range of from −50° C. to the boiling point. Preferably the contact temperature is room temperature or higher.

The proportion in amount of ingredient (d) to ingredient (f) is preferably in the range of 10/1 to 1/1,000 by mol, more preferably 3/1 to 1/100 by mol.

As specific examples of the sulfonic acid salt [ingredient (g)], there can be mentioned trifluoromethanesulfonatolithium, trifluoromethanesulfonatosodium, trifluoromethanesulfonatopotassium, bis(trifluoromethanesulfonato)calcium, bis(trifluoromethanesulfonato)barium, tris(trifluoromethanesulfonato)titanium, tetrakis(trifluoromethanesulfonato)titanium, tetrakis(trifluoromethanesulfonato)zirconium, tetrakis(trifluoromethanesulfonato) hafnium, pentakis(trifluoromethanesulfonato)niobium, pentakis(trifluoromethanesulfonato)tantalum, tris(trifluoromethanesulfonato)iron, trifluoromethanesulfonatosilver, tris(trifluoromethanesulfonato)boron, tris(trifluoromethanesulfonato)aluminum, tris(trifluoromethanesulfonato)gallium, tetrakis(trifluoromethanesulfonato)tin, pentafluorobenzenesulfonatolithium, pentafluorobenzenesulfonatosodium, pentafluorobenzenesulfonatopotassium, bis (pentafluorobenzenesulfonato)magnesium, bis(pentafluorobenzenesulfonato)calcium, bis(pentafluorobenzenesulfonato)barium, tris(pentafluorobenzenesulfonato)titanium, tetrakis(pentafluorobenzenesulfonato)zirconium, tetrakis(pentafluorobenzenesulfonato)hafnium, pentakis (pentafluorobenzenesulfonato)niobium, pentakis(pentafluorobenzenesulfonato)tantalum, tris(pentafluorobenzenesulfonato)iron, pentafluorobenzenesulfonato)silver, tris (pentafluorobenzenesulfonato)boron, tris (pentafluorobenzenesulfonato)aluminum, tris (pentafluorobenzenesulfonato)gallium, tetrakis (pentafluorobenzenesulfonato)tin, bis (trifluoromethanesulfonato)magnesium, pentakis (trifluoromethanesulfonato)niobium, bis (pentafluorobenzenesulfonato)magnesium, tetrakis (pentafluorobenzenesulfonato)titanium and pentakis (pentafluorobenzenesulfonato)niobium.

The contact of ingredient (d) with ingredient (g) can be carried out under an inert gas atmosphere in a solvent inert to the respective ingredients. The organic solvent used includes, for example, aliphatic hydrocarbons such as butane, pentane, hexane, heptane, octane, nonane, decane, tetradecane, cyclopentane and cyclohexane; and aromatic hydrocarbons such as benzene, toluene and xylene. Halogen-containing compounds such as chloroform, methylene chloride and chlorobenzene can also be used. The contact can be conducted at a temperature in the range of from −50° C. to the boiling point. Preferably the contact temperature is room temperature or higher.

The proportion in amount of ingredient (d) to ingredient (g) is preferably in the range of 10/1 to 1/1,000 by mol, more preferably 3/1 to 1/100 by mol.

As specific examples of the carboxylic acid derivative [ingredient (h)], there can be mentioned trifluoroacetic acid, trichloroacetic acid, tribromoacetic acid, pentafluorobenzoic acid, tetrafluorotoluic acid, 2,4-(trifluoromethyl)benzoic acid and pentafluorophenylacetic acid.

The contact of ingredient (d) with ingredient (h) can be carried out under an inert gas atmosphere in a solvent inert to the respective ingredients. The organic solvent used includes, for example, aliphatic hydrocarbons such as butane, pentane, hexane, heptane, octane, nonane, decane, tetradecane, cyclopentane and cyclohexane; and aromatic hydrocarbons such as benzene, toluene and xylene. Halogen-containing compounds such as chloroform, methylene chloride and chlorobenzene can also be used. The contact can be conducted at a temperature in the range of from −50° C. to the boiling point. Preferably the contact temperature is room temperature or higher.

The proportion in amount of ingredient (d) to ingredient (h) is preferably in the range of 10/1 to 1/1,000 by mol, more preferably 3/1 to 1/100 by mol.

In the production of polyethylene composition using the catalyst comprising the metallocene compound [ingredient (d)] as the main catalytically active ingredient, the procedure of addition of ingredients (e), (f), (g) and (h) to ingredient (d), the order of addition of these ingredients to ingredient (d) and the procedure of contacting these ingredients with ingredient (d) are not particularly limited. A procedure of mixing together these ingredients with ingredient (d) in an inert solvent or in a monomer as solvent can be adopted. The order in which the respective ingredients are reacted, and the reaction conditions such as temperature and treating time, are not particularly limited.

No limitation is imposed to the procedure by which, after completion of the production of macromonomer in step I, the catalyst comprising the metallocene compound [ingredient (d)] and the optional ingredients (e), (f), (g) and (h) is incorporated in a polymerization system for the polymerization of the macromonomer-containing monomer mixture in step II. For example, there can be adopted (i) a procedure wherein the residual pressure in a polymerization system after the completion of the production of macromonomer is released, the atmosphere in the polymerization system is substituted with an inert gas, and then, the ingredient (d) and other ingredients are incorporated in the polymerization system; (ii) a procedure wherein the residual pressure in a polymerization system after the completion of the production of macromonomer is released, the atmosphere in the polymerization system is substituted with an inert gas, and then, the ingredient (d) and other ingredients, which have been subjected to a pre-contact treatment, are incorporated in the polymerization system; (iii) a procedure wherein the residual pressure in a polymerization system after the completion of the production of macromonomer is released, and then, without substitution of the atmosphere in the polymerization system with an inert gas, the ingredient (d) and other ingredients are incorporated in the polymerization system; and (iv) a procedure wherein the residual pressure in a polymerization system after the completion of the production of macromonomer is released, and then, without substitution of the atmosphere in the polymerization system with an inert gas, the ingredient (d) and other ingredients, which have been subjected to a pre-contact treatment, are incorporated in the polymerization system. The temperature at which the catalyst is incorporated in the polymerization system is not particularly limited, but is usually in the range of −50° C. to the boiling point of solvent.

In step II, the copolymerization of the macromonomer, ethylene and optional olefin having at least 3 carbon atoms can be commenced immediately after the incorporation of the catalyst comprising ingredient (d) and other ingredients in the polymerization system in step II, or alternatively the copolymerization thereof can be commenced after a predetermined time elapses from the incorporation of the catalyst. The time intervening between the incorporation of catalyst and the commencement of copolymerization is not particularly limited, and said time can be chosen within the range of one second to 24 hours. The polymerization initiation temperature is not particularly limited and is usually chosen in the range of −50° C. to the boiling point of solvent.

In the process of the present invention, two kinds or more of the metallocene compounds can be used as ingredient (a) or ingredient (d). By using two kinds or more of the metallocene compounds, the distribution of molecular weight of copolymer and the distribution of composition of copolymer can be broadened.

By the term "polymerization" as used in the specification, we mean a polymerization in a broad sense including homopolymerization and copolymetization.

By the process of the present invention, a particulate polyethylene composition can be stably produced.

The polymerization for the production of polyethylene composition of the present invention can be conducted in a liquid phase. In the case when the polymerization is conducted in a liquid phase, a particulate polyethylene composition having a uniform particle configuration can be obtained with a high efficiency. A liquid medium used in the liquid phase polymerization is not particularly limited, and convetional organic solvents can be used. As specific examples of the organic solvent, there can be mentioned benzene, toluene, xylene, propane, isobutane, pentane, heptane, cyclohexane and gasoline. The optional olefin having at least three carbon atoms such as propylene, 1-butane, 1-hexene and 1-octene can also be an organic solvent.

The polymerization conditions under which the polyethylene composition is produced, such as polymerization temperature, polymerization time, polymerization pressure and monomer concentration, are not particularly limited. Preferably, the polymerization temperature is in the range of −100 to 120° C., and, in view of productivity, the temperature is more preferably is in the range of 20 to 120° C. and especially preferably 60 to 120° C. The polymerization time is usually in the range of 10 seconds to 20 hours. The polymerization pressure is usually in the range of normal pressure to 300 MPa. Hydrogen may be introduced at polymerization to modify the molecular weight of polymer. Any of batchwise polymerization, semi-continuous polymerization and continuous polymerization can be adopted. The polymerization can be carried in two or more stages under different conditions.

After the completion of polymerization, the polyethylene composition can be separated from the polymerization liquid medium and dried by the conventional procedure for recover.

In the polymerization process, when an olefin having at least three carbon atoms is used for copolymerization with ethylene in the presence of the macromonomer, the feed ratio by mol of ethylene/olefin with at least 3 carbon atoms is usually in the range of 1 to 200, preferably 3 to 100 and more preferably 5 to 50.

Conventional additives can be added to the polyethylene composition of the present invention for use in various applications. The additives include, for example, a thermal stabilizer, a weathering stabilizer, an antistatic agent, an antifoggant, an anti-blocking agent, a slip agent, a lubricant, a nucleating agent, a pigment, inorganic fillers and reinforcing agents such as carbon black, talc, glass powder and glass fiber, organic fillers and reinforcing agents, a fire retarding agent and a neutron moderator.

The polyethylene composition of the present invention can be blended with other thermoplastic resins for use in various applications. As specific examples of the thermoplastic resin, there can be mentioned high-density polyethylene (HDPE), linear low-density polyethylene (LLDPE), low-density polyethylene (LDPE), polypropylene, poly-1-butne, poly-4-methyl-1-pentene, an ethylene-vinyl acetate copolymer, an ethylene-vinyl alcohol copolymer, polystyrene, and maleic anhydride-grafted products of these polymers.

The polyethylene composition of the present invention has good processability inherently possessed by LDPE and high mechanical strengths and melt-drawability possessed by HDPE and LLDPE.

EXAMPLES

The invention will now be specifically described by the following examples and comparative examples that by no means limit the scope of the invention.

In the examples and comparative examples, the preparation of catalysts for the synthesis of macromonomers, the synthesis of macromonomers, the preparation of ingredient (b) (modified clay compounds), the preparation of catalysts for the production of polyethylene compositions, the production of polyethylene compositions, and the purification of solvents were carried out in an inert gas atmosphere.

Solvents and other materials, which were used for the synthesis of catalysts for the production of macromonomers, the synthesis of macromonomers, the preparation of ingredient (b), the preparation of catalysts for the production of polyethylene compositions, and the production of polyethylene compositions, were previously purified, dried and deoxygenated by the conventional procedures. As biscyclopentadienylzirconium dichloride (zirconocene chloride), a commercially available compound supplied by Wako Pure Chemical Industries, Ltd. was used. Ingredients (a) (metallocene compounds) used were synthesized and identified by the conventional procedures. A solution in toluene of methylaluminoxane used (tradename, PMAO; Al: 2.4 mol/L) and a soloution in toluene of triisobutylaluminum used (0.848 M) were commercially available from TOSOH FINECHEM Corporation.

Properties of polyethylene compositions were determined by the following methods.

Weight Average Molecular Weight (Mw), Number Average Molecular Weight (Mn) and Ratio of Mw/Mn Mw, Mn and Mw/Mn were measured by gel permeation chromatography (GPC) wherein a GPC apparatus ("HLC-8121GPC/HT" available from Tosoh Corporation) and a column ("TSKgel GMHhr-H (20) HT" available from Tosoh Corporation) were used. The column temperature was 140° C. 1,2,4-trichlorobenzene was used as an eluting buffer. A specimen having a concentration of 1.0 mg/mL was prepared and 0.3 mL thereof was injected into the column. The calibration curve of molecular weight was standardized according to polystyrene having a known molecular weight. Mw and Mn were expressed as a linear polyethylene standard measured by GPC.

Shrinking Factor (g' Value)

The shrinking factor (g' value) was determined according to a method for measuring the intrinsic viscosity $[\eta]$ of polyethylene fractioned by GPC. The shrinking factor (g' value) was calculated by dividing $[\eta]$ of a polymer having a molecular weight of 700,000 that is determined by a combination of gel permeation chromatography (GPC) and intrinsic viscosity measurement using a universal calibration principle, or a molecular weight of three times of Mw as a linear polyethylene standard, by $[\eta]$ of HDPE with the same molecular weight and having no branch. In the GPC, a GPC apparatus ("HLC-8121GPC/HT" available from Tosoh Corporation) and a column ("TSKgel GMHhr-H(20)HT" available from Tosoh Corporation) were used. The column temperature was 145° C. 1,2,4-trichlorobenzene was used as an eluting buffer. A specimen having a concentration of 2.0 mg/mL was prepared and 0.3 mL thereof was injected into the column. As a viscometer, a capillary differential pressure viscometer ("210R+" available from Viscotek Co.) was used.

Shrinking Factor (g Value)

The shrinking factor (g value) was determined according to a method for measuring radius of gyration by light scattering of polyethylene fractioned by GPC. The shrinking factor (g value) was calculated by dividing the square average of radius of gyration of polymer having a molecular weight of 700,000 that is determined by a combination of gel permeation chromatography (GPC) and intrinsic viscosity measurement using a universal calibration principle, or a molecular weight of three times of Mw as a linear polyethylene standard, by the square average of radius of gyration of HDPE with the same molecular weight and having no branch. As a light scattering detector, a multi-angle light scattering detector ("DAWV EOS" available from Wyatt Technology Co.) was used at a wavelength of 690 nm and at a detecting angle of 29.5°, 33.3°, 39.0°, 44.8°, 50.7°, 57.5°, 64.4°, 72.3°, 81.1°, 90.0°, 98.9°, 107.7°, 116.6°, 125.4°, 133.2°, 140.0° and 145.8°.

Terminal Structure of Polymer

Terminal structure of polymer, such as vinyl terminal and saturated teminal, were measured according to $^{13}$C-NMR by a nuclear magnetic resonance apparatus ("JNM-ECA400 type", available from JEOL Ltd.). Tetrachloroethane-$d_2$ was used as a solvent. The frequency (X) of vinyl terminal was determined from an average value of peaks at 114 ppm and 139 ppm and expressed in terms of frequency per 1,000 methylene carbon atoms (chemical shift: 30 ppm) in the main chain. The frequency (Y) of saturated terminal was similarly determined from an average value of peaks at 32.3 ppm, 22.9 ppm and 14.1 ppm. Z value was calculated from X and Y according the following equation.

$$Z=[X/(X+Y)]\times 2$$

Density (d)

Density (d) was measured by a density gradient tube according to JIS K6760 (1995).

Frequency of Long Chain Branches

Frequency of long chain branches was measured according to $^{13}$C-NMR by a nuclear magnetic resonance apparatus ("JNM-GSX 270 type", available from JEOL Ltd.).

Flow Activation Energy (Ea)

A test specimen of polyethylene composition was prepared as follows. A thermal stabilizer (Irganox 1010™ available from Ciba Speciality Chemicals Co.) 1,500 ppm and a thermal stabilizer (Irgafos 168™ available from Ciba Speciality Chemicals Co.) 1,500 ppm were added to a polyethylene composition, and the mixture was kneaded together by using an internal mixer (Laboplastomill™ available from Toyo Seiki Seisakusho K.K.) at a screw rotation speed of 30 rpm and a temperature of 190° C. under a stream of nitrogen gas for three minutes to prepare a polyethylene composition specimen.

Using a cone-and-plate rheometer (SR2000™ available from Rheometrix Co.) shear storage modulus G' and shear loss modulus G" at a frequency in the range of 0.01 to 100 Hz were measured at temperatures of 160° C., 190° C. and 230° C. A shift factor at a reference temperature of 160° C. was determined by horizontal shift, and a flow activation energy Ea was calculated therefrom by the conventional method. Vertical shift was not conducted.

Melt Flow Rate (MFR)

MFR was measured at a temperature of 190° C. under a load of 2.16 kg.

Melt strength (MS) and Maximum Drawing Raio (DR)

A test specimen of polyethylene composition was prepared in the same manner as used for the test of flow activation energy.

Using a capillary viscometer having a barrel diameter of 9.55 mm (Capilograpgh™ available from Toyo Seiki Seisakusho K.K.), the measurement was carried at a die length (L) of 8 mm and a die diameter (D) of 2.095 mm, and an entrance angle of 90°. The melt strength (MS) was determined as a force (mN) required for taking off a polymer at a temperature of 160° C. or 190° C., a piston downstroke rate of 10 mm/min and a draw ratio of 47. When the maximum draw ratio is smaller than 47, MS was detemined as a force (mN) required for taking off a molten polymer at the maximum draw ratio. The maximum draw ratio (DR) was measured at a temperature of 160° C. while the take-off speed was elevated at a rate of 20 m/min per minute. The maximum draw ratio (DR) is defined as the draw ratio at breaking. The take-off was carried in a chamber maintained at a constant temperature of 23° C.

Elongation Viscosity

A test specimen of polyethylene composition was prepared in the same manner as used for the test of flow activation energy.

Elongation viscosity was measured at a temperature of 160° C. using a Meissner-type uniaxial elongation viscometer (Melten Rheometer™ available from Toyo Seiki Seisakusho K.K.). Non-linear parameter (λ) was determined as a ratio of the maximum elongation viscosity as measured at a strain rate of 0.07 to 0.1 s$^{-1}$ to the elongation viscosity in the linear region at the time when the measured elongation viscosity shows a maximum value. The elongation viscosity in the linear region was calculated from the dynamic viscoelasticity according to the approximate formula and the method described in M. Yamaguchi et al, Polymer Journal, 32, 164 (2000).

Macromonomer Synthesis Example 1

Preparation of Catalyst 19.5 mL of toluene and 0.5 mL of a solution of methylalumoxane in toluene (Al: 2.4 mol/L) were added to 16.1 mg (55.2 μmol) of biscyclopentadienylzirconium dichloride, and the mixture was stirred at 25° C. for one hour to prepare a catalyst for the sythesis of macromonomer.

Synthesis of Macrmonomer

A 2 L autoclave was charged with 1,200 mL of toluene, and the temperature of the inside of autoclave was elevated to 90° C. Then ethylene was introduced unitl the partial pressure reached 0.25 MPa. The entire amount of the catalyst, prepared in the above-mentioned manner, was incorporated in the autoclave to initiate polymerization. During polymerization, ethylene was continuously introduced so that the partial pressure of 0.25 MPa was maintained. The polymerization temperature was maintained at 80° C. When 90 minutes elapsed from the initiation of polymerization, the inner pressure of autoclave was released and thereafter the content was filtered. The collected ethylene polymer was dried under a reduced pressure at 90° C. for 12 hours. Thus, 140 g of a bulky macromonomer was obtained.

The macromonomer had a Mn of 20,000 and a Mw/Mn ratio of 2.6. The content of terminal vinyl was 0.97 mol per mol of the macromonomer. Analysis of the terminal structure of macromonomer according to $^{13}$C-NMR revealed that the ratio (Z) of the frequency of vinyl terminal to the frequency of saturated terminal was 0.9. As results of $^{13}$C-NMR analysis, a methyl branch, an ethyl branch, a propyl branch, a butyl branch, a pentyl branch, a hexyl branch and a higher alkyl branch were not detected. The thus-obtained macromonomer was pulverized into particles, and used for the production of a polyethylene composition, mentioned below.

Macromonomer Synthesis Example 2

Preparation of Catalyst 19.1 mL of toluene and 0.9 mL of a solution of methylalumoxane in toluene (Al: 2.4 mol/L) were added to 26.6 mg (91.0 μmol) of biscyclopentadienylzirconium dichloride, and the mixture was stirred at 25° C. for one hour to prepare a catalyst for the sythesis of macromonomer.

Synthesis of Macrmonomer

Using the catalyst prepared in the above-mentioned manner, ethylene was polymerized by the same procedures as those in Macromonomer Synthesis Example 1 except that the partial pressure of ethylene was changed to 0.10 MPa. Thus, 150 g of a bulky ethylene polymer was obtained.

The macromonomer had a Mn of 9,000 and a Mw/Mn ratio of 2.5. The content of terminal vinyl was 0.95 mol per mol of the macromonomer. As results of $^{13}$C-NMR analysis, a methyl branch, an ethyl branch, a propyl branch, a butyl branch, a pentyl branch, a hexyl branch and a higher alkyl branch were not detected. The thus-obtained macromonomer was pulverized into particles, and used for the production of a polyethylene composition, mentioned below.

Macromonomer Synthesis Example 3

Preparation of Catalyst 20 mL of toluene and 37.1 mg (134.9 µmol) of bis(1,5-cyclooctadiene)nickel were added to 21.7 mg (45.0 µmol) of sodium 1-benzoyl-1-(triphenylphosphoranylidene)methanesulfonate, and the mixture was stirred at 25° C. for 15 minutes to prepare a catalyst for the sythesis of macromonomer.

Synthesis of Macrmonomer

A 2 L autoclave was charged with 500 mL of toluene, and the temperature of the inside of autoclave was elevated to 70° C. Then ethylene was introduced unitl the partial pressure rached 1.0 MPa. The entire amount of the catalyst, prepared in the above-mentioned manner, was incorporated in the autoclave to initiate polymerization. During polymerization, ethylene was continuously introduced so that the partial pressure of 1.0 MPa was maintained. The polymerization temperature was maintained at 70° C. When 45 minutes elapsed from the initiation of polymerization, the inner pressure of autoclave was released to 0 MPa and thereafter the content was filtered. The collected ethylene polymer was dried under a reduced pressure at 90° C. for 12 hours. Thus, 160 g of a bulky macromonomer was obtained.

The macromonomer had a Mn of 4,500 and a Mw/Mn ratio of 3.0. The content of terminal vinyl was 0.98 mol per mol of the macromonomer. As results of $^{13}$C-NMR analysis, a methyl branch, an ethyl branch, a propyl branch, a butyl branch, a pentyl branch, a hexyl branch and a higher alkyl branch were not detected. The thus-obtained macromonomer was pulverized into particles, and used for the production of a polyethylene composition, mentioned below.

Example 1

Preparation of Modified Clay Compound [Ingredient (b)]

To 350 mL of water, 150 mL of ethanol and 8.3 mL of 37% concentrated hydrochloric acid were added, and then, 29.7 g (0.1 mol) of N,N-dimethyloctadecylamine was added. The mixture was heated to 60° C. to give a solution of N,N-dimethyloctadecylamine hydrochloride. To this solution, 100 g of hectolite was added. The thus-obtained slurry was stirred at 60° C. for 3 hours. The supernatant was removed, and the residual liquid was washed with 1 L of water at 60° C. and then dried at 60° C. under a pressure of $10^{-3}$ Torr for 24 hours. The dried product was pulverized by a jet mill to give a modified hectolite having an average particle diameter of 5.2 µm. Elemental analysis of the modified hectolite revealed that the amount of N,N-dimethyloctadecylammonium ion was 0.848 mmol per g of the modified hectolite.

Preparation of Catalyst

To 8.0 g of the above-prepared modified hectolite [ingredient (b)], 60 mL of a solution of triisobutylaluminum [ingredient (c)] (0.714 M) in hexane was added, and the mixture was stirred at room temperature for one hour to obtain a contact product of ingredient (b) with ingredient (c). Separately, 8.8 mL of n-hexane and 11.2 mL of a solution of triisobutylaluminum [ingredient (c)] (0.714 M; 8 mmol) in hexane were added to 178.1 mg (320 µmol) of diphenylmethylene(cyclopentadienyl)(fluorenyl)zirconium dichloride [ingredient (a)], and the mixture was stirred at room temperature for 30 minutes to give a contact product of ingredient (a) with ingredient (c). The entire amount of the contact product of ingredient (a) with ingredient (c) was added to the entire amount of the contact product of ingredient (b) with ingredient (c), and the mixuture was stirred at 60° C. for 6 hours. The supernatant was removed and the residual liquid was washed with 80 mL of n-hexane to give a contact product of ingredient (a), ingredient (b) and ingredient (c). The contact product was diluted with 80 mL of n-hexane to give a catalyst slurry (100 g/L).

Production of Polyethylene Composition

A 2 L autoclave was charged with 135.0 g of the macromonomer prepared in Macromonomer Synthesis Example 1, 1,200 mL of tolune and 2.4 mL of a solution of triisobutylaluminum (0.848 mol/L) in toluene, and the temperature of the inside of antoclave was elevated to 90° C. Then ethylene was introduced until the partial pressure reached 0.1 MPa. During polymerization, ethylene was continuously introduced so that the partial pressure of 0.1 MPa was maintained. The polymerization temperature was maintained at 90° C. When 30 minutes elapsed from the initiation of polymerization, the inner pressure of autoclave was released to 0 MPa, and thereafter the content was filtered. The collected ethylene polymer was dried under a reduced pressure at 90° C. for 12 hours. Thus, 161.9 g of a polyethylene composition was obtained, which was bulky similarly to the macromonomer used.

The macromonomer content, Mw, Mw/Mn, frequency of long chain branches, g' value and density of the polyethylene composition are shown in Table 1. Melt characteristics of the plyethylene composition are shown in Table 2.

Example 2

Preparation of Catalyst

To 2.8 mg (5.0 µmol) of diphenylmethylene(cyclopentadienyl)(fluorenyl)zirconium dichloride [ingredient (a)], 19.4 mL of toluene and 0.59 mL of a solution of triisobutylaluminum [ingredient (c)] (0.848 mol/L) in toluene were added, and the mixture was stirred at 25° C. for 30 minutes. To the thus-obtained solution, 4.8 mg (6.0 µmol) of N,N-dimethylanilinium salt of tetrakis(pentafluorophenylborate) was added, and the mixture was stirred at 25° C. for 30 minutes to give a catalyst for the production of a polyethylene composition.

Production of Polyethylene Composition

A 2 L autoclave was charged with 135.0 g of the macromonomer prepared in Macromonomer Synthesis Example 1, 1,200 mL of tolune and 2.4 mL of a solution of triisobutylaluminum (0.848 mol/L) in toluene, and the temperature of the inside of antoclave was elevated to 90° C. Then ethylene was introduced until the partial pressure reached 0.1 MPa. To the autoclave, the entire amount of the above-mentioned catalyst was added to initiate polymerization. During polymerization, ethylene was continuously introduced so that the partial pressure of 0.1 MPa was maintained. The polymerization temperature was maintained at 90° C. When 30 minutes elapsed from the initiation of polymerization, the inner pressure of autoclave was released to 0 MPa, and thereafter the content was filtered. The collected ethylene polymer was dried under a reduced pressure at 90° C. for 12 hours. Thus, 161.9 g of a polyethylene composition was obtained, which was bulky similarly to the macromonomer used.

The macromonomer content, Mw, Mw/Mn, frequency of long chain branches, g' value and density of the polyethylene composition are shown in Table 1. Melt characteristics of the plyethylene composition are shown in Table 2.

Example 3

Production of Polyethylene Composition

Polymerization of ethylene was carried out in the same manner as in Example 2, Production of Polyethylene Composition, except that the polymerization time was changed to 16 minutes. Thus, 151.4 g of a polyethylene composition was obtained, which was bulky similarly to the macromonomer used. The macromonomer content, Mw, Mw/Mn, frequency of long chain branches, g' value and density of the polyethylene composition are shown in Table 1. Melt characteristics of the plyethylene composition are shown in Table 2.

Example 4

Production of Polyethylene Composition

Polymerization of ethylene was carried out in the same manner as in Example 2, Production of Polyethylene Composition, except that the polymerization time was changed to 8 minutes. Thus, 143.5 g of a polyethylene composition was obtained, which was bulky similarly to the macromonomer used. The macromonomer content, Mw, Mw/Mn, frequency of long chain branches, g' value and density of the polyethylene composition are shown in Table 1. Melt characteristics of the plyethylene composition are shown in Table 2.

Example 5

Production of Polyethylene Composition

Polymerization of ethylene was carried out in the same manner as in Example 2, Production of Polyethylene Composition, except that the polymerization time was changed to 60 minutes. Thus, 168.7 g of a polyethylene composition was obtained, which was bulky similarly to the macromonomer used. The macromonomer content, Mw, Mw/Mn, frequency of long chain branches, g' value and density of the polyethylene composition are shown in Table 1. Melt characteristics of the plyethylene composition are shown in Table 2.

Example 6

Production of Polyethylene Composition

Polymerization of ethylene was carried out in the same manner as in Example 2, Production of Polyethylene Composition, except that 270.0 g of the macromonomer prepared in Macromonomer Synthesis Example 1 was used and the polymerization time was changed to 90 minutes. Thus, 297.0 g of a polyethylene composition was obtained, which was bulky similarly to the macromonomer used. The macromonomer content, Mw, Mw/Mn, frequency of long chain branches, g' value and density of the polyethylene composition are shown in Table 1. Melt characteristics of the plyethylene composition are shown in Table 2.

Example 7

Production of Polyethylene Composition

Polymerization of ethylene was carried out in the same manner as in Example 2, Production of Polyethylene Composition, except that 45.0 g of the macromonomer prepared in Macromonomer Synthesis Example 2 was used and the polymerization time was changed to 11 minutes. Thus, 78.5 g of a polyethylene composition was obtained, which was bulky similarly to the macromonomer used. The macromonomer content, Mw, Mw/Mn, frequency of long chain branches, g' value and density of the polyethylene composition are shown in Table 1. Melt characteristics of the plyethylene composition are shown in Table 2.

Example 8

Production of Polyethylene Composition

Polymerization of ethylene was carried out in the same manner as in Example 2, Production of Polyethylene Composition, except that 135.0 g of the macromonomer prepared in Macromonomer Synthesis Example 1 was used, 7 g of 1-butene was further added, and the polymerization time was changed to 30 minutes. Thus, 161 g of a polyethylene composition was obtained, which was bulky similarly to the macromonomer used. The macromonomer content, Mw, Mw/Man, frequency of long chain branches, g' value and density of the polyethylene composition are shown in Table 1. Melt characteristics of the polyethylene composition are shown in Table 2.

Comparative Example 1

Production of Polyethylene Composition

Polymerization of ethylene was carried out in the same manner as in Example 2, Production of Polyethylene Composition, except that 20.0 g of the macromonomer prepared in Macromonomer Synthesis Example 3 was used, and the polymerization time was changed to 12 minutes. Thus, 45.8 g of a polyethylene composition was obtained, which was bulky similarly to the macromonomer used. The macromonomer content, Mw, Mw/Mn, frequency of long chain branches, g' value and density of the polyethylene composition are shown in Table 1. Melt characteristics of the polyethylene composition are shown in Table 2. When Mn of the macromonomer was smaller than 5,000, the processability was poor.

Comparative Example 2

Evaluation of Polyethylene

Mw, Mw/Mn, frequency of long chain branches and other properties of commercially available ethylene-1-octene copolymer ("EG 8100", prepared by using a metallocene catalyst, available from Dow Chemical Co.) were evaluated. The results are shown in Table 1. Melt characteristics of the ethylene-1-octene copolymer are shown in Table 2. When the frequency of long chain branches exceeds 3 per 1,000 carbon atoms, the processability was poor.

TABLE 1

|  | Content of macromonomer (wt. %) | MFR (g/10 min) | Mw (×10⁴) | Mw/Mn | Freq. of long chain branches (/1000 C.) | g' value at 700K | g' value at 3 Mw | log(g')/log(g) at 700K | log(g')/log(g) at 3 Mw | Density (g/cm³) |
|---|---|---|---|---|---|---|---|---|---|---|
| Ex. 1 | 40 | 0.85 | 9.0 | 4.5 | 0.10 | 0.58 | 0.62 | 0.88 | 0.60 | 0.963 |
| Ex. 2 | 44 | 0.90 | 8.8 | 4.1 | 0.08 | 0.60 | 0.72 | 0.88 | 0.77 | 0.964 |
| Ex. 3 | 60 | 0.44 | 9.9 | 4.2 | 0.07 | 0.62 | 0.73 | 0.88 | 0.44 | 0.959 |
| Ex. 4 | 65 | 0.35 | 9.5 | 3.0 | 0.05 | 0.66 | 0.74 | 0.87 | 0.40 | 0.958 |
| Ex. 5 | 16 | 0.14 | 11.6 | 3.5 | 0.10 | 0.50 | 0.59 | 0.80 | 0.31 | 0.954 |
| Ex. 6 | 83 | 6.4 | 6.2 | 4.2 | 0.11 | — | 0.47 | — | 0.48 | 0.965 |
| Ex. 7 | 38 | 0.12 | 7.5 | 3.7 | 0.15 | 0.35 | 0.64 | 0.90 | 0.56 | 0.959 |
| Ex. 8 | 83 | 0.82 | 8.8 | 4.3 | 0.18 | 0.42 | 0.49 | 0.71 | 0.49 | 0.950 |
| Co. Ex. 1 | 31 | 1.00 | 9.5 | 4.5 | 0.31 | — | 0.59 | — | 1.07 | 0.957 |
| Co. Ex. 2 | 0 | 0.99 | 9.0 | 2.2 | 20.0 | 0.42 | 0.66 | 1.25 | 0.80 | 0.872 |

Note,
—: Polymer concentration was too low to measure the value.

TABLE 2

|  | MFR (g/10 min) | Ea (kJ/mol) | $Ms_{160}$ (mN) | Right side of formula (27) | Right side of formula (27') | Right side of formula (27") | $Ms_{190}$ (mN) | Right side of formula (3) | Right side of formula (3') | DR | logDR | Right side of formula (4) | λ |
|---|---|---|---|---|---|---|---|---|---|---|---|---|---|
| Ex. 1 | 0.85 | 50.0 | 215 | 118 | 138 | 158 | 145 | 25 | 35 | 225 | 2.35 | 1.90 | 2.7 |
| Ex. 2 | 0.90 | 47.5 | 205 | 115 | 135 | 155 | 125 | 24 | 33 | 220 | 2.34 | 1.93 | 2.4 |
| Ex. 3 | 0.44 | 44.1 | 205 | 149 | 169 | 189 | 155 | 45 | 62 | 225 | 2.35 | 1.93 | 2.5 |
| Ex. 4 | 0.35 | 43.0 | 220 | 160 | 180 | 200 | 170 | 55 | 76 | 250 | 2.40 | 1.88 | 2.4 |
| Ex. 5 | 0.14 | 39.0 | 255 | 204 | 224 | 244 | 165 | 124 | 169 | 125 | 2.10 | 1.80 | 1.8 |
| Ex. 6 | 6.4 | 35.7 | 45 | 21 | 41 | 61 | 25 | 4 | 6 | 300 | 2.48 | 2.80 | 1.8 |
| Ex. 7 | 0.12 | 39.0 | 215 | 211 | 231 | 251 | 160 | 142 | 194 | 140 | 2.15 | 1.93 | 2.2 |
| Ex. 8 | 0.82 | 42.1 | 125 | 119 | 139 | 159 | 90 | 26 | 36 | 270 | 2.43 | 2.21 | 2.3 |
| Co. Ex. 1 | 1.00 | 40.0 | 40 | 110 | 130 | 150 | 15 | 22 | 30 | 300 | 2.48 | 2.87 | 1.3 |
| Co. Ex. 2 | 0.99 | 32.7 | 25 | 111 | 131 | 151 | 10 | 22 | 30 | 285 | 2.45 | 3.14 | 1.1 |

Example 9

Preparation of Modified Clay Compound [Ingredient (b)]

To 60 mL of water, 60 mL of ethanol and 2.0 mL of 37% concentrated hydrochloric acid were added, and then, 11.7 g (0.022 mol) of N-methyldioleylamine was added. The mixture was heated to 60° C. to give a solution of N-methyldioleylamine hydrochloride. To this solution, 20 g of hectolite was added. The thus-obtained slurry was stirred at 60° C. for 3 hours. The supernatant was removed, and the residual liquid was washed with 1 L of water at 60° C. and then dried at 60° C. under a pressure of $10^{-3}$ Torr for 24 hours. The dried product was pulverized by a jet mill to give a modified hectolite having an average particle diameter of 5.2 μm. Elemental analysis of the modified hectolite revealed that the amount of N-methyldioleylammonium ion was 0.85 mmol per g of the modified hectolite.

Preparation of Catalyst for Synthesis of Macromonomer 8.0 g of the above-mentioned modified hectolite was suspended in 29 mL of hexane. 46 mL of a solution of triisobutylaluminum (0.714 M) in hexane was added to the suspension of the modified hectolite, and the mixture was stirred at room temperature for one hour to give a contact product of ingredient (b) with ingredient (c). A solution of 14.0 mg (40 μmol) of dimethylsilanediylbis(cyclopentadienyl)zirconium dichloride in toluene was added to the contact product of ingredient (b) with ingredient (c), and the mixture was stirred at room temperature overnight to give a catalyst slurry (100 g/L).

Synthesis of Macromonomer

A 2 L autoclave was charged with 1,200 mL of hexane and 1.0 mL of a solution of triisobutylaluminum (0.714 mol/L) in hexane, and the temperature of the inside of autoclave was elevated to 90° C. Then 10.0 mL of the above-mentioned catalyst slurry was added into the autoclave, and ethylene was introduced unitl the partial pressure rached 1.2 MPa to initiate polymerization. During polymerization, ethylene was continuously introduced so that the partial pressure of 1.2 MPa was maintained. The polymerization temperature was maintained at 90° C. When 29 minutes elapsed from the initiation of polymerization, the inner temperature was lowered to 50° C. and the inner pressure of autoclave was reduced to 0.1 MPa. Then nitrogen was introduced into the autoclave to a pressure of 0.6 MPa and then the inner pressure was released. This procedure of the introduction of nitrogen and the release of the inner pressure was repeated 5 times.

A sample of the thus-prepared macromonomer was taken from the autoclave, and analyzed. The macromonomer had a Mn of 9,600 and a Mw/Mn ratio of 2.3. $^{13}$C-NMR analysis of the terminal structure of the macromonomer revealed that the ratio (Z) of the frequency of vinyl terminal to the frequency of saturated terminal was 0.57. $^{13}$C-NMR analysis revealed that the frequency of methyl branches was 0.52 per 1,000 carbon atoms and the frequency of ethyl branches was 1.22 per 1,000 carbon atoms, and further that long chain branches were not detected.

Production of Polyethylene Composition

The 2 L autoclave containing the above-prepared macromonomer was charged with 1.0 mL of a solution of triisobutylaluminum (0.714 mol/L) in hexane, and the temperature of the inside of antoclave was elevated to 85° C. Then the content was stirred for 30 minutes while the temperature was maintained at 85° C. Then 20 mL of a solution of 20 μmol of diphenylmethylene(1-cyclopentadienyl) (9-fluorenyl)zirconium dichloride in toluene was added into the autoclave, and the content was stirred for one hour while the temperature was maintained at 85° C. Then ethylene was introduced until the partial pressure reached 0.1 MPa to initiate polymerization. During polymerization, ethylene was continuously introduced so that the partial pressure of 0.1 MPa was maintained. The polymerization temperature was maintained at 85° C. When 180 minutes elapsed from the initiation of polymerization, the inner pressure of autoclave was released, and thereafter the content was filtered under vacuum. The collected ethylene polymer was dried to give 132 g of a polyethylene composition.

The density, Mw, Mw/Mn, frequency of long chain branches and powder bulk density of the polyethylene composition, and the content of the newly produced polyethylene in the polyethylene composition are shown in Table 3. Melt characteristics of the plyethylene composition are shown in Table 4.

Example 10

Synthesis of Macromonomer

A macromonomer was synthesized by the same procedures as described in Example 9, Synthesis of Macromonomer, except that the amount of catalyst slurry was changed to 5.0 mL and, when 16 minutes elapsed from the initiation of polymerization, the inner pressure was released.

Production of Polyethylene Composition

Polymerization of ethylene was conducted by the same procedures as described in Example 9, Production of Polyethylene Composition, except that 10 μmol of diphenylmethylene(1-indenyl)(9-fluorenyl)zirconium dichloride was used instead of 20 μmol of diphenylmethylene(1-cyclopentadienyl)(9-fluorenyl)zirconium dichloride. Thus, 161 g of a polyethylene composition was obtained.

The density, Mw, Mw/Mn, frequency of long chain branches and powder bulk density of the polyethylene composition, and the content of the newly produced polyethylene in the polyethylene composition are shown in Table 3. Melt characteristics of the plyethylene composition are shown in Table 4.

Example 11

Synthesis of Macromonomer

A macromonomer was synthesized by the same procedures as described in Example 9, Synthesis of Macromonomer, except that the amount of catalyst slurry was changed to 2.5 mL and, when 26 minutes elapsed from the initiation of polymerization, the inner pressure was released.

Production of Polyethylene Composition

Polymerization of ethylene was conducted by the same procedures as described in Example 9, Production of Polyethylene Composition, except that 5 μmol of diphenylmethylene(1-indenyl)(2,7-di-t-butyl-9-fluorenyl)zirconium dichloride was used instead of 20 μmol of diphenylmethylene (1-cyclopentadienyl)(9-fluorenyl)zirconium dichloride. Thus, 122 g of a polyethylene composition was obtained.

The density, Mw, Mw/Mn, frequency of long chain branches, powder bulk density and g' value of the polyethylene composition, and the content of the newly produced polyethylene in the polyethylene composition are shown in Table 3. Melt characteristics of the plyethylene composition are shown in Table 4.

Example 12

Synthesis of Macromonomer

A macromonomer was synthesized by the same procedures as described in Example 9, Synthesis of Macromonomer, except that the amount of catalyst slurry was changed to 5.0 mL and, when 25 minutes elapsed from the initiation of polymerization, the inner pressure was released.

Production of Polyethylene Composition

Polymerization of ethylene was conducted by the same procedures as described in Example 9, Production of Polyethylene Composition, except that 10 mmol of diphenylmethylene(1-indenyl)(2,7-di-t-butyl-9-fluorenyl)zirconium dichloride was used instead of 20 μmol of diphenylmethylene (1-cyclopentadienyl)(9-fluorenyl)zirconium dichloride. Thus, 151 g of a polyethylene composition was obtained.

The density, Mw, Mw/Mn, frequency of long chain branches and powder bulk density of the polyethylene composition, and the content of the newly produced polyethylene in the polyethylene composition are shown in Table 3. Melt characteristics of the plyethylene composition are shown in Table 4.

Example 13

Synthesis of Macromonomer

A macromonomer was synthesized by the same procedures as described in Example 9, Synthesis of Macromonomer, except that the amount of catalyst slurry was changed to 0.25 mL, the polymerization temperature was changed to 85° C., and, when 56 minutes elapsed from the initiation of polymerization, the inner pressure was released.

Production of Polyethylene Composition

Polymerization of ethylene was conducted by the same procedures as described in Example 9, Production of Polyethylene Composition, except that 5 μmol of diphenylmethylene(1-cyclopentadienyl)(2,7-di-t-butyl-9-fluorenyl)zirconium dichloride was used instead of 20 μmol of diphenylmethylene(1-cyclopentadienyl)(9-fluorenyl)zirconium dichloride. Thus, 116 g of a polyethylene composition was obtained.

The density, Mw, Mw/Mn, frequency of long chain branches, powder bulk density and g' value of the polyethylene composition, and the content of the newly produced polyethylene in the polyethylene composition are shown in Table 3. Melt characteristics of the plyethylene composition are shown in Table 4.

Example 14

Synthesis of Macromonomer

A macromonomer was synthesized by the same procedures as described in Example 9, Synthesis of Macromonomer, except that the amount of catalyst slurry was changed to 0.25 mL, the polymerization temperature was changed to 85° C., and, when 34 minutes elapsed from the initiation of polymerization, the inner pressure was released.

Production of Polyethylene Composition

Polymerization of ethylene was conducted by the same procedures as described in Example 9, Production of Polyethylene Composition, except that 3 mL of butane-1 was added, and then, 5 μmol of diphenylmethylene(1-cyclopentadienyl)(2,7-di-t-butyl-9-fluorenyl)zirconium dichloride was added instead of 20 μmol of diphenylmethylene(1-cyclopentadienyl)(9-fluorenyl)zirconium dichloride, and immediately thereafter ethylene was introduced, and, when 90 minutes elapsed, the inner pressure was released. Thus, 113 g of a polyethylene composition was obtained.

The density, Mw, Mw/Mn, frequency of long chain branches and powder bulk density of the polyethylene composition, and the content of the newly produced polyethylene in the polyethylene composition are shown in Table 3. Melt characteristics of the plyethylene composition are shown in Table 4.

Example 15

Preparation of Modified Clay Compound [Ingredient (b)]

To 60 mL of water, 60 mL of ethanol and 2.0 mL of 37% concentrated hydrochloric acid were added, and then, 6.55 g (0.022 mol) of N,N-dimethyloctadecylamine was added. The mixture was heated to 60° C. to give a solution of N,N-dimethyloctadecylamine hydrochloride. To this solution, 20 g of montmorillonite was added. The thus-obtained slurry was stirred at 60° C. for 3 hours. The supernatant was removed, and the residual liquid was washed with 1 L of water at 60° C. and then dried at 60° C. under a pressure of $10^{-3}$ Torr for 24 hours. The dried product was pulverized by a jet mill to give a modified montmorillonite having an average particle diameter of 5.2 μm. Elemental analysis of the modified montmorillonite revealed that the amount of N,N-dimethyloctadecylammonium ion was 1.0 mmol per g of the modified montmorillonite.

Preparation of Catalyst for Synthesis of Macromonomer 8.0 g of the above-mentioned modified montmorillonite was suspended in 29 mL of hexane. 46 mL of a solution of triisobutylaluminum (0.714 M) in hexane was added to the suspension of the modified montmorillonite, and the mixture was stirred at room temperature for one hour to give a contact product of ingredient (b) with ingredient (c). A solution of 55.8 mg (160 μmol) of dimethylsilanediylbis (cyclopentadienyl) zirconium dichloride in toluene was added to the contact product of ingredient (b) with ingredient (c), and the mixture was stirred at room temperature overnight to give a catalyst slurry (100 g/L).

Synthesis of Macrmonomer

A 2 L autoclave was charged with 1,200 mL of hexane and 1.0 mL of a solution of triisobutylaluminum (0.714 mol/L) in hexane, and the temperature of the inside of autoclave was elevated to 90° C. Then 5.0 mL of the above-mentioned catalyst slurry was added into the autoclave, and ethylene was introduced unitl the partial pressure reached 1.2 MPa to initiate polymerization. During polymerization, ethylene was continuously introduced so that the partial pressure of 1.2 MPa was maintained. The polymerization temperature was maintained at 90° C. When 19 minutes elapsed from the initiation of polymerization, the inner temperature was lowered to 50° C. and the inner pressure of autoclave was reduced to 0.1 MPa. Then nitrogen was introduced into the autoclave to a pressure of 0.6 MPa and then the inner pressure was released whereby the inner atmosphere was substituted with nitrogen gas. This procedure of the introduction of nitrogen and the release of the inner pressure was repeated 5 times.

A sample of the thus-prepared macromonomer was taken from the autoclave, and analyzed. The macromonomer had a Mn of 14,000 and a Mw/Mn ratio of 2.4. $^{13}$C-NMR analysis of the terminal structure of the macromonomer revealed that the ratio (Z) of the frequency of vinyl terminal to the frequency of saturated terminal was 0.65. $^{13}$C-NMR analysis revealed that the frequency of methyl branches was 0.41 per 1,000 carbon atoms and the frequency of ethyl branches was 0.96 per 1,000 carbon atoms, and further that long chain branches were not detected.

Production of Polyethylene Composition

The 2 L autoclave containing the above-prepared macromonomer was charged with 1.0 mL of a solution of triisobutylaluminum (0.714 mol/L) in hexane, and the temperature of the inside of antoclave was elevated to 85° C. Then the content was stirred for 30 minutes while the temperature was maintained at 85° C. Then 20 mL of a solution of 20 μmol of diphenylmethylene(1-cyclopentadienyl)(9-fluorenyl)zirconium dichloride in toluene was added into the autoclave, and the content was stirred for one hour while the temperature was maintained at 85° C. Then ethylene was introduced until the partial pressure reached 0.1 MPa to initiate polymerization. During polymerization, ethylene was continuously introduced so that the partial pressure of 0.1 MPa was maintained. The polymerization temperature was maintained at 85° C. When 180 minutes elapsed from the initiation of polymerization, the inner pressure of autoclave was released, and thereafter the content was filtered under vacuum. The collected ethylene polymer was dried to give 152 g of a polyethylene composition.

The density, Mw, Mw/Mn, frequency of long chain branches and powder bulk density of the polyethylene composition, and the content of the newly produced polyethylene in the polyethylene composition are shown in Table 3. Melt characteristics of the plyethylene composition are shown in Table 4.

Example 16

Synthesis of Macromonomer

A macromonomer was synthesized by the same procedures as described in Example 15, Synthesis of Macromonomer, except that the amount of catalyst slurry was changed to 2.5 mL and, when 16 minutes elapsed from the initiation of polymerization, the inner pressure was released.

Production of Polyethylene Composition

Polymerization of ethylene was conducted by the same procedures as described in Example 15, Production of Polyethylene Composition, except that 10 μmol of diphenylmethylene-(1-indenyl)(9-fluorenyl)zirconium dichloride was used instead of 20 μmol of diphenylmethylene(1-cyclopentadienyl)-(9-fluorenyl) zirconium dichloride, and, when 180 minutes elapsed from the initiation of polymerization, the inner pressure was released. Thus, 148 g of a polyethylene composition was obtained.

The density, Mw, Mw/Mn, frequency of long chain branches, powder bulk density and g' value of the polyethylene composition, and the content of the newly produced polyethylene in the polyethylene composition are shown in Table 3. Melt characteristics of the plyethylene composition are shown in Table 4.

Example 17

Synthesis of Macromonomer

A macromonomer was synthesized by the same procedures as described in Example 15, Synthesis of Macromonomer, except that the amount of catalyst slurry was changed to 2.5 mL and, when 20 minutes elapsed from the initiation of polymerization, the inner pressure was released.

Production of Polyethylene Composition

Polymerization of ethylene was conducted by the same procedures as described in Example 15, Production of Polyethylene Composition, except that 30 μmol of diphenylmethylene-(1-indenyl)(9-fluorenyl)zirconium dichloride was used instead of 20 μmol of diphenylmethylene(1-cyclopentadienyl)-(9-fluorenyl) zirconium dichloride, and, when 339 minutes elapsed from the initiation of polymerization, the inner pressure was released. Thus, 221 g of a polyethylene composition was obtained.

The density, Mw, Mw/Mn, frequency of long chain branches and powder bulk density of the polyethylene composition, and the content of the newly produced polyethylene in the polyethylene composition are shown in Table 3. Melt characteristics of the plyethylene composition are shown in Table 4.

Example 18

Synthesis of Macromonomer

A macromonomer was synthesized by the same procedures as described in Example 15, Synthesis of Macromonomer, except that the amount of catalyst slurry was changed to 2.5 mL, the polymerization temperature was maintained at 80° C., and, when 20 minutes elapsed from the initiation of polymerization, the inner pressure was released.

Production of Polyethylene Composition

Polymerization of ethylene was conducted by the same procedures as described in Example 15, Production of Polyethylene Composition, except that 10 μmol of diphenylmethylene-(1-indenyl)(9-fluorenyl)zirconium dichloride was used instead of 20 μmol of diphenylmethylene(1-cyclopentadienyl)-(9-fluorenyl) zirconium dichloride, and, when 150 minutes elapsed from the initiation of polymerization, the inner pressure was released. Thus, 171 g of a polyethylene composition was obtained.

The density, Mw, Mw/Mn, frequency of long chain branches and powder bulk density of the polyethylene composition, and the content of the newly produced polyethylene in the polyethylene composition are shown in Table 3. Melt characteristics of the plyethylene composition are shown in Table 4.

Example 19

Synthesis of Macromonomer

A macromonomer was synthesized by the same procedures as described in Example 15, Synthesis of Macromonomer, except that the amount of catalyst slurry was changed to 2.5 mL, the polymerization temperature was maintained at 70° C., and, when 49 minutes elapsed from the initiation of polymerization, the inner pressure was released.

Production of Polyethylene Composition

Polymerization of ethylene was conducted by the same procedures as described in Example 15, Production of Polyethylene Composition, except that 10 μmol of diphenylmethylene-(1-indenyl)(9-fluorenyl)zirconium dichloride was used instead of 20 μmol of diphenylmethylene(1-cyclopentadienyl)-(9-fluorenyl) zirconium dichloride, and, when 175 minutes elapsed from the initiation of polymerization, the inner pressure was released. Thus, 217 g of a polyethylene composition was obtained.

The density, Mw, Mw/Mn, frequency of long chain branches and powder bulk density of the polyethylene composition, and the content of the newly produced polyethylene in the polyethylene composition are shown in Table 3. Melt characteristics of the plyethylene composition are shown in Table 4.

Example 20

Synthesis of Macromonomer

A macromonomer was synthesized by the same procedures as described in Example 15, Synthesis of Macromonomer, except that the amount of catalyst slurry was changed to 2.5 mL, and, when 14 minutes elapsed from the initiation of polymerization, the inner pressure was released.

Production of Polyethylene Composition

Polymerization of ethylene was conducted by the same procedures as described in Example 15, Production of Polyethylene Composition, except that 10 μmol of diphenylmethylene-(1-indenyl)(2,7-di-t-butyl-9-fluorenyl)zirconium dichloride was used instead of 20 μmol of diphenylmethylene-(1-cyclopentadienyl)(9-fluorenyl)zirconium dichloride, and, when 4 minutes elapsed from the initiation of polymerization, the inner pressure was released. Thus, 143 g of a polyethylene composition was obtained.

The density, Mw, Mw/Mn, frequency of long chain branches and powder bulk density of the polyethylene composition, and the content of the newly produced polyethylene in the polyethylene composition are shown in Table 3. Melt characteristics of the plyethylene composition are shown in Table 4.

Example 21

Synthesis of Macromonomer

A macromonomer was synthesized by the same procedures as described in Example 15, Synthesis of Macromonomer, except that the amount of catalyst slurry was changed to 5.0 mL, and, when 15 minutes elapsed from the initiation of polymerization, the inner pressure was released.

Production of Polyethylene Composition

Polymerization of ethylene was conducted by the same procedures as described in Example 15, Production of Polyethylene Composition, except that 10 μmol of diphenylmethylene-(1-indenyl)(2,7-di-t-butyl-9-fluorenyl)zirconium dichloride was used instead of 20 μmol of diphenylmethylene-(1-cyclopentadienyl)(9-fluorenyl)zirconium dichloride, and, when 20 minutes elapsed from the initiation of polymerization, the inner pressure was released. Thus, 160 g of a polyethylene composition was obtained.

The density, Mw, Mw/Mn, frequency of long chain branches, powder bulk density and g' value of the polyethylene composition, and the content of the newly produced polyethylene in the polyethylene composition are shown in Table 3. Melt characteristics of the plyethylene composition are shown in Table 4.

Example 22

Synthesis of Macromonomer

A macromonomer was synthesized by the same procedures as described in Example 15, Synthesis of Macromonomer, except that the amount of catalyst slurry was changed to 2.5 mL, and, when 14 minutes elapsed from the initiation of polymerization, the inner pressure was released, and, when the inner pressure of autoclave was released to 0.1 MPa, the substitution of the inner atmosphere with nitrogen was not conducted.

Production of Polyethylene Composition

Polymerization of ethylene was conducted by the same procedures as described in Example 15, Production of Polyethylene Composition, except that 5 μmol of diphenylmethylene-(1-indenyl)(2,7-di-t-butyl-9-fluorenyl)zirconium dichloride was added instead of 20 μmol of diphenylmethylene-(1-cyclopentadienyl)(9-fluorenyl)zirconium dichloride, and immediately thereafter, ethylene was introduced, and, when 4 minutes elapsed from the initiation of polymerization, the inner pressure was released. Thus, 119 g of a polyethylene composition was obtained.

The density, Mw, Mw/Mn, frequency of long chain branches and powder bulk density of the polyethylene composition, and the content of the newly produced polyethylene in the polyethylene composition are shown in Table 3. Melt characteristics of the plyethylene composition are shown in Table 4.

Example 23

Synthesis of Macromonomer

A macromonomer was synthesized by the same procedures as described in Example 15, Synthesis of Macromonomer, except that the amount of catalyst slurry was changed to 2.5 mL, the polymerization temperature was changed to 80° C., and, when 25 minutes elapsed from the initiation of polymerization, the inner pressure was released, and, when the inner pressure of autoclave was released to 0.1 MPa, the substitution of the inner atmosphere with nitrogen was not conducted.

Production of Polyethylene Composition

Polymerization of ethylene was conducted by the same procedures as described in Example 15, Production of Polyethylene Composition, except that 10 μmol of diphenylmethylene-(1-indenyl) (9-fluorenyl) zirconium dichloride was added instead of 20 μmol of diphenylmethylene(1-cyclopentadienyl)-(9-fluorenyl) zirconium dichloride, and immediately thereafter, ethylene was introduced, and, when 236 minutes elapsed from the initiation of polymerization, the inner pressure was released. Thus, 223 g of a polyethylene composition was obtained.

The density, Mw, Mw/Mn, frequency of long chain branches and powder bulk density of the polyethylene composition, and the content of the newly produced polyethylene in the polyethylene composition are shown in Table 3. Melt characteristics of the plyethylene composition are shown in Table 4.

TABLE 3

| | Content of newly produced polymer (%) | Density (g/cm$^3$) | Mw (×10$^4$) | Mw/Mn | Freq. of long chain branches (/1000 C.) | Powder bulk density (g/cm$^3$) | g' value at 700K | g' value at 3 Mw | log(g')/log(g) at 700K | log(g')/log(g) at 3 Mw |
|---|---|---|---|---|---|---|---|---|---|---|
| Ex. 9 | 17 | 0.974 | 3.0 | 3.3 | 0.03 | 0.40 | — | — | — | — |
| Ex. 10 | 28 | 0.972 | 4.1 | 3.7 | 0.03 | 0.35 | — | — | — | — |
| Ex. 11 | 36 | 0.963 | 11.0 | 9.2 | 0.04 | 0.30 | 0.88 | — | 0.25 | — |
| Ex. 12 | 41 | 0.959 | 11.0 | 8.5 | 0.04 | 0.26 | — | — | — | — |
| Ex. 13 | 35 | 0.962 | 11.0 | 8.6 | 0.08 | 0.37 | 0.74 | — | 0.43 | — |
| Ex. 14 | 9 | 0.953 | 8.8 | 7.8 | 0.08 | 0.39 | — | — | — | — |
| Ex. 15 | 20 | 0.969 | 5.4 | 3.9 | 0.03 | 0.21 | — | — | — | — |
| Ex. 16 | 37 | 0.963 | 9.3 | 5.2 | 0.06 | 0.20 | 0.45 | 0.70 | 0.60 | 0.40 |
| Ex. 17 | 50 | 0.962 | 8.3 | 4.6 | 0.09 | 0.18 | — | — | — | — |
| Ex. 18 | 24 | 0.964 | 8.0 | 4.3 | 0.08 | 0.27 | — | — | — | — |
| Ex. 19 | 25 | 0.954 | 7.3 | 3.8 | 0.09 | 0.26 | — | — | — | — |
| Ex. 20 | 18 | 0.964 | 10.0 | 6.8 | 0.06 | 0.20 | — | — | — | — |
| Ex. 21 | 36 | 0.959 | 12.0 | 6.7 | 0.08 | 0.17 | 0.70 | 0.80 | 0.30 | 0.20 |
| Ex. 22 | 19 | 0.958 | 13.0 | 8.7 | 0.08 | 0.16 | — | — | — | — |
| Ex. 23 | 36 | 0.960 | 9.4 | 5.5 | 0.08 | 0.21 | — | — | — | — |

TABLE 4

| | MFR (g/10 min) | Ea (kJ/mol) | Ms$_{160}$ (mN) | Right side of formula (27) | Right side of formula (27') | Right side of formula (27") | Ms$_{190}$ (mN) | Right side of formula (3) | Right side of formula (3') | DR | logDR | Right side of formula (25) | λ |
|---|---|---|---|---|---|---|---|---|---|---|---|---|---|
| Ex. 9 | 127 | — | — | — | — | — | — | — | — | — | — | — | — |
| Ex. 10 | 52.5 | — | — | — | — | — | — | — | — | — | — | — | — |
| Ex. 11 | 2.06 | — | 100 | 75 | 95 | 115 | 71 | 12 | 16 | — | — | — | — |
| Ex. 12 | 0.56 | 32.9 | 170 | 138 | 158 | 178 | 128 | 37 | 50 | 125 | 2.10 | 2.03 | 2.6 |
| Ex. 13 | 2.11 | 40.1 | 460 | 74 | 94 | 114 | 345 | 11 | 16 | 50 | 1.70 | 1.46 | 4.0 |
| Ex. 14 | 5.00 | — | 265 | 33 | 53 | 73 | 200 | 5 | 7 | — | — | — | — |
| Ex. 15 | 18.3 | — | 30 | — | — | 11 | 21 | 2 | 2 | — | — | — | — |
| Ex. 16 | 2.90 | 40.4 | 140 | 59 | 79 | 99 | 105 | 9 | 12 | 250 | 2.40 | 2.15 | 5.3 |
| Ex. 17 | 2.18 | 36.2 | 140 | 73 | 93 | 113 | 100 | 11 | 15 | 250 | 2.40 | 2.15 | 3.8 |
| Ex. 18 | 3.01 | 35.9 | 110 | 57 | 77 | 97 | 80 | 8 | 11 | 350 | 2.54 | 2.28 | 3.9 |
| Ex. 19 | 3.79 | 32.9 | 80 | 46 | 66 | 86 | 60 | 7 | 9 | 450 | 2.65 | 2.47 | 3.1 |
| Ex. 20 | 3.52 | 35.2 | 200 | 50 | 70 | 90 | 150 | 7 | 10 | 125 | 2.10 | 1.93 | 5.3 |
| Ex. 21 | 0.52 | 34.3 | 260 | 141 | 161 | 181 | 195 | 39 | 53 | 150 | 2.18 | 1.79 | 5.2 |
| Ex. 22 | 0.70 | — | 250 | 127 | 147 | 167 | 175 | 30 | 41 | — | — | — | — |
| Ex. 23 | 1.25 | — | 225 | 99 | 119 | 139 | 170 | 18 | 25 | — | — | — | — |

The invention claimed is:

1. A polyethylene composition which is prepared by polymerizing ethylene and an optional olefin having at least three carbon atoms in the presence of a macromonomer, wherein the macromonomer is an ethylene polymer having a terminal vinyl group, prepared by polymerizing ethylene, or an ethylene copolymer having a terminal vinyl group, prepared by copolymerizing ethylene and an olefin having at least three carbon atoms, and the macromonomer is characterized by having:
(A) a number average molecular weight (Mn) of at least 10,000, and
(B) a ratio (Mw/Mn) of weight average molecular weight (Mw) to number average molecular weight (Mn), in the range of 2 to 5;
(Q) a frequency of long chain branches of smaller than 0.01 per 1,000 carbon atoms, and
(R) a frequency of short chain branches of smaller than 0.01 per 1,000 carbon atoms; and the polyethylene composition is characterized by comprising:
(C) based on the weight of the polyethylene composition, 1% to 99% by weight of branched polyethylene which is a copolymer derived from ethylene, the macromonomer and an optional olefin having at least three carbon atoms, and 1% to 99% by weight of the macromonomer, and the polyethylene composition is further characterized by having:
(D) a density in the range of 0.890 g/cm$^3$ to 0.980 g/cm$^3$,
(E) a weight average molecular weight (Mw) in the range of 30,000 to 10,000,000,
(F) a ratio (Mw/Mn) of weight average molecular weight (Mw) to number average molecular weight (Mn), in the range of 2 to 30,
(G) a frequency of long chain branches at least 0.01 but smaller than 0.1 per 1,000 carbon atoms, and
(H) a shrinking factor (g' value) as determined by a combination of gel permeation chromatography (GPC) and on-line intrinsic viscosity measurements, in the range of at least 0.1 but smaller than 0.9, and satisfying the following relationship (3):

(M) $MS_{190} > 22 \times MFR^{-0.88}$  (3)

wherein $MS_{190}$ is a melt strength (MS) (mN) as measured at a temperature of 190° C., and MFR is a melt flow rate (g/10 min.) as measured under a load of 2.16 kg and at a temperature of 190° C., and further satisfying the following relationship (27):

(M') $MS_{160} > 110 - 110 \times \log(MFR)$  (27)

wherein $MS_{160}$ is a melt strength (MS) (mN) as measured at a temperature of 160° C., and MFR is a melt flow rate (g/10 min.) as measured under a load of 2.16 kg and at a temperature of 190° C.

2. The polyethylene composition according to claim 1, which is prepared by polymerizing ethylene and an optional olefin having at least three carbon atoms in the presence of a macromonomer, wherein the macromonomer is an ethylene polymer having a terminal vinyl group, prepared by polymerizing ethylene, or an ethylene copolymer having a terminal vinyl group, prepared by copolymerizing ethylene and an olefin having at least three carbon atoms, and the macromonomer is characterized by having:
(A) a Mn of at least 10,000, and
(B) a Mw/Mn ratio in the range of 2 to 5;
(Q) a frequency of long chain branches of smaller than 0.01 per 1,000 carbon atoms, and
(R) a frequency of short chain branches of smaller than 0.01 per 1,000 carbon atoms; and the polyethylene composition is characterized by comprising:
(C') based on the weight of the polyethylene composition, 30% to 80% by weight of branched polyethylene which is a copolymer derived from ethylene, the macromonomer and an optional olefin having at least three carbon atoms, and 20% to 70% by weight of the macromonomer, and the polyethylene composition is further characterized by having:
(D) a density in the range of 0.890 g/cm$^3$ to 0.980 g/cm$^3$,
(E) a Mw in the range of 30,000 to 10,000,000,
(F') a Mw/Mn ratio in the range of 2 to 8,
(G) a frequency of long chain branches at least 0.01 but smaller than 0.1 per 1,000 carbon atoms, and
(H) a g' value in the range of at least 0.1 but smaller than 0.9, and satisfying the following relationship (3):

(M) $MS_{190} > 22 \times MFR^{-0.88}$  (3)

wherein $MS_{190}$ is a melt strength (MS) (mN) as measured at a temperature of 190° C., and MFR is a melt flow rate (g/10 min.) as measured under a load of 2.16 kg and at a temperature of 190° C., and further satisfying the following relationship (27):

(M') $MS_{160} > 110 - 110 \times \log(MFR)$  (27)

wherein $MS_{160}$ is a melt strength (MS) (mN) as measured at a temperature of 160° C., and MFR is a melt flow rate (g/10 min.) as measured under a load of 2.16 kg and at a temperature of 190° C.

3. The polyethylene composition according to claim 1, wherein the macromonomer is a linear ethylene polymer having a terminal vinyl group, prepared by polymerizing ethylene and an optional olefin having at least three carbon atoms, and the macromonomer is further characterized by having:
(J) a Z value in the range of 0.25 to 1 as defined by the following equation (1):

$Z = [X/(X+Y)] \times 2$  (1)

wherein X is frequency of vinyl terminal groups per 1,000 methylene carbon atoms in the main chain of macromonomer, and Y is frequency of saturated terminal groups per 1,000 methylene carbon atoms in the main chain of macromonomer.

4. The polyethylene composition according to claim 1, which is further characterized by satisfying the following relationship (2):

(K) $0.2 < \log(g')/\log(g) < 1.3$  (2)

wherein g is a shrinking factor (g value) as determined by a combination of gel permeation chromatography (GPC) and light scattering measurements.

5. The polyethylene composition according to claim 1, which is further characterized by having:
(L) a flow activation energy (Ea) in the range of 30 kJ/mol to 100 kJ/mol.

6. The polyethylene composition according to claim 1, which is further characterized by having:
(N) a non-linear parameter ($\lambda$) for elongation viscosity in the range of 1.2 to 100.

7. The polyethylene composition according to claim 1, which is further characterized by satisfying the following formula (4):

(O) $\log(DR) > 5 - 1.33 \times \log(MS_{160})$  (4)

wherein DR is a maximum drawing ratio and $MS_{160}$ is a melt strength (MS) as measured at a temperature of 160° C.

8. A particulate polyethylene composition which is prepared by polymerizing ethylene and an optional olefin having at least three carbon atoms in the presence of a macromonomer, wherein the macromonomer is an ethylene polymer having a terminal vinyl group, prepared by polymerizing ethylene, or an ethylene copolymer having a terminal vinyl group, prepared by copolymerizing ethylene and an olefin having at least three carbon atoms, and the macromonomer is characterized by having:
(A) a number average molecular weight (Mn) in the range of 9,000 to 50,000, and
(B) a ratio (Mw/Mn) of weight average molecular weight (Mw) to number average molecular weight (Mn), in the range of 2 to 5;
(Q) a frequency of long chain branches of smaller than 0.01 per 1,000 carbon atoms, and
(R) a frequency of short chain branches of smaller than 0.01 per 1,000 carbon atoms; and the polyethylene composition is characterized by comprising:
(C) based on the weight of the polyethylene composition, 1% to 99% by weight of branched polyethylene which is a copolymer derived from ethylene, the macromonomer and an optional olefin having at least three carbon atoms, and 1% to 99% by weight of the macromonomer, and the polyethylene composition is further characterized by having:
(D) a density in the range of 0.890 g/cm³ to 0.980 g/cm³,
(E) a weight average molecular weight (Mw) in the range of 30,000 to 10,000,000,
(F) a ratio (Mw/Mn) of weight average molecular weight (Mw) to number average molecular weight (Mn), in the range of 2 to 30,
(G) a frequency of long chain branches at least 0.01 but smaller than 0.1 per 1,000 carbon atoms, and
(H) a shrinking factor (g' value) as determined by a combination of gel permeation chromatography (GPC) and on-line intrinsic viscosity measurements, in the range of at least 0.1 but smaller than 0.9, and
(P) a powder bulk density in the range of 0.15 g/cm³ to 0.50 g/cm³, and satisfying the following relationship (3):

$$(M) \ MS_{190} > 22 \times MFR^{-0.88} \tag{3}$$

wherein $MS_{190}$ is a melt strength (MS) (mN) as measured at a temperature of 190° C., and MFR is a melt flow rate (g/10 min.) as measured under a load of 2.16 kg and at a temperature of 190° C., and further satisfying the following relationship (27):

$$(M') \ MS160 > 110 - 110 \times \log(MFR) \tag{27}$$

wherein MS160 is a melt strength (MS) (mN) as measured at a temperature of 160° C., and MFR is a melt flow rate (g/10 min.) as measured under a load of 2.16 kg and at a temperature of 190° C.

9. The particulate polyethylene composition according to claim 8, wherein the macromonomer is a linear ethylene polymer having a terminal vinyl group, prepared by polymerizing ethylene and an optional olefin having at least three carbon atoms, and the macromonomer is further characterized by having:
(J) a Z value in the range of 0.25 to 1 as defined by the following equation (1):

$$Z = [X/(X+Y)] \times 2 \tag{1}$$

wherein X is frequency of vinyl terminal groups per 1,000 methylene carbon atoms in the main chain of macromonomer, and Y is frequency of saturated terminal groups per 1,000 methylene carbon atoms in the main chain of macromonomer.

10. The particulate polyethylene composition according to claim 8, which is further characterized by satisfying the following relationship (2):

$$(K) \ 0.2 < \log(g')/\log(g) < 1.3 \tag{2}$$

wherein g is a shrinking factor (g value) as determined by a combination of gel permeation chromatography (GPC) and light scattering measurements.

11. The particulate polyethylene composition according to claim 8, which is further characterized by having:
(L) a flow activation energy (Ea) in the range of 30 kJ/mol to 100 kJ/mol.

12. The polyethylene composition according to claim 8, which is further characterized by having:
(N) a non-linear parameter (λ) for elongation viscosity in the range of 1.2 to 100.

13. The polyethylene composition according to claim 8, which is further characterized by satisfying the following formula (4):

$$(O) \ \log(DR) > 5 - 1.33 \times \log(MS_{160}) \tag{4}$$

wherein DR is a maximum drawing ratio and $MS_{160}$ is a melt strength (MS) as measured at a temperature of 160° C.

14. A process for producing the polyethylene composition as claimed in claim 1, which comprises polymerizing ethylene and an optional olefin having at least three carbon atoms in the presence of the macromonomer and a catalyst comprising as the main ingredient a metallocene compound represented by the following general formula (5):

(5)

wherein $M^2$ is a transition metal of group 3,4,5 or 6 of the periodic table; $X^2$ independently represents a hydrogen atom, a halogen atom, or a hydrocarbon group having 1 to 20 carbon atoms, which may contain a silicon, nitrogen or oxygen atom; y is an integer of 0 to 3 which varies depending upon the valence of $M^2$; $R^7$ is a ligand represented by the following general formula (6), (7) or (8):

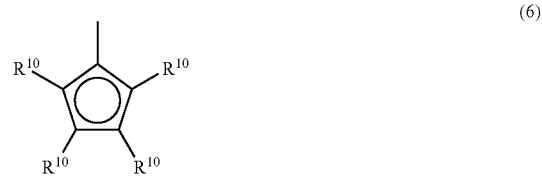

(6)

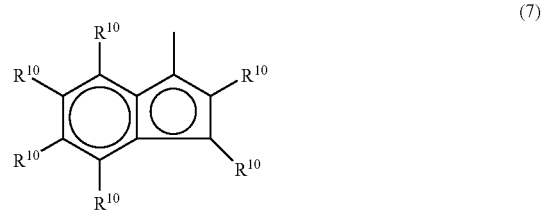

(7)

-continued (8)
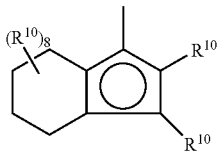

wherein $R^{10}$ independently represents a hydrogen atom, a halogen atom, or a hydrocarbon group having 1 to 20 carbon atoms, which may contain a silicon, nitrogen or oxygen atom; $R^8$ is a ligand represented by the following general formula (9):

(9)
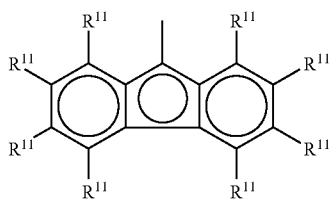

wherein $R^{11}$ independently represents a hydrogen atom, a halogen atom, or a hydrocarbon group having 1 to 20 carbon atoms, which may contain a silicon, nitrogen or oxygen atom; said ligands $R^7$ and $R^8$ form a sandwich structure together with $M^2$; $R^9$ is a group represented by the following general formula (10):

(10)
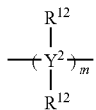

wherein $R^{12}$ independently represents a hydrogen atom, a halogen atom, or a hydrocarbon group having 1 to 20 carbon atoms, which may contain a silicon, nitrogen or oxygen atom, and two $R^{12}$s may be bonded with each other to form a ring together with $Y^2$ to which the two $R^{12}$s are bonded; $Y^2$ is an atom of group 14 of the periodic table; m is an integer of 1 to 5; and $R^9$ has a function of crosslinking $R^7$ with $R^8$.

15. The process for producing the polyethylene composition according to claim 14, wherein the catalyst comprising as the main ingredient the metallocene compound, further comprises (b) a modified clay compound.

16. The producing process according to claim 15, wherein the modified clay compound is a modified clay compound which has been treated with an organic compound represented by the following general formula (17):

$[R^{13}{}_k GH]^+[A]^-$ (17)

wherein G is an element selected from those of group 15 or 16 of the periodic table, $R^{13}$ independently represents a hydrogen atom or a substituent including a hydrocarbon group having 1 to 30 carbon atoms, provided that at least one of $R^{13}$s is a hydrocarbon group having 1 to 30 carbon atoms, wherein each $R^{13}$ may be bound to another $R^{13}$; when G is an element selected from those of group 15, k is 3, and, when G is an element selected from those of group 16, k is 2; and $[A]^-$ is a counter anion.

17. A process for producing the particulate polyethylene composition as claimed in claim 8, which comprises:
    step I wherein ethylene and an optional olefin having at least 3 carbon atoms are polymerized in a slurry state in the presence of a catalyst to prepare the macromonomer; said catalyst comprising:
    (a) a metallocene compound represented by the following general formula (11):

(11)
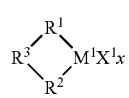

wherein $M^1$ is a transition metal of group 3, 4, 5 or 6 of the periodic table; $X^1$ independently represents a hydrogen atom, a halogen atom, or a hydrocarbon group having 1 to 20 carbon atoms, which may contain a silicon, nitrogen or oxygen atom; x is an integer of 0 to 3 which varies depending upon the valence of $M^1$; $R^1$ and $R^2$ are ligands represented by the following general formula (12), (13) or (14):

(12)
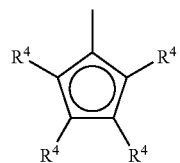

(13)
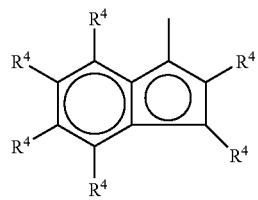

(14)
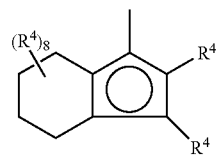

wherein $R^4$ independently represents a hydrogen atom, a halogen atom, or a hydrocarbon group having 1 to 20 carbon atoms, which may contain a silicon, nitrogen or oxygen atom; said ligands $R^1$ and $R^2$ form a sandwich structure together with $M^1$; $R^3$ is a group represented by the following general formula (15):

(15)
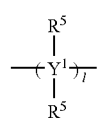

wherein $R^5$ independently represents a hydrogen atom, a halogen atom, or a hydrocarbon group having 1 to 20 carbon atoms, which may contain a silicon, nitrogen or oxygen atom, and two $R^5$s may be bonded with each other to form a ring together with $Y^1$ to which the two $R^5$s are bonded; $Y^1$ is an atom of group 14 of the periodic table; l is an integer of 1 to 5; and $R^3$ has a function of crosslinking $R^1$ with $R^2$;

(b) a modified clay compound; and (c) an optional organoaluminum compound represented by the following general formula (16):

$$AlR^6{}_3 \tag{16}$$

wherein $R^6$ independently represents a hydrogen atom, a halogen atom, an alkyl or alkoxy group having 1 to 20 carbon atoms, or an aryl, aryloxy, arylalkyl, arylalkoxy, alkylaryl or alkylaryloxy group having 6 to 20 carbon atoms, provided that at least one of $R^6$s is an alkyl group having 1 to 20 carbon atoms; and step II wherein a catalyst is added to a reaction mixture containing the macromonomer as produced in step I; and subsequently, ethylene, the macromonomer as produced in step I, and an optional olefin having at least three carbon atoms are copolymerized in a slurry state in the presence of the added catalyst; said catalyst added comprising as the main ingredient a metallocene compound represented by the following general formula (5):

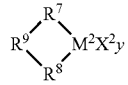

(5)

wherein $M^2$ is a transition metal of group 3, 4, 5 or 6 of the periodic table; $X^2$ independently represents a hydrogen atom, a halogen atom, or a hydrocarbon group having 1 to 20 carbon atoms, which may contain a silicon, nitrogen or oxygen atom; y is an integer of 0 to 3 which varies depending upon the valence of $M^2$; $R^7$ is a ligand represented by the following general formula (6), (7) or (8):

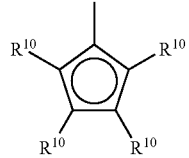

(6)

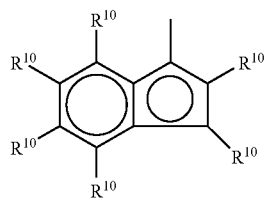

(7)

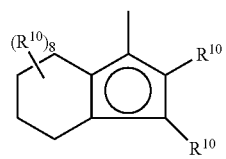

(8)

wherein $R^{10}$ independently represents a hydrogen atom, a halogen atom, or a hydrocarbon group having 1 to 20 carbon atoms, which may contain a silicon, nitrogen or oxygen atom; $R^8$ is a ligand represented by the following general formula (9):

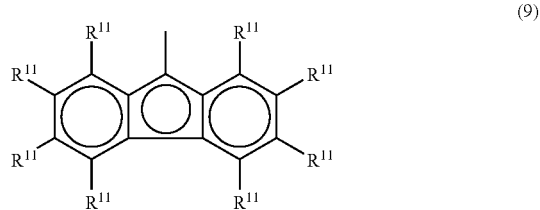

(9)

wherein $R^{11}$ independently represents a hydrogen atom, a halogen atom, or a hydrocarbon group having 1 to 20 carbon atoms, which may contain a silicon, nitrogen or oxygen atom; said ligands $R^7$ and $R^8$ form a sandwich structure together with $M^2$; $R^9$ is a group represented by the following general formula (10):

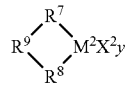

(5)

wherein $R^{12}$ independently represents a hydrogen atom, a halogen atom, or a hydrocarbon group having 1 to 20 carbon atoms, which may contain a silicon, nitrogen or oxygen atom; $Y^2$ is an atom of group 14 of the periodic table; and m is an integer of 1 to 5; and $R^9$ has a function of crosslinking $R^7$ with $R^8$.

18. The producing process according to claim 17, wherein the modified clay compound is a modified clay compound which has been treated with an organic compound represented by the following general formula (17):

$$[R^{13}{}_kGH]^+[A]^- \tag{17}$$

wherein G is an element selected from those of group 15 or 16 of the periodic table, $R^{13}$ independently represents a hydrogen atom or a substituent including a hydrocarbon group having 1 to 30 carbon atoms, provided that at least one of $R^{13}$s is a hydrocarbon group having 1 to 30 carbon atoms, wherein each $R^{13}$ may be bound to another $R^{13}$; when G is an element selected from those of group 15, k is 3, and, when G is an element selected from those of group 16, k is 2; and $[A]^-$ is a counter anion.

19. The producing process according to claim 17, wherein the catalyst comprising the metallocene compound as the main catalytically active ingredient, further comprises:

(i) an optional aluminum compound represented by the following general formula (18), (19) or (20):

$$AlR^{14}{}_3 \tag{18}$$

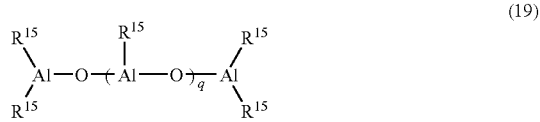

(19)

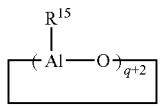
(20)

wherein $R^{14}$ independently represents a hydrogen atom, a halogen atom, an alkyl or alkoxy group having 1 to 20 carbon atoms, or an aryl, aryloxy, arylalkyl, arylalkoxy, alkylaryl or alkylaryloxy group having 6 to 20 carbon atoms, provided that at least one of $R^{14}$s is an alkyl group having 1 to 20 carbon atoms; $R^{15}$ independently represents a hydrogen atom or a hydrocarbon group having 1 to 20 carbon atoms; and q is an integer of 2 to 60; and (ii) an optional compound represented by the following general formula (21), (22), (23) or (24):

$$[HR^{16}][E(Ar)_4] \quad (21)$$

$$[JR^{17}{}_o][E(Ar)_4] \quad (22)$$

$$[D][E(Ar)_4] \quad (23)$$

$$E(Ar)_4 \quad (24)$$

wherein H is proton; E is a boron atom or an aluminum atom; $R^{16}$ is a Lewis base selected from the group consisting of an aliphatic amine, an aromatic amine and a phosphine; $R^{17}$ is a Lewis base selected from the group consisting of an aliphatic amine, an aromatic amine and a phosphine, or a cyclopentadienyl group which may be substituted; J is a lithium, iron or silver atom; D is a carbonium cation or a tropylium cation; Ar independently represents a substituted or unsubstituted hydrocarbon group having 1 to 20 carbon atoms, which is selected from alkyl groups, aryl groups, aralkyl groups, aryl groups having a halogen substituent, aryl groups having a hydrocarbon group substituent, aryl groups having a hetero atom-containing hydrocarbon group as a substituent, aralkyl groups having a halogen substituent, aralkyl groups having a hydrocarbon group as a substituent, aralkyl groups having a hetero atom-containing hydrocarbon group as a substituent, aryl groups having as a substituent a silyl group having a hydrocarbon group, aryl groups having as a substituent a silyl group having a hetero atom-containing hydrocarbon group, aralkyl groups having as a substituent a silyl group having a hydrocarbon group, and aralkyl groups having as a substituent a silyl group having a hetero atom-containing hydrocarbon group, and o is an integer of 0, 1 or 2.

* * * * *